United States Patent
Ohta et al.

(10) Patent No.: US 6,212,637 B1
(45) Date of Patent: Apr. 3, 2001

(54) METHOD AND APPARATUS FOR EN-BLOC VERIFICATION OF PLURAL DIGITAL SIGNATURES AND RECORDING MEDIUM WITH THE METHOD RECORDED THEREON

(75) Inventors: Kazuo Ohta; Tatsuaki Okamoto, both of Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 09/104,281

(22) Filed: Jun. 25, 1998

(30) Foreign Application Priority Data

| Jul. 4, 1997 | (JP) | 9-179872 |
| Jul. 4, 1997 | (JP) | 9-179873 |
| Jul. 8, 1997 | (JP) | 9-182724 |

(51) Int. Cl.[7] .................................... H04L 9/00
(52) U.S. Cl. ................. 713/176; 713/177; 713/180; 380/30
(58) Field of Search ................. 713/176, 177, 713/180; 380/30

(56) References Cited

U.S. PATENT DOCUMENTS

| 4,926,479 | * | 5/1990 | Goldwasser et al. ............... 713/180 |
| 5,140,634 | * | 8/1992 | Guillou et al. ..................... 713/180 |
| 5,231,668 | * | 7/1993 | Kravitz ............................... 380/28 |
| 5,245,657 | * | 9/1993 | Sakurai ................................ 705/67 |
| 5,297,206 | * | 3/1994 | Orton ................................... 380/30 |
| 5,347,581 | * | 9/1994 | Naccache et al. .................... 380/30 |
| 5,434,919 | * | 7/1995 | Chaum ................................. 380/30 |
| 5,502,764 | * | 3/1996 | Naccache ........................... 713/180 |
| 5,592,552 | * | 1/1997 | Fiat ..................................... 713/163 |
| 5,966,445 | * | 10/1999 | Park et al. ........................... 713/180 |
| 5,987,138 | * | 11/1999 | Gilbert et al. ....................... 380/30 |
| 6,076,763 | * | 6/2000 | Hoffstein et al. ................... 713/168 |
| 6,088,454 | * | 7/2000 | Nagashima et al. ............... 380/286 |

FOREIGN PATENT DOCUMENTS 7-261663  10/1995 (JP) ................ G09C/1/00

* cited by examiner

*Primary Examiner*—Tod R. Swann
*Assistant Examiner*—Ronald F. Sulpizio, Jr.
(74) *Attorney, Agent, or Firm*—Pollock, Vande Sande & Amernick, R.L.L.P.

(57) ABSTRACT

Upon receiving a message $\{ID'_{i-1}, X'_{i-1}, m'_{i-1}, Y_{i-1}\}$ from a signer (i−1), a signer $_i$ generates a random number $r_i$, then calculates $X_i = g^{r_i} \mod p$ using pieces of public information p, q and g, then sets $X'_i = (X'_{i-1}, X_i)$, $m'_i = (m'_{i-1}, m_i)$, then calculates $e_i = f_i(X'_i, m'_i)$, $d_i = h_i(X'_i, m'_i)$ with public one-way functions $f_i$ and $h_i$, calculates $y_i = (y_{i-1} + d_i r_i + e_i s_i) \mod q$ using a secret random number $s_i$, sets $ID'_i = (ID'_{i-1}, ID_i)$, and sends information $\{ID'_i, X'_i, m'_i, y'_i\}$ to the next signer (i+1). A verifier calculates $e_i$ and $d_i$ with the one-way functions $f_i$ and $h_i$ using $X'_L$ and $m'_L$ contained in received information $\{ID'_L, X'_L, m'_L, y_L\}$, and makes a check to see if $g^y_L \equiv X_1^{d_1} I_1^{e_1} \ldots X_L^{d_L} I_L^{e_L} \pmod{p}$, thereby verifying signatures of the signers en bloc.

70 Claims, 19 Drawing Sheets

FIG. 22

| | SIGNATURE | VERIFICATION |
|---|---|---|
| RSA CRYPTOSYSTEM (PRIOR ART) | $\sigma_1 = D_1(f(m))$ for $i=1$<br>$\sigma_i = d_i(\sigma_{i-1})$ for $2 \leq i \leq L$ | $f(m) = E_1(\cdots(E_L(\sigma_L))\cdots)$ |
| Schnorr (PRIOR ART) | $X_i = g^{r_i} \bmod p$<br>$e_i = f_i(X_i, m)$<br>$y_i = (r_i + e_i s_i) \bmod q$ | $g^{y_i} \equiv X_i I_i^{e_i} \pmod{p}$<br>$1 \leq i \leq L$ |
| EMBODIMENT 2 | $X'_i = X'_{i-1} g^{r_i} \bmod p$<br>$e_i = f_i(X'_i, m)$<br>$d_i = h_i(X'_i, m)$<br>$y_i = (y_{i-1} + d_i r_i + e_i s_i) \bmod q$ | $g^{y_L} \equiv$<br>$X_1^{d_1} \cdots X_L^{d_L} I_1^{e_1} \cdots I_L^{e_L} \pmod{p}$ |
| EMBODIMENT 5 | $X_i = r_i P$ over $E_{a,b}(GF(q))$<br>$e_i = f_i(X'_i, m)$<br>$d_i = h_i(X'_i, m)$<br>$y_i = (y_{i-1} + d_i r_i + e_i s_i) \bmod k$ | $y_L P$ over $E_{a,b}(GF(q)) \equiv$<br>$(d_1 X_1 + \cdots + d_L X_L + e_1 I_1 + \cdots + e_L I_L)$<br>over $E_{a,b}(GF(q))$ |

FIG. 23

| | SIGNATURE $|N|=1024$, $|q|=160$ | VERIFICATION | REDUNDANCY | COMM # | ROUND # |
|---|---|---|---|---|---|
| RSA CRYPTOSYSTEM (PRIOR ART) | mod N MULTIPLICATION $3|N|/2=1536$ TIMES | mod N EXPONENTIATION L TIMES | $|y|$ BITS | (L-1) | 1 |
| Schnorr (PRIOR ART) | mod p MULTIPLICATION $3|p|/2=240$ TIMES<br>mod q MULTIPLICATION 1 TIME<br>mod q MULTIPLICATION 1 TIME | mod p EXPONENTIATION 2L TIMES | $L(|e|+|y|)$ BITS | 2L-1 | 2 |
| EMBODIMENT 2 | mod p MULTIPLICATION $3|p|/2=240$ TIMES<br>mod q MULTIPLICATION 2 TIMES<br>mod q MULTIPLICATION 2 TIMES | mod p EXPONENTIATION L+1 TIMES | $L|x|+|y|$ BITS | L-1 | 1 |
| EMBODIMENT 5 | mod q MULTIPLICATION $3|q|/2=240$ TIMES<br>mod k MULTIPLICATION 2 TIMES<br>mod k MULTIPLICATION 2 TIMES | mod q EXPONENTIATION L+1 TIMES | 161L+160 BITS | L-1 | 1 |

METHOD AND APPARATUS FOR EN-BLOC VERIFICATION OF PLURAL DIGITAL SIGNATURES AND RECORDING MEDIUM WITH THE METHOD RECORDED THEREON

BACKGROUND OF THE INVENTION

The present invention relates to a method and apparatus which enable a verifier to conduct an en-bloc verification of individual, multiple or superimposed signatures electronically attached by a plurality of signers to one or more electronified documents in a system for decision making by circulating them to the signers. The invention also pertains to a recording medium with the verification method recorded thereon.

A typical digital signature scheme is one that utilizes the RSA cryptosystem (R. L. Rivest, et al., "A Method for Obtaining Digital Signatures and Public-Key Cryptosystems", Communications of the ACM, Vol. 21, No. 2, pp.120–126 (1978)). The RSA cryptosystem is such as described below.

A signer A generates a signature key (d, N) and a verification key (e, N) so that they satisfy $N = P \times Q$ $e \times d \equiv 1 \pmod{L}$ where $L = LCM\{(P-1), (Q-1)\}$ Then the signer A publishes the verification key while keeping the signature key in secret. In the above, $LCM\{a, b\}$ represents the least common multiple of the integers a and b, and P and Q are assumed to be two large different prime numbers. Further, $a \equiv b \pmod{L}$ represents that a-b is a multiple of L.

The RSA cryptosystem is a cryptosystem that bases its security on the difficulty in factorizing N into prime numbers when the N is large. It is difficult to compute the d-component of the secret signature key from the published verification key (N, e).

A verifier B keeps the verification key (e, N) of the signer A in combination with his identification information (ID). A trusted center may sometimes holds such verification keys in the form of a public information management directory.

A signature function D and a verification function E are defined as follows:

$D(m) = m^d \bmod N$ $E(y) = y^e \bmod N$

It is possible to show that the following equation holds true for an integer m which satisfies $0 \leq m < N$.

$E(D(m)) = m$ where a mod N represents the remainder that results from the division of a by N.

The digital signature scheme utilizing the RSA cryptosystem is such as described below. The signer A generates f(m) from a document m using a one-way function f, then adds thereto a signature $y = D(f(m))$ using the secret signature function D, and sends a combination (ID, m, y) of his identification information (ID), the document m and the signature y as a signed message to the verifier B.

The verifier B retrieves the verification key information (e, N) of the signer A from the public information management file using the signer's identification information ID as the key therefor, then computes $E(y) = y^e \bmod N$ from the y-component of the signed message through the use of the retrieved verification key information (e, N), nd makes a check to see if E(y) matches f(m) derived from m using he one-way function f. If E(y)=f(m), then the verifier B judges that the sender is the genuine signer A and that the signed message (ID, m, y) has not been forged, because it is only the true signer A that knows the signature function $D(m) = m^d \bmod N$, i.e. the aforementioned d-component.

The one-way function f mentioned herein is a function with which it is easy to calculate f(x) from x but it is difficult to obtain x from f(x). The one-way function f can be set up using a traditional high-speed encryption system, for example, a DES cryptosystem (Data Encryption Standard, Federal Information Processing Standards Publication 46, 1977). With the use of high-speed components, the time for computing the function f would substantially be negligible. The one-way function recited hereinafter is such one that can calculated a value for an x of an arbitrary data-length.

The integer N for use in the RSA cryptosystem is usually decimal 308 digits (1024 bits) or so in length. The d-component of the signature key is also about 1024-bit long. It is well-known in the art that a square-and-multiply algorithm is used to calculate the signature function D. The computation of a 308-digit integer (including a modular N calculation) needs to be performed on an average of 1536 times, imposing a heavy computational load on the signer A for signature generation.

The square-and-multiply algorithm for computing $x^a \bmod N$ is such as described below.

Step S1: $z = 1$

Step S2: The following steps S2-1 and S2-2 are repeated until a numerical subscript i becomes $|a|-1$ from 0 (Assume that $|a|$ represents the number of bits of a).

Step S2-1: $z' = z^2 \bmod N$

Step S2-2: if $a_i = 1$, update z with $z = z'x \bmod N$ ($a_i$ being a value, 0 or 1, of an i-th bit of a), and return to step S2-1.

If $a_i = 0$, return to step S2-1 without updating z.

Step S3: z is output.

(The square-and-multiply algorithm is described, for example, in Douglas R. Stinson, "CRYPTOGRAPHY, Theory and Practice," CRC, Press p127, 1995

With a view to solving the problem of increased computational load on the signer apparatus for signature generation, there have been proposed interactive proofs (typical examples of which are a Fiat-Shamir and a Schnorr scheme) (A. Fiat and A. Shamir, "How to prove yourself: practical solutions to identification and signature problems," Advances in Cryptology-Crypto 86, Springer-Verlag, pp. 186–194; C. P. Schnorr, "Efficient Identification and Signatures for smart Card," Advances in Cryptology-EUROCRYPT7 89, springer-verlag, pp. 235–251; and M. Tompa and H. Woll, "Random Self-Reducibility and Zero Knowledge Interactive Proofs of Possession of Information," Proceedings of the 28th IEEE Symposium on the Foundation of Computer Science, pp. 472–482 (1987)).

A description will be given of a digital signature by the Schnorr scheme.

A trusted center publishes two large primes p and q which bear a relation that q is a measure of p-1, and an integer $g \in (Z/pZ)^* = \{1, 2, \ldots, p-1\}$ which has an order q.

Step S1: The signer A generates a random number $s \in (Z/qZ) = \{0, 1, 2, \ldots q-1\}$, then computes public information I by $$I = g^s \bmod p \qquad (1)$$

and publishes a pair of identification information (ID) and information I.

The signer A goes through the following procedure to prove to the verifier B that the document or message m is true or genuine.

Step S2: The signer A generates a random number r∈(Z/qZ), and computes $$X = g^r \bmod p \quad (2)$$

Step S3: The signer A computes an integer e∈(Z/qZ) by the following equation using the one-way function f.

$$e = f(X, m) \quad (3)$$

Step S4: The signer A generates the signature y by $$y = r + er \bmod q \quad (4)$$

and sends {ID, m, X, y} as a signed message to the verifier B.

Step S5: The verifier B computes the integer e∈(Z/qZ) using the one-way function f by $$e = f(X, m) \quad (5)$$

Step S6: The verifier B makes a check to see if the following equation holds true.

$$g^y = XI^e (\bmod p) \quad (6)$$

where I is public information corresponding to the identification information ID.

As is seen from the way of generating the signature y, $g^y = g^r(g^s)^e = XI^e(\bmod p)$; hence, when Eq. (6) holds true, then the verifier B recognizes the document m as duly sent from the signer A.

In steps S2 through S4 described above, the signature of the signer could be forged if {ID, X, m, y} were sent as a signed message when the integer e∈(Z/qZ), with which e=f(X, m) would hold, could be found by calculating X∈(Z/pZ)*, which would satisfy Eq. (6), after suitably choosing the integers e∈(Z/qZ) and y∈(Z/qZ). Since the probability with which the verification equation e=f(m, X) holds true is 1/q, however, the computational complexity involved in the forgery of signature depends on the value q. In the following description the number of bits of the prime p will be represented by |p|.

With the Schnorr scheme, the signature generation processing by the sender involves a multiplication (including modular p calculations) of |p|-bit integers on an average of 3/2|q| times, a single multiplication (including modular q calculations) of |q|-bit integers and a single addition (including modular q calculations) of the |q|-bit integers.

While in the above the signed message is {ID, X, m, y}, it is also possible to use e in place of X to provide {ID, e, m, y}. In this instance, a check is made to see if the relation e=f(X, m) holds, by calculating X by $X = (g^y)(I^e)^{-1} \bmod p$. When |e|<|X|, the latter will make the message shorter.

Now, consider that a plurality of signers sign different documents on the superimposed-signature basis. A typical example of using the superimposed-signature scheme is as follows: For example, a certification authority CA guarantees the validity of the correspondence between the public identification information ID and public information I of the signer by a digital signature T=$D_{CA}$(ID, I) affixed to a document (ID, I), and sends the signature T to the signer. The signer generates a signature $D_{ID}$(m, T) for a pair of the document m and the signature T through the use of the secret information corresponding to the public information I, and sends the signature $D_{ID}$(m, T) to the verifier, enabling him to verify the signature $D_{ID}$(m, T) of the signer and the signature T of the certification authority CA.

In the superimposed-signature scheme it is important to suppress the amount of information to be processed by the signer for signature generation, suppress the amount of information to be processed by the verifier for signature verification and prevent an increase in the signature components.

With the digital signature scheme utilizing the RSA cryptosystem, respective signers i sign documents $m_i$ in a sequential order to provide information $D_L(m_L, \ldots, D_2(f(m_2, D_1(f(m_1)))) \ldots )$, thereby implementing the superimposed-signature function. In this instance, a large amount of calculation to be processed for signature generation gives rise to a problem.

With a direct application of the Schnorr scheme to the superimposed-signature scheme, it is considered possible to employ a method of adding information {$ID_i$, $X_i$, $y_i$} to documents ($m_1, \ldots, m_{i-1}, m_i$) for each signer i. The $X_i$-component is |p|-bit long and $y_i$-component |q|-bit long. When L signers sign, information of (|p|+|q|)×L bits will ultimately added to a message, that is, L signers' identification information ID and documents ($m_1, \ldots, m_L$). In this case, too, an increase in the signature component (X-component, y-component) causes a problem.

Next, a description will be given of the multi-signature scheme in which a plurality of signers sign one document in a sequential order. With the digital signature scheme utilizing the RSA cryptosystem, it is possible to implement the multi-signature when the plurality of signers sign on a signature y of a message {ID, m, y} one after another (i.e. $D_L \ldots D_1$,(f(m))). This scheme also encounters the problem of the large amount of calculation to be processed for signature generation.

With a direct application of the Schnorr scheme to the multi-signature scheme, it is considered feasible to employ a method of adding information {ID, X, y} to a message m for each signer. The X-component is |p|-bit long and y-component |q|-bit long. When L signers sign the message in a sequential order, information of (|p|+|q|)×L bits will ultimately be added to a message (L signers' identification information ID and document m). In this instance, too, an increase in the signature component (X-component, y-component) produces a problem.

As regards the multi-signature scheme, there has been proposed a multi-signature scheme that permits reduction of each of the X- and y-components to one by accumulating the values of the X- and y-components for each signature generating process (K. Ohta and T. Okamoto, "A Digital Multi-Signature Scheme Based on the Fiat-Shamir Scheme," Advances in Cryptology-ASIACRYPT'91, springer-Verlage, pp.139–148). Since this scheme involves two rounds of circulation of a message to signers, however, the multi-signature by L signers requires (2L−1) rounds of communication; hence, an increase in the number of communications gives rise to a problem.

With the multi-signature scheme that involves two rounds of circulation of a message to signers, it is impossible to realize the superimposed-signature scheme wherein the document to be signed differs for each signer. The reason for this is that since all documents, for example, $m_1$ and $m_2$, must be determined in the first round of circulation, the signature to the documents ($m_1$, $m_2$) cannot be generated after the generation of the signature to the document $m_1$.

There has been proposed a scheme for modifying an ElGamal signature to the multi-signature (Atsushi Shimbo, "Multisignature Schemes Based on the ElGamal Scheme, The 1994 Symposium on Cryptography and Information Security SCIS94-2C). However, this literature is silent about the superimposed use of signature. With the proposed modified scheme, it is difficult to realize the Schnorr signature with one round of circulation, and the security of any of the proposed schemes was not strictly evaluated (see Conclusion on page 9 of the literature).

In a system utilizing the digital signature scheme, the situation occasionally arises where a plurality of signatures are gathered at one place and verified. For example, electronic money is returned to its issuing institution, wherein the validity of the electronic money is verified. In such an instance, the use of an interactive proof will permit a substantial reduction of the amount of calculation to be processed for signature generation. But the amount of calculation to be processed for signature verification may sometimes increase. For example, Schnorr scheme involves multiplication of $|p|$-bit integers (including modular p calculations) on an average of $3/2|q|$ times, but in the RSA scheme, since $e=3$ can be achieved without impairing the security, the number of multiplications of $|N|$-bit integers (including modular N calculations) is only two.

Now, a description will be given of en-bloc verification of a plurality of signatures in the above-mentioned digital signature scheme.

Since the digital signature scheme utilizing the RSA cryptosystem encounters the problem of the large amount of calculation to be processed for signature generation and uses the value $N_i$ of a different modulus for each signer, it is considered impossible to verify $N_i$ and $N_j$ at one time.

When the Schnorr scheme is used without any modifications, the signer i signs a message $m_i$ by adding thereto information $\{ID_i, X_i, y_i\}$, where the $X_i$-component is $|p|$ bits in length and the $y_i$-component $|q|$ bits in length. In the case where L signers i each sign a different document $m_i$ (where $1 \leq i \leq L$) and L independent verification equations are used to verify the L signatures, the amount of calculation to be processed for signature verification is L rounds of verification.

In view of the above, there has been proposed a scheme that uses the following one verification equation by accumulating the value of the y-component.

$$g^{y'} = X_1 I_1^{e_L} \ldots X_L I_L^{e_L} \pmod{p} \quad (7)$$

where $$y' = \sum_{l=1}^{L} y_i \text{ and } e_i = f(X_i, m_i).$$

See, for example, Ohta and Okamoto, "Multi-Signature Schemes Using Fiat-Shamir Scheme," Spring National Convention of the Institute of Electronics, Information and Communication Engineers of Japan (1989), A-277 (1989), and Harada and Tatebayashi, "An efficient method for computing a general monomial and its application," Technical Report of Institute of Electronics, Information and Communication Engineers of Japan ISEC91-40 (1991).

With these schemes, each signer can forge other signers' signatures, giving rise to a problem in terms of security. This problem is discussed, for example, in Shimbo and Kawamura, "Consideration on computing vector addition chain and its application," Technical Report of the Institute of Electronics, Information and Communication Engineers of Japan ISEC91-59 (1991).

In the above literature there are described the signature generation, the signature verification and attacks thereto in the situation where a plurality of signers sign one document; but even if each signer signs a different document, the use of the afore-mentioned verification equation allows the direct application of the attack to the multiple signature, producing a security problem.

SUMMARY OF THE INVENTION

A first object of the present invention is to provide a signature method and apparatus that permit en-bloc verification of a superimposed or multiple signature or individual signatures attached by a plurality of signers to the same or different documents, and a recording method with the signature method recorded thereon.

A second object of the present invention is to provide a secure superimposed-signature method and apparatus that prevent an increase in the amount of data for signature components in the case where a plurality of signers each sign a different document and it is desirable to certify the order of signing, and a recording medium with the superimposed-signature method recorded thereon.

A third object of the present invention is to provide a secure multi-signature method and apparatus that permit realization of a multiple signature by only one round of circulation of a message to a plurality of signers and prevent an increase in the amount of data for signature components, and a recording medium with the multi-signature method recorded thereon.

A fourth object of the present invention is to provide a secure signature method and apparatus that permits en-bloc and hence efficient verification of signatures when a plurality of signers each sign a different document, and a recording medium with the signature method recorded thereon.

A signature verification method according to a first aspect of the present invention comprises the steps:

wherein each signer i:
  (a) generates a first random number $s_i$ as secret information, then generates information $I_i=(s_i, \beta)$ with a function $G_2$ through the use of a public parameter $\beta$ and the first random number $s_i$, and publishes the information $I_i$ and two one-way functions $f_i$ and $h_i$ and identification information $ID_i$ used by the signer I as his public information $\{ID_i, I_i, f_i, h_i\}$;
  (b) generates a second random number $r_i$, then generates information $X_i=\Phi(r_i, \beta)$ by setting the parameter $\beta$ and the second random number $r_i$ in a function $\Phi$, and sets information containing the information $X_i$ as $X'_i$;
  (c) generates
    $e_i = f_i(X'_i, m'_i)$
    $d_i = h_i(X'_i, m'_i)$
      with the one-way functions $f_i$ and $h_i$ through the use of document information $m'_i$ containing a document $m_i$ to be signed and the information $X'_i$; and
  (d) generates, to information containing $e_i$, $d_i$, $s_i$ and $r_i$, a signature
    $y_i = Sg_i(e_i, d_i, s_i, r_i, y'_{i-1})$
      with a signature function $Sg_i$ generated using the parameter $\beta$ and, letting information containing the identification information $ID_i$ be represented as identification information $ID'_i$, sends out $\{ID'_i, X'_i, m'_i, y_i\}$ individually or via the other signers to a verifier as the last destination, where in the case of sending individually, the $y'_{i-1}$ is set as an empty set and in the case of sending via the other signers, the $y'_{i-1}$ is set such that $y'_{i-1}=y_{i-1}$; and wherein the verifier:

(e) computes, from the public information $\{ID_i, I_i, f_i, h_i\}$, information $I_i$ corresponding to the identification $ID_i$ contained in $ID'_i$ in the received information $\{ID'_i, X'_i, m'_i, y_i\}$ and the one-way functions $f_i$ and $h_i$, and calculates $e_i$ and $d_i$ using the one-way functions $f_i$ and $h_i$ and the received pieces of information $X'_i$ and $m'_i$;

(f) calculates the information $X_i$ contained in the information $X'_i$, and computes $$Z'=V((X_i*d_i), (I_i*e_i)|i=1 \ldots, L)$$

with a function V containing calculations $(X_i*d_i)$ of $d_i$ and $X_i$ and $(I_i*e_i)$ of $e_i$ and $I_i$ for $i=1 \ldots, L$; and (g) computes $W=\Gamma(y_i*\beta)$ with a function $\Gamma$ containing a calculation $(y_i*\beta)$ of $y_i$ and $\beta$, then verifies the validity of the signatures by making a check to see if $W=Z'$, and if both values match each other, decides that the signatures are all valid.

According to a second aspect of the present invention, the value of the y-component, which is one of principal signature components, is accumulated for each signature generation processing to suppress an increase in the amount of data of the overall signature component, thereby setting up a superimposed-signature scheme applicable to the Fiat-Shamir and Schnorr schemes. While it is conventional that the exponential component in the verification processing is only the e-component used as an exponentiation component of I, the present invention newly introduces the d-component as a second exponentiation component for the exponentiation of X, and generates the e- and d-components taking into account the order of signers, thereby preventing an increase of the number of communications while at the same time providing security. According to a third aspect of the present invention, the value of the y-component, which is one of principal signature components, is accumulated for each signature generation processing to suppress an increase in the amount of data of the overall signature component, thereby setting up a multi-signature scheme applicable to the Fiat-Shamir and Schnorr schemes. While is conventional that the exponential component in the verification processing is only the e-component used as an exponentiation component of I, the present invention newly introduces the d-component as a second exponentiation component for the exponentiation of X, thereby preventing an increase of the number of communications while at the same time providing security.

According to a fourth aspect of the present invention, while it is conventional that the exponential component in the verification processing is only the e-component used as an exponentiation component of I, the d-component is newly introduced as a second exponentiation component for the exponentiation of X, thereby setting up a signature scheme that permits en-bloc signature verification and is applicable to the Fiat-Shamir and Schnorr schemes while at the same time provides security even if the value of the y-component, which is one of the principal signal components, is accumulated at the time of signature verification and only one verification equation is used.

BRIEF DESCRIPTION OF THE DRAWINGS

FIG. 22 is a table showing basic computation equations in the present invention in comparison with those in the RSA and Schnorr schemes to evaluate the present invention; and FIG. 23 is a table showing the required computational load in the present invention in comparison with those in the RSA and Schnorr schemes.

DETAILED DESCRIPTION OF THE PREFERRED EMBODIMENTS

Figure 1A:
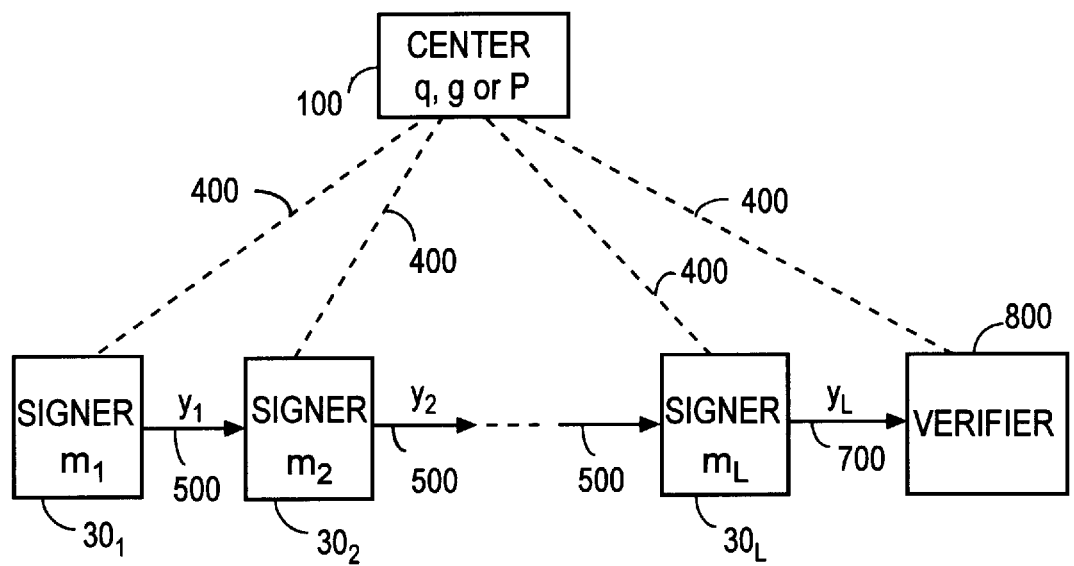
FIG. 1A is a block diagram illustrating the configuration of a system to which the superimposed- or multi-signature scheme and the en-bloc signature verification therefor according to the present invention.

The en-bloc signature system according to the present invention comprises a center apparatus (hereinafter referred to also as a center) 100, L (where L is an integer equal to or greater than 2) signer apparatuses (hereinafter referred to also as signers) $30_1, 30_2, \ldots, 30_L$ and a verifier apparatus (hereinafter referred to also as a verifier) 800 respectively connected to the center apparatus 100 via channels 400 of guaranteed security. The signer apparatuses $30_1, 30_2, \ldots, 30_L$ are sequentially connected via channels 500 of not guaranteed security. The L-th signer apparatus $30_L$ is connected to the verifier apparatus 800 via a channel 700 of not guaranteed security. In this system the signer $30_1$ attaches his signature to a document $m_1$ using a signature function $Sg_1$, then sends the signed document as signature information $y_1=Sg_1(m_1)$ to the next signer $30_2$, who in turn attaches his signature to a document $m_2$ and the received signature information $y_1$ using a signature function $Sg_2$ and sends them as signature information $y_1=Sg_2(m_1, y_1)$ to the signer $30_3$; the same processing is repeated for each subsequent signer. The last signer $30_L$ attaches his signature to a document $m_L$ and his received signature information $y_{L-1}$ using a signature function $Sg_L$, and sends them as signature information $y_L=Sg_L(m_L, y_{L-1})$ to the verifier apparatus 800. The signature processing like this is called a superimposed-signature scheme.

In this example, when only the first signer's document $m_1$ exists and the subsequent signers' documents $m_2, \ldots, m_L$ do not exist, the L signers sign the same document $m_1$ one after another—this is called a multi-signature scheme. At any rate, according to the present invention, the verifier 800 verifies the received signature information $y_L$ en bloc. When all the signatures are valid, their verification finishes with one round of processing, but when any one of the signatures is invalid, processing is performed to detect the unauthorized signer. For example, when the number of signers involved is $2^M$, they are divided into first and second half groups each consisting of $2^{M-1}$ signers, and signatures of $2^{M-1}$ signers of either one of the groups are verified in a lump. If an invalid signature is found, the $2^{M-2}$ of the first- or second-half group are verified en block; if no invalid signature is found, the signatures of the remaining $2^{M-1}$ or $2^{M-2}$ signers of the first- or second-half group are verified en bloc, followed by repeating the same processing. In this way, the unauthorized signature can be detected by M+1 rounds of verification processing.

Figure 1B:
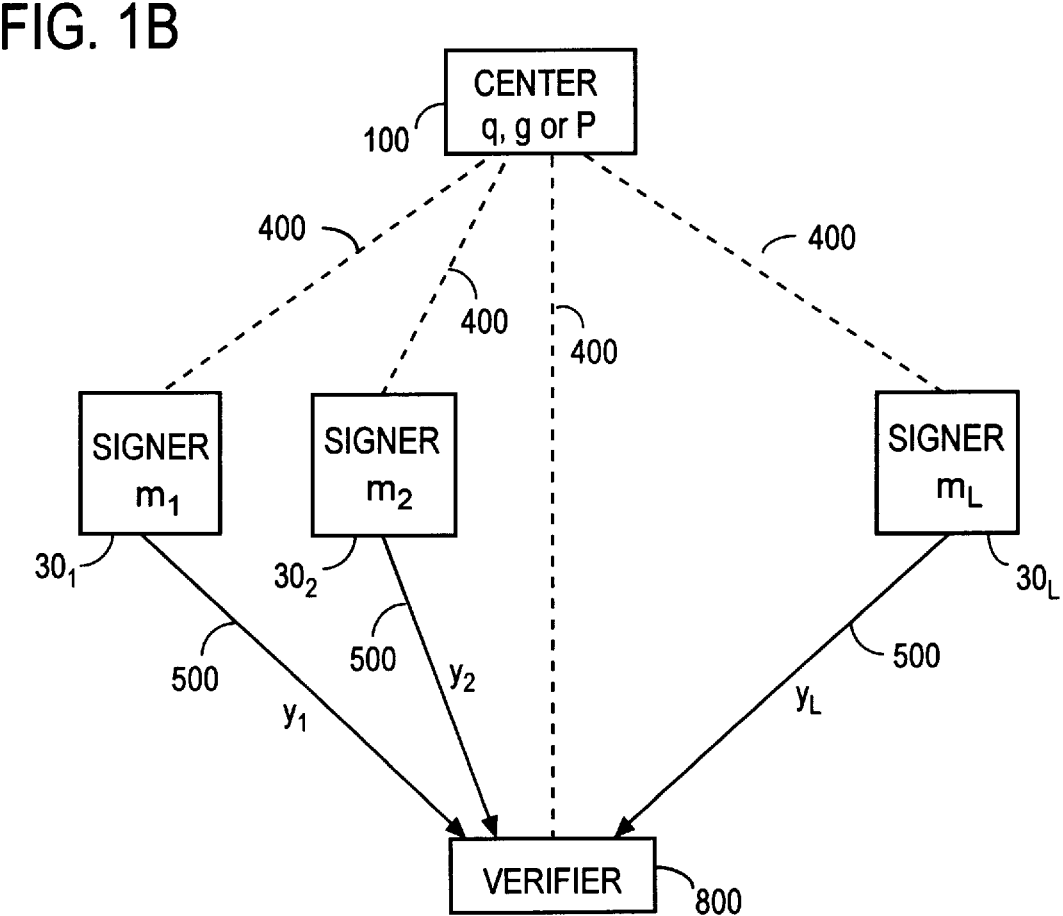
FIG. 1B is a block diagram illustrating the configuration of a system to which the individual-signature scheme and the en-bloc signature verification therefor according to the present invention.

In another system for carrying out the present invention, as shown in FIG. 1B, the center apparatus 100 is connected to the L signer apparatuses $30_1, 30_2, \ldots, 30_L$ and the verifier apparatus 800 via the channels 400 of guaranteed security as in the case of FIG. 1A. The signer apparatuses $30_1, 30_2, \ldots, 30_L$ are each connected directly to the verifier apparatus 800 via the channel 500 of not guaranteed security. In this system each signer attaches his signature to the document $m_1$ using a signature function $Sg_i$ and sends the signed document as signature information $y_i=Sg_i(m_i)$ to the verifier 800, who verifies en bloc the received signature information $y_i=Sg_i(m_i)$ where $i=1, \ldots, L$.

A description will be given of the principles of the methods for conducting en-bloc signature verification on signatures of a plurality of signers in the above two systems according to the present invention.

Step S1: The center 100 publishes (sends to all the signers and the verifier) public parameter information containing a parameter q for each signer to generate the signature function $Sg_i$ and a parameter $\beta=G_1(q)$ generated with a function $G_1$ using the parameter q.

Step S2: Each signer i generates a first random number $s_i$ as secret information and keeps it in a memory. Further, the signer i generates information $I_i=G_2(s_i, \beta)$ with a function $G_2$ using the public parameter $\beta$ and the first random number $s_i$ and registers the information $I_i$, two one-way functions $f_i$ and $h_i$ for use by the signer i and his identification information $ID_i$, as signer public information $\{ID_i, I_i, f_i, h_i\}$ at the center 100.

Step S3: The signer i generates a second random number $r_i$, and sets the parameter $\beta$ and the second random number $r_i$ in a function $\Phi$, generating information $X_i=\Phi(r_i, \beta)$. Information containing the information $X_i$ is set as $X'_i$.

Step S4: The signer i uses document information $m'_i$ containing a document $m_i$ to be signed and the information $X'_i$ to generate with the two one-way functions $f_i$ and $h_i$ $$e_i=f_i(X'_i, m'_i) \qquad (8)$$

$$d_i=h_i(X'_i, m'_i) \qquad (9)$$

Step S5: The signer i generates the following signature to information containing $e_i$, $d_i$, $s_i$, $r_i$ and $y'_{i-1}$ with the signature function $Sg_i$ $$y=Sg_i(e_i, d_i, s_i, r_i, y'_{i-1}) \qquad (10)$$

then sets information containing the identification information $ID_i$ as identification information $ID'_i$, and sends information $\{ID'_i, X'_i, m'_i, y_i\}$ individually or via the other signers to the verifier 800 as the last destination. In the case of sending individually to the verifier, $y'_{i-1}$ is set as an empty set, and in the case of sending via the other signers, $y'_{i-1}$ is set such that $y'_{i-1}=y_{i-1}$.

Step S6: The verifier 800 calculates from the public information $\{ID_i, I_i, f_i, h_i\}$ the information $I_i$ corresponding to the identification information $ID_i$ contained in $ID'_i$ in the received information $\{ID'_i, X'_i, m'_i, y_i\}$ and the two one-way functions $f_i$ and $h_i$, and calculates $e_i$ and $d_i$ using the one-way functions $f_i$ and $h_i$ of Eqs. (8) and (9) and the received pieces of information $X'_i$ and $m'_i$. Further, the verifier 800 extracts $X_i$ from the received information $X'_i$, then performs a calculation $d_i*X_i$ between $d_i$ and $X_i$ and a calculation $e_i*I_i$ between $e_i$ and $I_i$, and calculates the following value with respect to the results of the above calculations through the use of a function V.

$$Z'=V((X_i*d_i), (I_i*e_i)|i=1, \ldots, L) \qquad (11)$$

The calculation indicated by the symbol * can be done by an exponentiation, multiplication, or the like.

Step S7: Moreover, the verifier 800 sets the calculation result $y_i*\beta$ between $y_i$ and $\beta$ in a function $\Gamma$ to compute $W=\Gamma(y_i*\beta)$, then conducts a signature verification by making a check to see if W=Z', and if so, decides that the signatures are all valid.

In the case of conducting the en-bloc signature verification by the above-described method in the superimposed- or multi-signature system of FIG. 1A, set the information $y'_{i-1}=y_{i-1}$ and set the pieces of information $X'_i$, $m'_i$ and $ID'_i$ as follows:

$$X'_i=(X'_{i-1}, X_i) \tag{12}$$

$$m'_i=(m'_{i-1}, m_i) \tag{13}$$

$$ID'_i=(ID'_i, ID_{i-1}) \tag{14}$$

The signer i receives information $\{ID'_{i-1}, X'_{i-1}, m'_{i-1}, y_{i-1}\}$ from the preceding signer (i−1), then executes steps S3 through S5, and sends information $\{ID'_i, X'_i, m'_i, y_i\}$ to the next signer (i+1). the last signer executes steps S3 through S5 and sends information $\{ID'_L, X'_L, m'_L, y_L\}$ to the verifier 800.

In the above, setting $m'_1=m_1=m$ and $m_2=m_3=\ldots=m_L=$ "empty set," that is, setting $m'_2=m'_3=\ldots=m'_L=m$, the afore-mentioned multi-signature is obtained.

In the case of verifying signatures en bloc by following the procedures of the above-mentioned steps S1 through S7 in the individual-signature system of FIG. 1B, $y'_{i-1}$=empty set, $X'_i=X_i$, $m'_i=m_i$ and $ID'_i=ID_i$ are set, and the signer i sends the information $\{ID_i, X_i, m_i, y_i\}$, generated by steps S3, S4 and S5, directly to the verifier 800.

According to the present invention, as described above in connection with step S4, each signer generates the two pieces of information $e_i$ and $d_i$ using the two one-way functions $f_i$ and $h_i$, and generates the information $y_i$ containing these components, and the signature verification is conducted taking into account these two pieces of information $e_i$ and $d_i$. Hence, the verification can be conducted based on one round of circulation of information after signing by the signers 1 through L; furthermore, security is guaranteed. In contrast thereto, since the signature verification method by Schnorr described previously derives the signature y from the e-component and the random numbers r and s calculated using one one-way function f as indicated by Eqs. (3) and (4), the direct application of this method to the superimposed signature scheme will increase the amount of information $\{ID_i, X_i, y_i\}$ that is sent from each signer to the next one, inevitably increasing the amount of calculation to be processed by the verifier for signature verification.

Next, a description will be given of a concrete method for carrying out the above-described basic en-bloc signature verification scheme in the systems of FIGS. 1A and 1B and examples of each signer apparatus and the verifier apparatus for use therein.

EMBODIMENT 1

This embodiment concerns the applications of the superimposed-signature and en-bloc signature verification based on the principles of the present invention to the Schnorr schemes in the system of FIG. 1A. The idea of utilizing a second exponentiation component mentioned herein is also widely applicable to the Fiat-Shamir schemes and digital signature schemes utilizing interactive proofs including the Fiat-Shamir schemes. Examples of the interactive proofs including the Fiat-Shamir schemes or the like are described in the aforementioned literature by Tompa and woll.

At the time of its subscription to the system each signer apparatus $30_i$ (where i=1, ..., L) generates secret information si and public information, and registers public information (ID, I) with a public information management file of the center apparatus 100. The center apparatus 100 sends the public information to the signer apparatuses $30_1, \ldots, 30_L$ and the verifier 800 as required.

A description will be given first of initial information setting processing by the center apparatus 100 at the time of starting the system (see FIG. 2). This processing is intended to publish a unique value $\{p, q, g\}$ of the system.

(1-A) Initial Information Setting Processing (by the center apparatus at the time of starting the system)

Step S1: The center apparatus 100 generates a prime p by a prime generator 110 and a prime q, which is a measure of p−1, by a divider 120.

Step S2: the center apparatus 100 generates a primitive element α of $(Z/pZ)^*$ by a primitive element generator 130 and an integer g of an order q by the following calculation, using a modular exponentiator 140.

$$g=\alpha^{(p-1)/q} \bmod p \tag{15}$$

The right-hand side of Eq. (15) represents the aforementioned function $G_1$ and g on the right-hand side corresponds to β.

Step S3: The public information $\{p, q, g\}$ is sent to the signer apparatuses $30_1, \ldots, 30_L$ and the verifier apparatus 800 via the secure communication lines 400.

(1-B) Processing by the Signer i Apparatus for its Subscription to the System

Figure 3:
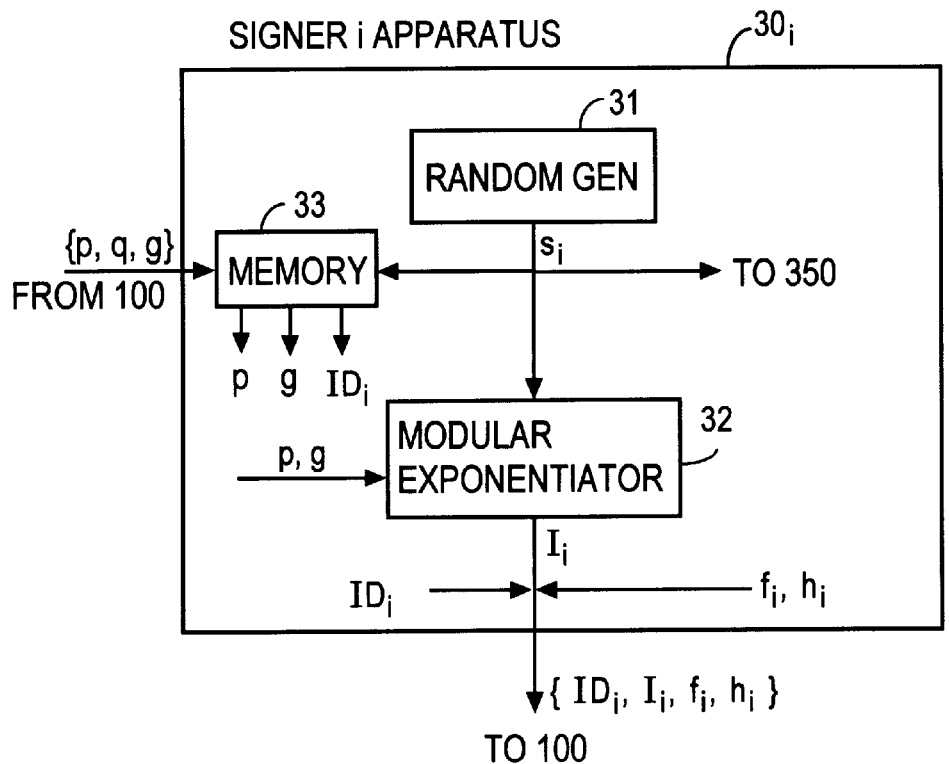
FIG. 3 is a block diagram depicting that functional configuration of a signer i apparatus $30_i$ apparatus in FIG. 1A which is associated with a process for its system subscription.

Next, a description will be given of processing that the signer i performs when it subscribes to the system (see FIG. 3 showing the signer i apparatus $30_i$). In the memory 33 of each signer apparatus $30_i$ is stored the public information $\{p, q, g\}$ received from the center 100.

Step S4: The signer i generates the random number $s_i$ by a random generator 31 and inputs it into a modular exponentiator 32, together with the pieces of public information g and p, wherein the public information $I_i$ is computed by $$I_i=g^{si} \bmod p \tag{16}$$

The right-hand side of Eq. (16) represents the aforementioned function $G_2$.

Step S5: The signer i apparatus sends the identification information $ID_i$, the public information I, and the one-way functions $f_i$ and $h_i$ via the secure line 400 to the center apparatus 100 for registering them as public information $\{ID_i, I_i, f_i, h_i\}$. The signer i apparatus holds the random number $s_i$ as secret information in a memory 33.

Other signer apparatuses also perform the same processing when they subscribe to the system. The center apparatus 100 provides the public information $(ID_i, I_i, f_i, h_i)$ (where i=1, 2, ..., L) to the verifier apparatus 800 by some means, for example, in the form of a public file.

In the following description the signed version of the document $m'_i$, which is provided from the signer i apparatus, will be identified by $\{ID'_i, X'_i, m'_i, y_i\}$. Now, a description will be given of the case where the signer (i−1) apparatus sends the message to be signed and the signer i apparatus attaches its signature to the message and sends the signed message to the next signer (i+1) apparatus. When L signers generate superimposed signature, it is sufficient only to increase i one by one from 1 to L and repeat the following procedure. In this case, the signer (L+1) apparatus is regarded as the verifier apparatus; $ID'_0$=empty set, $X'_0$= empty set and $y_0$=0.

(1-C) Processing of the Signer i Apparatus for Signature Generation

Figure 4:
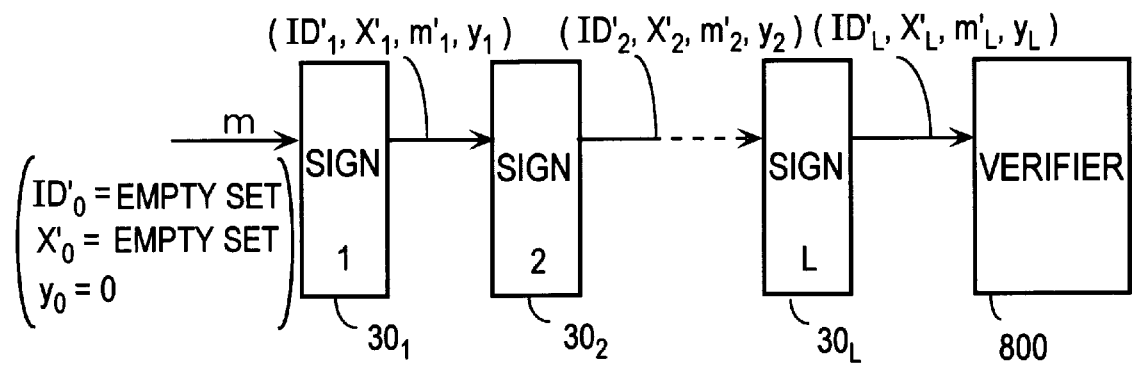
FIG. 4 is a diagram depicting an interaction sequence of information with superimposed signatures.
Figure 5:
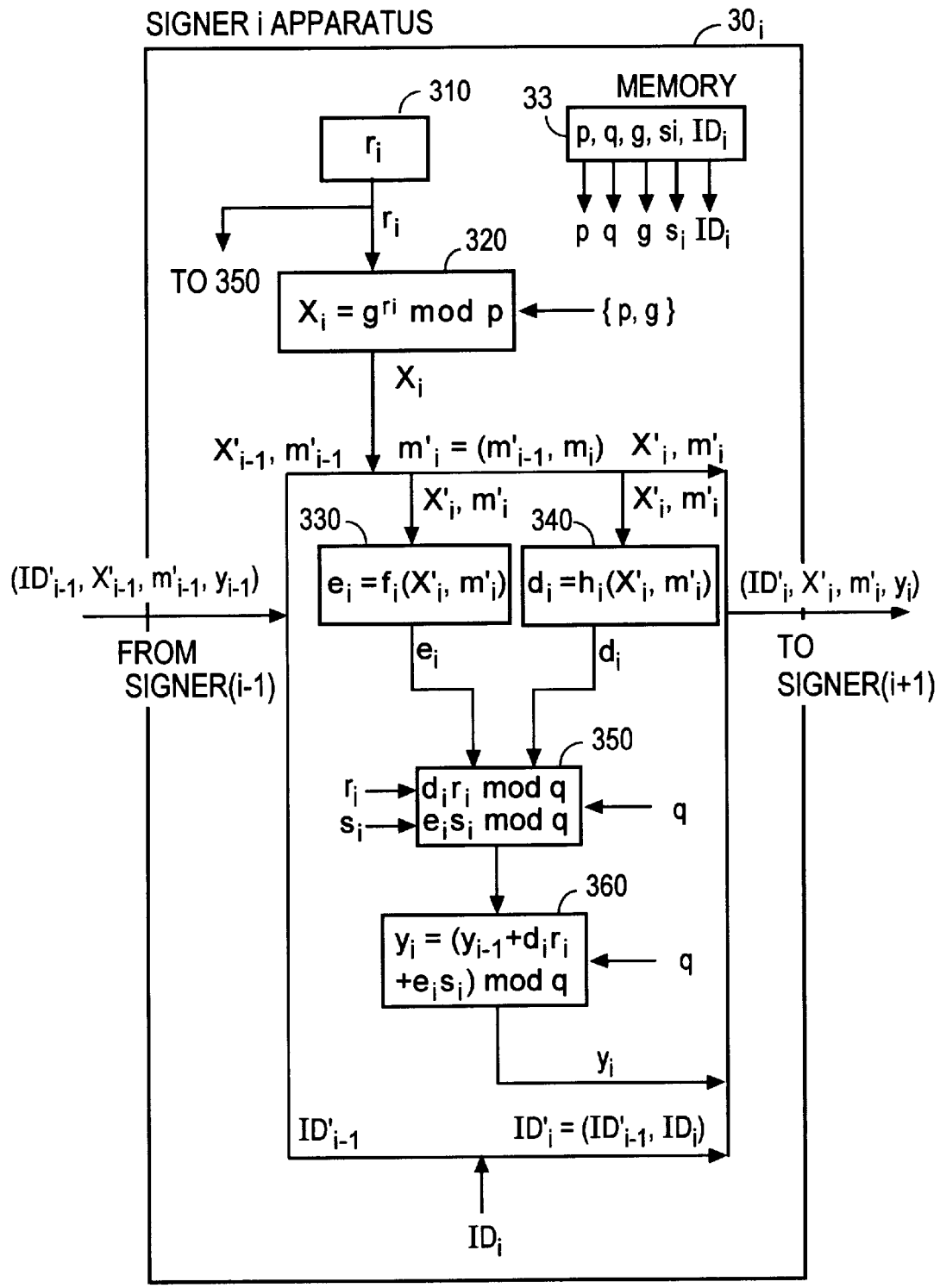
FIG. 5 is a block diagram depicting that functional configuration of the signer i apparatus $30_i$ in FIG. 1A which is associated with processing for signature generation.

FIG. 4 shows an interaction sequence of a message and FIG. 5 the functional configuration of the signer i apparatus.

When receiving a message $\{ID'_{i-1}, X'_{i-1}, m'_{i-1}, y_{i-1}\}$ from the signer (i−1) apparatus, the signer i apparatus performs the signature generation processing described below.

Step S6: The signer i generates the random number $r_i$ by a random generator 310 and inputs it into amodular exponentiator 320 which calculates the function Φ, together with the pieces of public information $\{p, g\}$ stored in the memory 33, and wherein $X_i$ is calculated by $$X_i = \Phi(r_i, g) = g^{r_i} \bmod p \tag{17}$$

Step S7: The signer i uses a function $f_i$ calculator 330 and a function $h_i$ calculator 340 to calculate two pieces of information $e_i$ and $d_i$ by $$e_i = f_i(X'_i, m'_i) \tag{18}$$

$$d_i = h_i(X'_i, m'_i) \tag{19}$$

In this case, $X'_i = (X'_{i-1}, X_i)$ or $m'_i = (m'_{i-1}, m_i)$, where $m_i$ is the document to be signed by the signer i.

Step S8: The signer i inputs these pieces of information $e_i$, $d_i$ and the random number $r_i$ into a modular exponentiator 350 and then into a modular adder 360, together with the public information q and the secret information $s_i$, generating the signature $$y_i = (y_{i-1} + d_i r_i + e_i s_i) \bmod q \tag{20}$$

The right-hand side of Eq. (20) represents the signature function $Sg_i$ in Eq. (10).

Step S9: The signer i apparatus sets $ID'_i = (ID'_{i-1}, ID_i)$, and sends information $\{ID'_i, X'_i, m'_i, y_i\}$ to the next signer (i+1) apparatus.

(1-D) Process of the Verifier Apparatus 800 for Signature Verification

Figure 6:
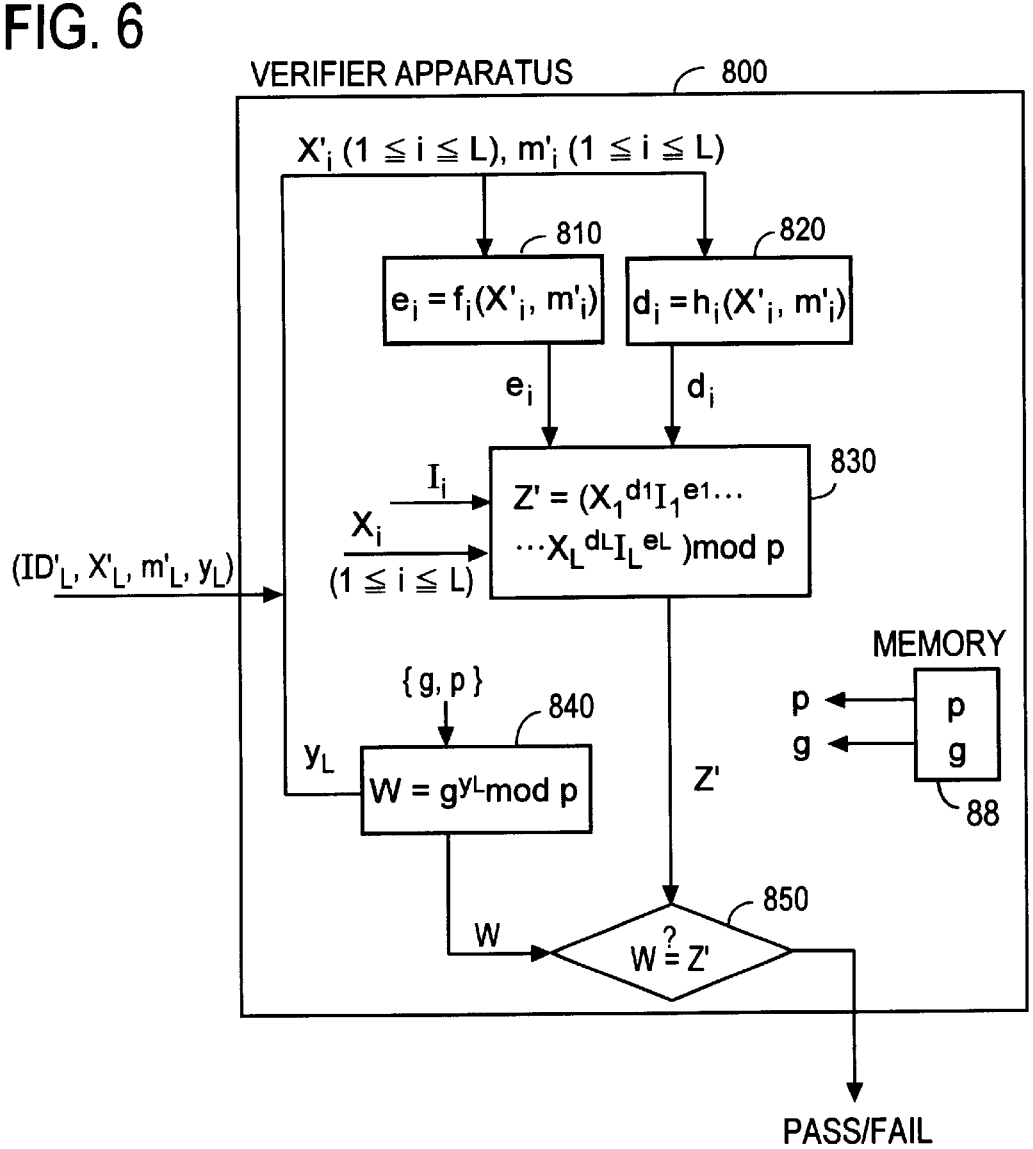
FIG. 6 is a block diagram depicting that functional configuration of a verifier apparatus 800 in FIG. 1A which is associated with processing for signature verification.

FIG. 6 depicts the functional configuration of the verifier apparatus 800. When receiving the message $\{ID'_L, X'_L, m'_L, y_L\}$ from the signer L apparatus, the verifier apparatus 800 verifies the validity of each signature by the processing described below.

Step S10: The one-way functions $f_i$ and $h_i$ contained in the public information $\{ID_i, I_i, f_i, h_i\}$ provided from the center apparatus 100 are set in one-way function calculators 810 and 820, respectively. The first i components of the information $X'_L$ are used to form $X'_i$ and the first i components of the information $m'_L$ are used to form $m'_i$. These pieces of information $X'_i$ and $m'_i$ thus obtained are set in the function $f_i$ calculator 810 and the function $h_i$ calculator 820, wherein the components $e_i$ and $d_i$ (where $1 \leq i \leq L$) are calculated by $$e_i = f_i(X'_i, m'_i) = f_i(X_1, X_2, \ldots, X_i, \{m_1, m_2, \ldots, m_i\}) \tag{21}$$

$$d_i = h_i(X'_i, m'_i) = h_i(X_1, X_2, \ldots, X_i, \{m_1, m_2, \ldots, m_i\}) \tag{22}$$

Step S11: The information $I_i$ is derived from the public information $\{ID_i, T_i, f_i, h_i\}$ (where i=1, 2, . . . , L) provided from the center apparatus 100, and the information $X_i$ is also derived from the information $X'_L$. These pieces of information $I_i$ and $X_i$ are input into a multi-component modular exponentiator 830, together with the components $e_i$ and $d_i$ and the public information p, wherein Z' is calculated by $$Z' = X_1^{d_1} I_1^{e_1} \ldots X_L^{d_L} I_L^{e_L} \bmod p \tag{23}$$

The right-hand side of Eq. (23) corresponds to the function $V((X_i * d_i), (I_i * e_i)|i=1, \ldots, L)$ referred to previously in connection with the principles of the present invention.

Step S12: The information $y_L$ and the pieces of public information p and g stored in the memory 88 are input into a modular exponentiator 840 to calculate W by $$W = g^{y_L} \bmod p \tag{24}$$

Step S13: Z' and W are input into a comparator 850, wherein they are compared to make sure that $$W = Z' \tag{25}$$

If they match each other, it is considered that the documents $(m_1, \ldots, m_L)$ have been duly signed by the L authorized signer i apparatuses, respectively.

(1-E) Improved Square-and-Multiply Algorithm for Multiple Components

A description will be given below of an improved square-and-multiply algorithm for the calculation of Eq. (23) by the multi-component modular exponentiator 830, such as a multi-component modular exponentiation as expressed by $x^a y^b \bmod N$.

Step 1: z=1

Step 2: The following processing is carried out for the suffix i=0, 1, . . . , |a|−1 (where |a| represents the number of bits of a.

$$\text{Step 2-1: } z = z^2 \bmod N \tag{26}$$

Step 2—2: If $(a_i, b_i) = (1, 0)$, $z = zx \bmod N$ (27)

If $(a_i, b_i) = (0, 1)$, $z = zy \bmod N$ (28)

If $(a_i, b_i) = (1, 1)$, $z = z(xy) \bmod N$ (29)

where $a_i$ is the value, 0 or 1, of an i-th bit, ditto for $b_i$.

Step 3: z is output.

By using the above algorithm with $x = X_i$, $a = d_i$, $y = I_i$, $b = e_i$ and N=p, it is possible to obtain $Z_1 Z_2 \bmod p$ (where $Z_1 = X_i^{d_i} I_i^{e_i} \bmod p$).

Taking into account the way of generating $y_L$, $$g^{y_L} \equiv g^{y_{L-1}} (g^{r_L})^{d_L} (g^{s_L})^{e_L} \equiv \tag{30}$$

$$g^{y_{L-1}} X_L^{d_L} I_L^{e_L} \equiv \cdots \equiv X_1^{d_1} I_1^{e_1} \cdots X_L^{d_L} I_L^{e_L} (\bmod p)$$

Hence, when the documents $\{m_1, \ldots, m_L\}$ pass the above said test by the comparator 850, the verifier apparatus 800 accepts the documents as having been duly signed by the L authorized or valid signers.

A method for implementing the multi-component square-and-multiply algorithm with higher efficiency is described, for example, in D. E. Knuth, "The Art of Computer Programming, Vol. 2, Seminumerical Algorithms," Addison-Wesley Publishing, (1981), P. 456, Exercises 27 and 35.

According to the method proposed in the above literature, if s is set as the unit of storage for storing results of a precalculation in a table (s=2 in the above-described multi-component square-and-multiply algorithm), the number of multiplications (including modular p calculations) becomes as follows:

$$(2^s - s - 1) \lceil (2L+1)/s \rceil + \lceil (2L+1)/s \rceil |q| - 1 + |q| - 1$$

where $\lceil b/a \rceil$ represents the minimum integer greater than b/a.

It is also possible to configure the system such that the signer i apparatus $30_i$ makes a check, prior to its signature generation, to see if its received message $\{ID'_{i-1}, X'_{i-1}, m'_{i-1}, y_{i-1}\}$ has been duly signed by the preceding signer i through (i−1) apparatuses and, if so, attaches its signature to the verified message. In this instance, the center 100 provides the public information ($ID_i$, $I_i$, $f_i$, $h_i$) on i=1, ..., (i−1) to the signer i in advance, and the verification may be conducted in the same fashion as in steps 10 through 13 in the verifier apparatus 800. In this case, L in steps S10 through S13 is replaced with (i−1).

The signer apparatuses and the verifier apparatus usually perform the above-described processing by means of computers.

As referred to previously, the present invention is applicable not only to the Schnorr schemes but also to the Fiat-Shamir schemes and digital signature schemes utilizing the interactive proofs including the Fiat-Shamir schemes. Accordingly, the method of the present invention may be summarized in general as follows:

That is, the system parameters that are published are p for specifying the number of elements of the group, an element g of the group with which a group calculation starts, and a positive integer q such that when the element g is calculated q times, the calculation returns to the element g.

The signer i apparatus:

generates the random number $s_i$ by the random generator at the time of its subscription to the system, and inputs the random number $s_i$ and the pieces of public information g and p into a group calculator, wherein the element g is calculated $s_i$ times to compute the public information $I_i$; and publishes the public information $I_i$ and the one-way functions $f_i$ and $h_i$ together with the identification information $ID_i$ but holds the random number $s_i$ as secret information.

In the signature generation processing, upon receiving from the signer (i−1) apparatus the signed message $\{ID'_{i-1}, X'_{i-1}, m'_{i-1}, y_{i-1}\}$ based on the message $m_{i-1}$, the signer i apparatus:

generates the random number $r_i$ using the random generator, then inputs it into the group calculator together with the pieces of public information p and g to calculate the element g $r_i$ times to obtain the information $X_i$, and sets $X'_i=(X'_{i-1}, X_i)$ and $m'_i=(m'_i, m_i)$;

calculates the components $e_i$ and $d_i$ by $e_i=f^i(X'_i, m'_i)$ $d_i=h_i(X'_i, m'_i)$ through the use of the function $f_i$ calculator and the function $h_i$ calculator; and inputs the pieces of information $e_i$, $d_i$ and $r_i$ into an exponential component multiplier and an exponential component adder together with the public information q and the secret information $s_i$, wherein $y_i$ is calculated with the signature function $Sg_i$ by $y_i=(y_{i-1}+d_i\ r_i+e_i\ s_i)$ mod q then sets $ID'_i=(ID'_{i-1}, ID_i)$, and send the message $\{ID'I_i, X'_i, m'_i, y_i\}$ to the next signer (i+1) apparatus.

On the other hand, when receiving the message $\{ID'_L, X'_L, m'_L, y_L\}$ from the signer L apparatus, the verifier apparatus forms $X'_i$ by the first i components of the information $X'_L$ and $m'_i$ by the first i components of the information $m'_L$, then inputs these pieces of information $X'_i$ and $m'_i$ into the function $f_i$ calculator and the function $h_i$ calculator, respectively, wherein $e_i=f_i(X'_i, m'_i)$ $d_i=h_i(X'_i, m'_i)$ are calculated to obtain the components e, and d, for each i (where $1 \leq i \leq L$), then derives the corresponding public information $I_i$ from the $ID_i$ component in the information $ID'_L$ and the information $X_i$ from the $X'_L$ component, and inputs these pieces of information $I_i$ and $X_i$ and the above-mentioned components $e_i$ and $d_i$ and the public information p into the multi-component group calculator, wherein Z' is obtained by sequentially calculating $X_i$ $d_i$ times and $T_i$ $e_i$ times for i's from 1 to L;

inputs $y_L$ and the pieces of public information p and g into the group calculator to calculate g $y_L$ times, thereby obtain W; and inputs Z' and W into the comparator to make a check to see if W=Z' and if they match each other, recognizes that the document $\{m_1, \ldots, m_L\}$ has been duly signed by L authorized signer i apparatuses.

In this typical scheme, too, each signer i apparatus, a user apparatus and a recording medium are similarly constructed.

While in the above $ID'_i=(ID'_{i-1}, ID_i)$, it is also possible to set that $ID'_i=(ID'_{i-1}, I_i)$. This will save the verifier apparatus the trouble of searching the identification information $ID_i$ for the public information

EMBODIMENT 2

In the superimposed-signature scheme and the en-bloc signature verification therefor described previously with reference to FIGS. 2 through 6, when the document $m_1$ to be signed by the signature apparatus $30_1$ is set at m and the documents m2, ..., mL in the signer apparatuses $30_2$ through $30_L$ are all made empty, the signers 1 through L will sign the document m on the multi-signature basis. An embodiment in this case will be described below. This embodiment will be described to use the Schnorr scheme.

Figure 2:
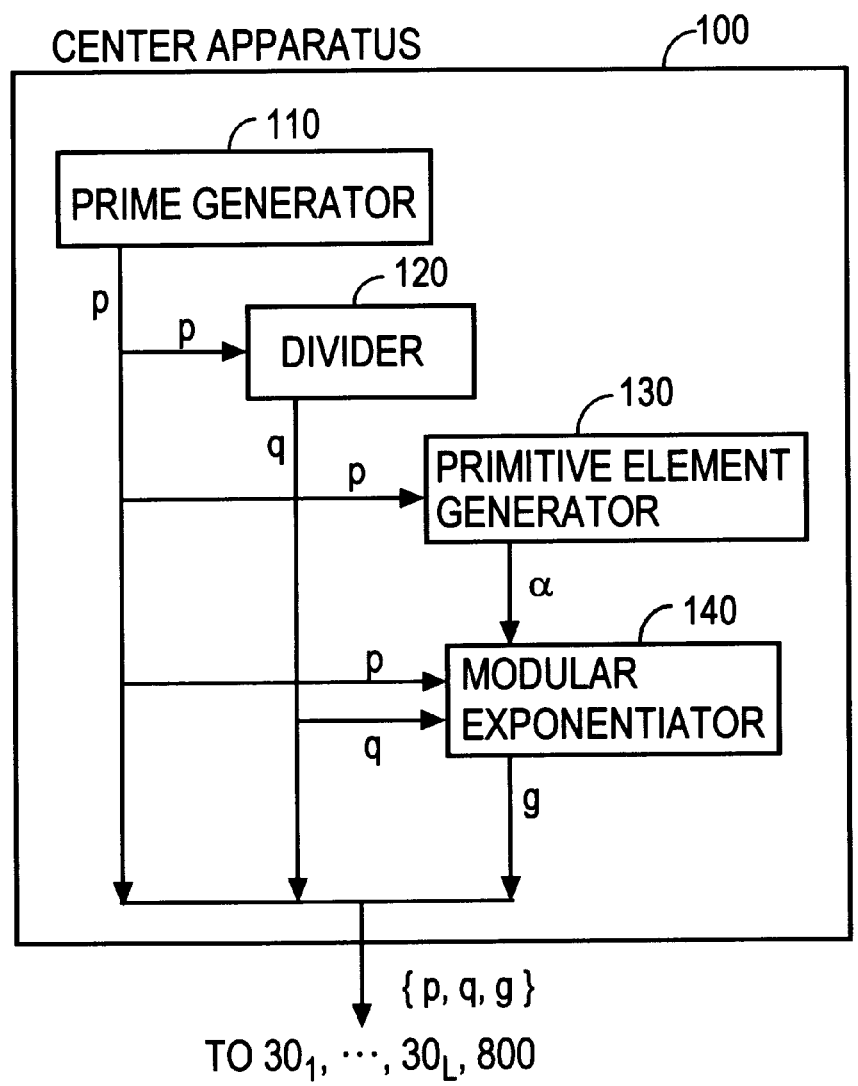
FIG. 2 is a block diagram depicting that functional configuration of a center apparatus 100 in FIG. 1A or 1B which is associated with processing for initial information setting.

The system configuration of this embodiment is the same as depicted in FIG. 1A, and the center apparatus 100 is also identical in construction with that shown in FIG. 2. Moreover, the center apparatus 100 performs exactly the same processing as in the first embodiment, and generates public information {p, q, g} by the initial information setting processing and provides it to the signer apparatuses $30_1$ through $30_L$ and the verifier apparatus 800.

The processing for the signer i to subscribe to the system is also the same as in the case of the first embodiment, and the apparatus $30_1$ therefor is also the same as that shown in FIG. 3. The signer i generates the public information $I_i$ by this processing, and sends it and the one-way functions $f_i$ and $h_i$ and the identification information $ID_i$ via the secure communication channel 400 to the center apparatus 100 for registration therewith as the public information $\{ID_i, I_i, f_i, h_i\}$. At the same time, the signer i holds $s_i$ as secret information in the memory 33.

Other signer apparatuses also perform the same processing as mentioned above when they subscribe to the system.

In this embodiment, the signed message of the document m, which is output from the signer i apparatus, is represented by $\{ID'_i, X'i, m, y_i\}$. The signer (i−1) apparatus sends the message to be signed, and the signer i apparatus generates and attaches its signature to the message and sends the signed message to the next signer (i+1) apparatus. When L signers sequentially sign the message, i is increased one by one from 1 to L and the following procedure is repeated. In this embodiment, the signer (L+1) apparatus is regarded as a verifier apparatus. In this case, $ID'_0$=empty set, $X'_0$=empty set and $y_0$=0.

(2-A) Processing of the Signer i Apparatus for Signature Generation

Figure 7:
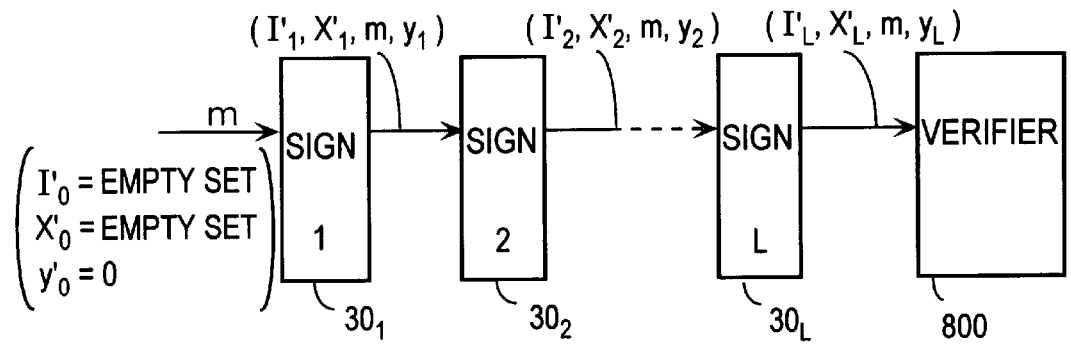
FIG. 7 is a diagram depicting an interaction sequence of information with multiple signatures.
Figure 8:
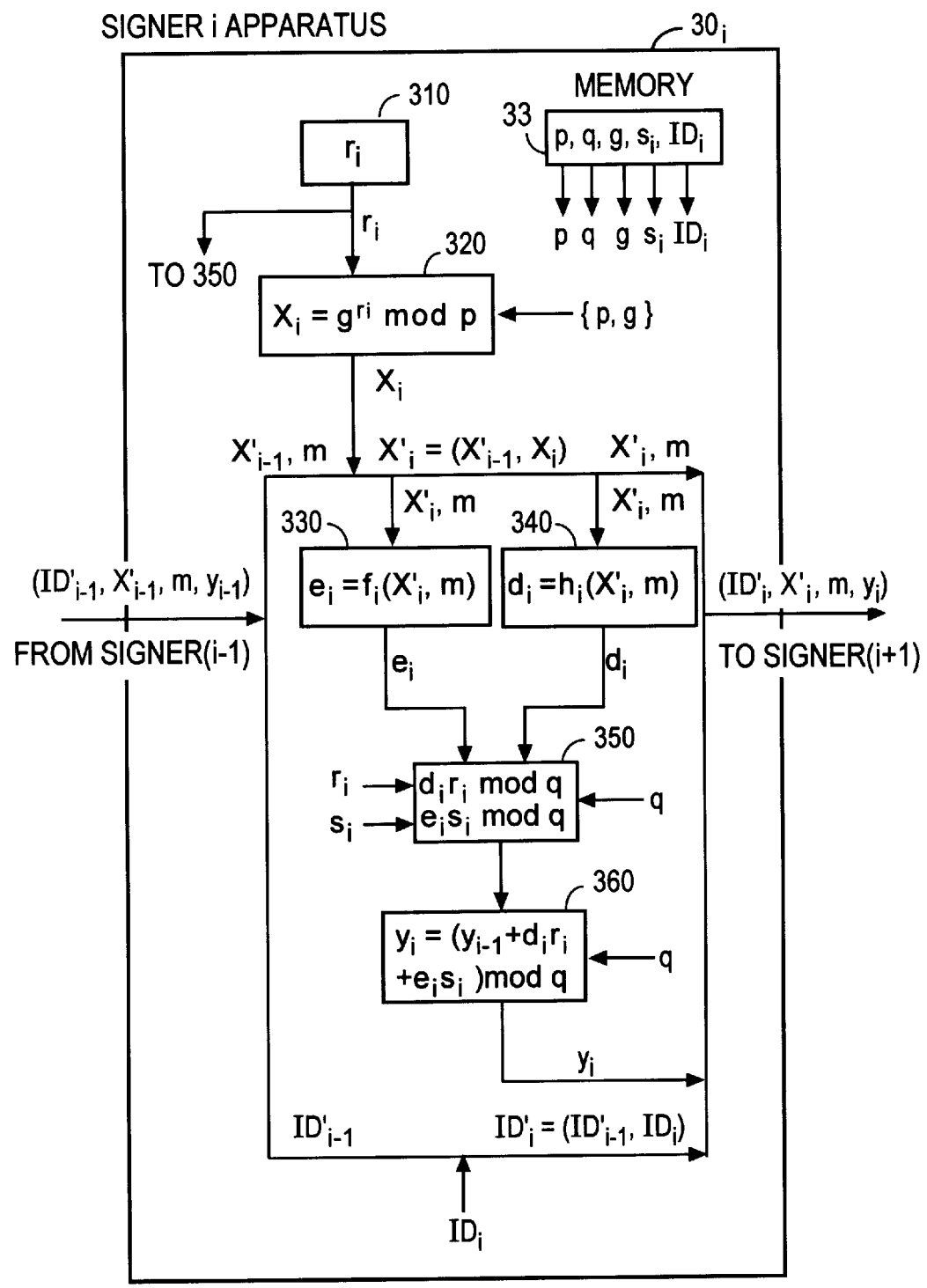
FIG. 8 is a block diagram depicting that functional configuration of the signer i apparatus $30_i$ in FIG. 1A which is associated with processing for signature generation in the multi-signature scheme.

FIG. 7 depicts an interaction sequence of a message and FIG. 8 the functional configuration of the signer i apparatus. Upon receiving the message $\{ID'_{i-1}, X'_{i-1}, m, y_{i-1}\}$ from the signer (i−1) apparatus, the signer i apparatus carries out the following signature generation processing. In the memory 33 are stored the public information $\{p, q, g\}$ received from the center 100, the secret random number $s_i$ and the identification information $ID_i$.

Step S1: The signer i generates the random number $r_i$ by the random generator 310 and inputs it into the modular exponentiator 320, together with the pieces of public information p and g, wherein $X_i$ is calculated using the function $\Phi$ by $$X_i = \Phi(r_i, g) = g^{r_i} \bmod p \quad (31)$$

Step S2: The signer i uses the function $f_i$ calculator 330 and the function $h_i$ calculator 340 to calculate the two pieces of information $e_i$ and $d_i$ by $$e_i = f_i(X'_i, m) \quad (32)$$

$$d_i = h_i(X'_i, m) \quad (33)$$

where $X'_i = (X'_{i-1}, X_i)$.

Step S3: The signer i inputs these pieces of information $e_i$, $d_i$, and $r_i$ into the modular exponentiator 350 and then into the modular adder 360, together with the public information q and the secret information $s_i$, thereby generating $y_i$ with the signature function $Sg_i$ as follows:

$$y_i = Sg_i(e_i, d_i, s_i, r_i, y_{i-1}) = (y_{i-1} + d_i r_i + e_i s_i) \bmod q \quad (34)$$

Step S4: The signer i apparatus sets $ID'_i = (ID'_{i-1}, ID_i)$, and sends the message $\{ID'_i, X'_i, m, y_i\}$ to the next signer (i+1) apparatus.

(2-B) Process of the Verifier Apparatus 800 for Signature Verification

Figure 9:
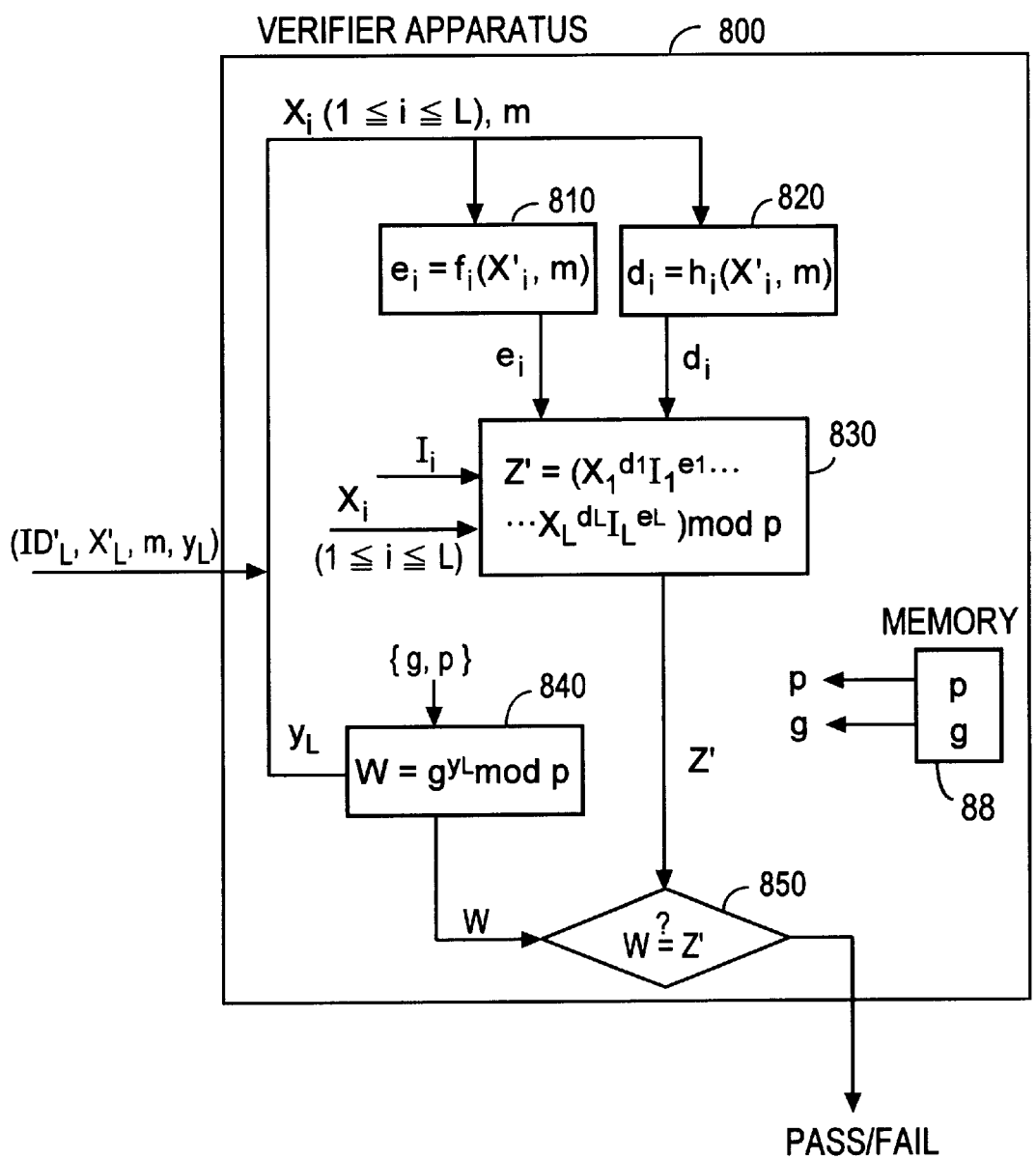
FIG. 9 is a block diagram depicting that functional configuration of the verifier apparatus 800 in FIG. 1A which is associated with processing for signature verification in the multi-signature scheme.

FIG. 9 depicts the functional configuration of the verifier apparatus 800. When receiving the message $\{ID'_L, X'_L, m, y_L\}$ from the signer L apparatus, the verifier apparatus 800 verifies the validity of each signature by the processing described below.

Step S5: The verifier apparatus 800 forms X'i by the first i components of the information $X'_L$, and inputs it and the document m into the function $f_i$ calculator 810 and the function $h_i$ calculator 820, wherein the components $e_i$ and $d_i$ (where $1 \leq i \leq L$) are calculated by $$e_i = f_i(X'_i, m) = f_i(X_1, \ldots, X_i, m) \quad (35)$$

$$d_i = h_i(X'_i, m) = h_i(X_1, \ldots, X_i, m) \quad (36)$$

Step S6: The verifier apparatus 800 derives information $I_i$ from the $ID_i$ component in the information $ID'_L$ and extracts the $X_i$ component in the information $X'_L$, and input these components into the multi-component modular exponentiator 830, together with the components $e_i$ and $d_i$ and the public information p, wherein Z' is calculated with the verification function V by $$Z' = V(X_i * d_i), (I_i * e_i) \mid i = 1, \cdots, L) \quad (37)$$

$$= X_1^{d_1} I_1^{e_1} \cdots X_L^{d_L} I_L^{e_L} \bmod p$$

Step S7: The verifier apparatus 800 inputs the information $y_L$, together with the public information $\{p, g\}$ stored in the memory 88, into the modular exponentiator 840 to calculate W with the function $\Gamma$ by $$W = \Gamma(y_L * g) = g^{y_L} \bmod p \quad (38)$$

Step S8: The verifier apparatus 800 inputs Z' and W into a comparator 850, wherein they are compared to see if

W=Z'

If they match each other, it is considered that the document m has been duly signed by the L authorized signer i apparatuses.

An improved square-and-multiply algorithm for calculating xayb mod N in the multi-component modular exponentiator may be the same as that described previously in connection with the first embodiment.

Taking into account the way of generating $y_L$, $$g^{y_L} \equiv g^{y_{L-1}} (g^{r_L})^{d_L} (g^{s_L})^{e_L} \equiv$$

$$g^{y_{L-1}} X_L^{d_L} I_L^{e_L} \equiv \cdots \equiv X_1^{d_1} I_1^{e_1} \cdots X_L^{d_L} I_L^{e_L} (\bmod p)$$

Hence, when the document m passes the abovesaid test by the comparator 850, the verifier apparatus 800 accepts the document m as having been duly signed by the L authorized signers.

It is also possible to configure the system such that the signer i apparatus $30_i$ makes a check, prior to its signature generation, to see if its received message $\{ID'_{i-1}, X'_{i-1}, m, y_{i-1}\}$ has been duly signed by the preceding signer i through (i−1) apparatuses and, if so, attaches its signature to the verified message. In this instance, the verification may be conducted in the same fashion as in steps 10 through 13 in the verifier apparatus 800. In this case, L in steps S10 through S13 is replaced with (i−1).

The signer apparatuses and the verifier apparatus usually perform the above-described processing by means of computers.

As referred to previously, this second embodiment is applicable not only to the Schnorr schemes but also to the Fiat-Shamir schemes and digital signature schemes utilizing the interactive proofs including the Fiat-Shamir schemes. Accordingly, the method of the present invention may be summarized in general as follows:

That is, the system parameters that are published are p for specifying the number of elements of the group, an element g of the group with which a group calculation starts, and a positive integer q such that when the element g is calculated q times, the calculation returns to the element g.

The signer i apparatus:
  generates the random number $s_i$ by the random generator at the time of its subscription to the system, and inputs the random number $s_i$ and the pieces of public information g and p into the group calculator, wherein the element g is calculated $s_i$ times to compute the public information $I_i$; and
  publishes the public information $I_i$ and the one-way functions $f_i$ and $h_i$ together with the identification information $ID_i$ but holds the random number $s_i$ as secret information.

In the signature generation processing, upon receiving from the signer (i−1) apparatus the signed message $\{ID'_{i-1}, X'_{i-1}, m, y_{i-1}\}$ based on the message m, the signer i apparatus:
  generates the random number $r_i$ by the random generator, then inputs it into the group calculator together with the pieces of public information p and g to calculate the information g $r_i$ times to obtain the information $X_i$, and sets $X'_i = (X'_{i-1}, X_i)$;

calculates the components $e_i$ and $d_i$ by $e_i = f_i(X'_i, m)$ $d_i = h_i(X'_i, m)$ through the use of the function $f_i$ calculator and the function $h_i$ calculator; and inputs the pieces of information $e_i$, $d_i$ and $r_i$ into an exponential component multiplier and an exponential component adder together with the public information q and the secret information $s_i$, wherein $y_i$ is calculated with the signature function $Sg_i$ by $$y_i = Sg_i(e_i, d_i, s_i, r_i, y_{i-1}) = (y_{i-1} + d_i r_i + e_i s_i) \bmod q$$

then sets $ID'_i = (ID'_{i-1}, ID_i)$, and sends the message $\{ID'_i, X'_i, m, y_i\}$ to the next signer (i+1) apparatus.

On the other hand, when receiving the message $\{ID'_L, X'_L, m, y_L\}$ from the signer L apparatus, the verifier apparatus 800 forms $X'_i$ by the first i components of the information $X'_L$, then inputs it into the function $f_i$ calculator and the function $h_i$ calculator, respectively, wherein $e_i = f_i(X'_i, m)$ $d_i = h_i(X'_i, m)$ are calculated to obtain the components $e_i$ and $d_i$ for each i (where $1 \leq i \leq L$), then derives the corresponding public information $I_i$ from the $ID_i$ component in the information $ID'_L$ and the information $X_i$ from the $X'_L$ component, and inputs these pieces of information $I_i$ and $X_i$ and the above-mentioned components $e_i$ and $d_i$ and the public information p into the multi-component group calculator, wherein $Z'$ is obtained by sequentially calculating $X_i$ $d_i$ times and $T_i$ $e_i$ times for i's from 1 to L;

inputs $y_L$ and the pieces of public information p and g into the group calculator to calculate g $y_L$ times, thereby obtain W; and inputs $Z'$ and W into the comparator to make a check to see if $W = Z'$ and if they match each other, recognizes that the document m has been duly signed by L authorized signer i apparatuses.

In this typical scheme, too, each signer i apparatus, a user apparatus and a recording medium are similarly constructed.

While in the above $ID'_i = (ID'_{i-1}, ID_i)$, it is also possible to set that $ID'_i = (ID'_{i-1}, I_i)$. This will save the verifier apparatus the trouble of searching the identification information $ID_i$ for the public information $I_i$.

EMBODIMENT 3

Next, an embodiment in which, in the system of FIG. 1B, the signer apparatuses $30_1$ through $30_L$ individually attach their signatures to respective documents $m_1$ through $m_L$ and provide them to the verifier apparatus 800 for verifying the signed documents en bloc will be described in connection with the case of employing the Schnorr scheme. The idea of utilizing the second exponentiation component, described below, is also widely applicable to the Fiat-Shamir schemes and digital signature schemes that utilizes interactive proofs including them.

(3-A) Initial Information Setting Processing

The center apparatus 100 is common to that of FIG. 2 in the configuration for the initial information setting processing to publish the value $\{p, q, g\}$ unique to the system, and the following processing therefor is also the same as in the case of FIG. 2.

Step S1: The center apparatus 100 generates the prime p by the prime generator 110 and a prime q, which is a measure of p−1, by the divider 120.

Step S2: The center apparatus 100 generates the primitive element $\alpha$ of $(Z/pZ)^*$ by the primitive element generator 130 and the integer g of the order q as the aforementioned parameter $\beta$ by the following calculation, using the modular exponentiator 140 that computes the function $G_1$ described previously in connection with the principles of the present invention.

$$\beta = g = G_1(q) = \alpha^{(p-1)/q} \bmod p \tag{40}$$

Step S3: The public information $\{p, q, g\}$ is sent to the signer apparatuses $30_1, \ldots, 30_L$ and the verifier apparatus 800 over the secure channels 400.

(3-B) Processing by the Signer i Apparatus at the Time of Joining the System

Figure 10:
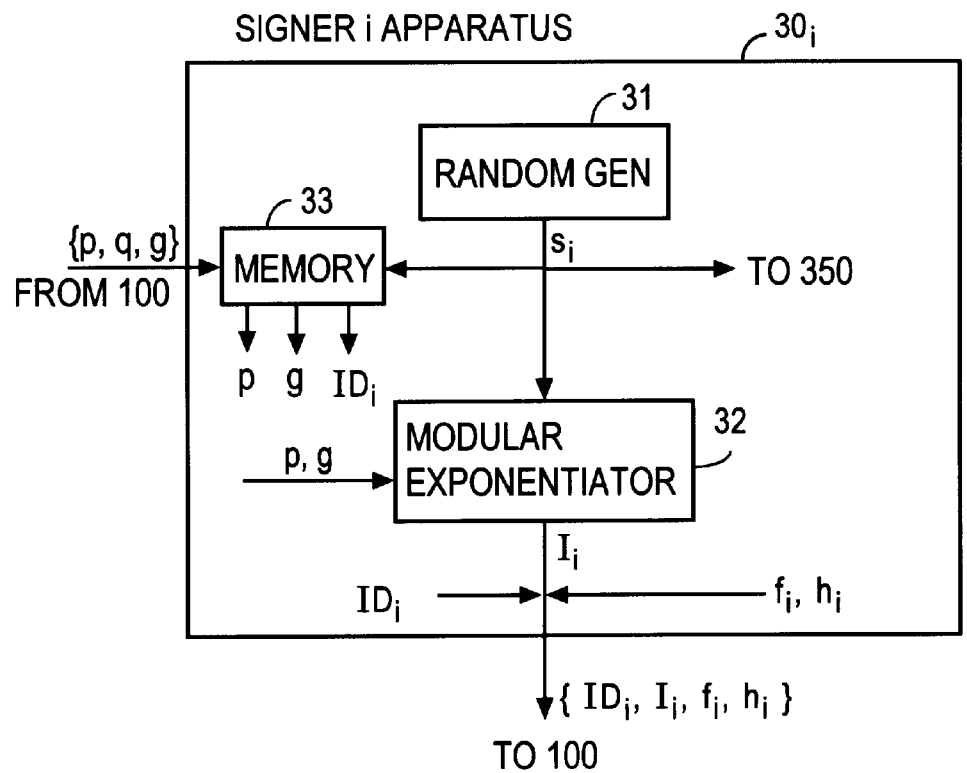
FIG. 10 is a block diagram depicting that functional configuration of the signer i apparatus $30_i$ in FIG. 1B which is associated with processing for its system subscription in the individual-signature scheme.

Next, a description will be given, with reference to FIG. 10, of processing that the signer i apparatus performs for its subscription to the system. It is noted that the memory 33 has stored therein the public information $\{p, q, g\}$ received from the center 100.

Step S4: The signer i generates the random number $s_i$ by the random generator 31 and inputs it and the pieces of public information $g(=\beta)$ and p into the modular exponentiator 32 which calculates the function $G_2(si, \beta)$ referred to previously in connection with the principles of the invention. By this, the following calculation is conducted to obtain the public information $I_i$.

$$I_i = G_2(s_i, g) = g^{s_i} \bmod p \tag{41}$$

Step S5: The signer i apparatus sends the identification information $ID_i$, the public information $I_i$ and the one-way functions $f_i$ and $h_i$ via the secure channel 400 to the center apparatus 100, wherein they are registered as public information. At the same time, the signer i apparatus holds the random number $s_i$ as secret information in the memory 33.

Other signer apparatuses also perform the same processing when they subscribe to the system.

In the following description the signed document will be identified by $\{ID_i, X_i, m_i, y_i\}$ on the assumption that the signer i apparatus signs the document $m_i$.

(3-C) Processing of the Signer i Apparatus for Signature Generation

Figure 11:
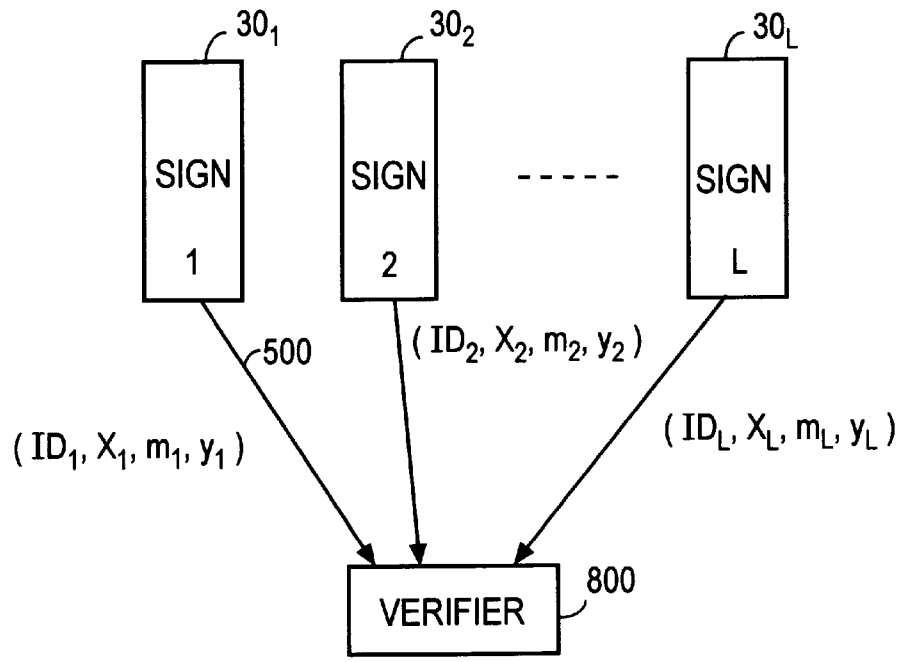
FIG. 11 is a diagram depicting an interaction sequence of information in the individual-signature scheme.
Figure 12:
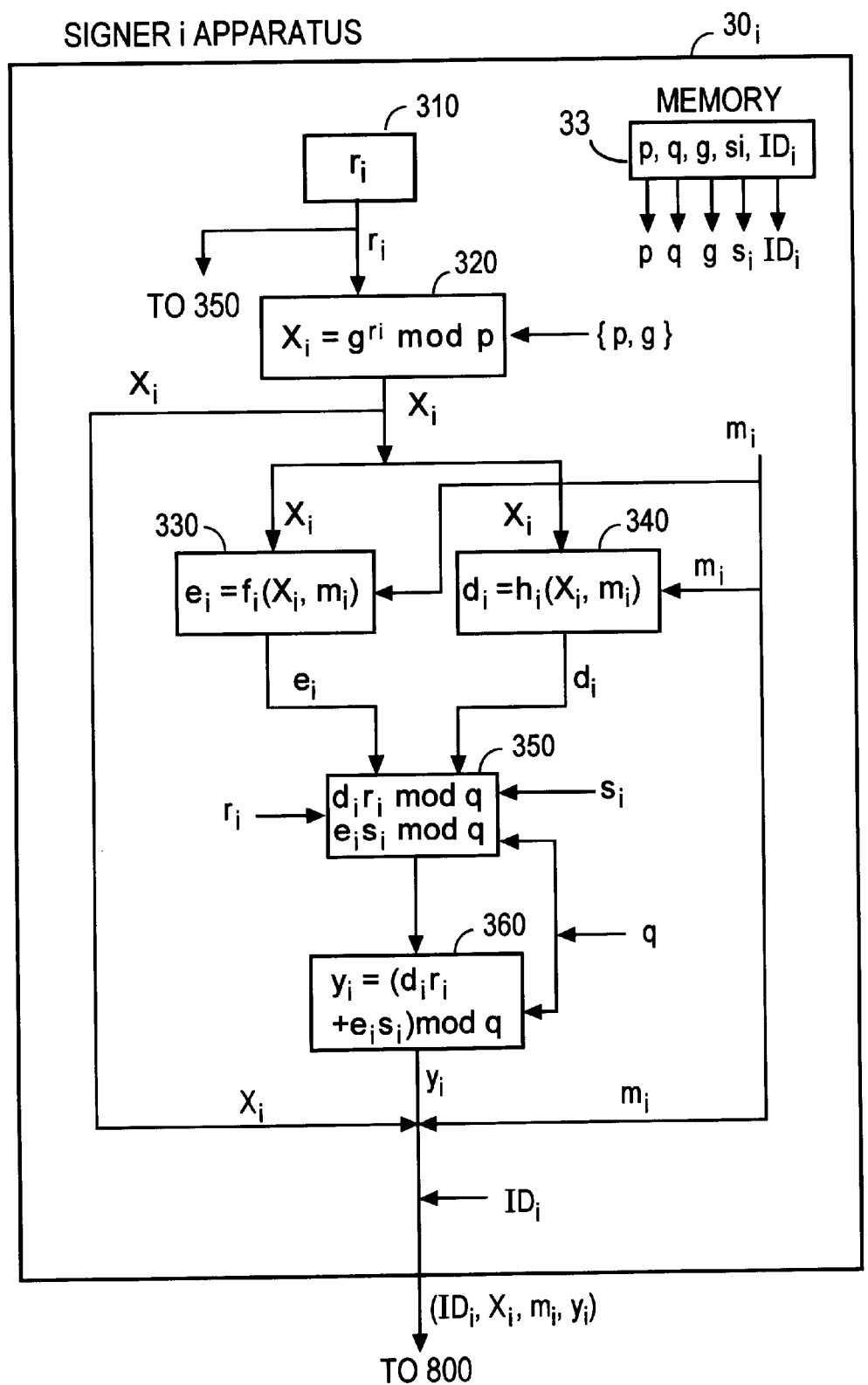
FIG. 12 is a block diagram depicting that functional configuration of the signer i apparatus $30_i$ in FIG. 1B which is associated with processing for signature generation.

FIG. 11 shows interaction sequences of messages and FIG. 12 the functional configuration of the signer $30_i$ apparatus.

Step S6: The signer i apparatus $30_i$ generates the random number $r_i$ by the random generator 310 and inputs it into the modular exponentiator 320 which calculates the function $\Phi$, together with the pieces of public information p and g; $X_i$ is calculated by $$X_i = \Phi(r_i, g) = g^{r_i} \bmod p \tag{42}$$

Step S7: The signer i apparatus $30_i$ uses the function $f_i$ calculator 330 and the function $h_i$ calculator 340 to calculate two pieces of information $e_i$ and $d_i$ by $$e_i = f_i(X_i, m_i) \tag{43}$$

$$d_i = h_i(X_i, m_i) \tag{44}$$

Step S8: The signer i apparatus $30_i$ inputs these pieces of information $e_i$, $d_i$ and $r_i$ into the modular exponentiator 350 and then into the modular adder 360, together with the public information q and the secret information $s_i$, calculating with the signature function $Sg_i$ by $$y_i = Sg_i(e_i, d_i, s_i, r_i, q) = (d_i r_i + e_i s_i) \bmod q \tag{45}$$

Step S9: The signer i apparatus $30_i$ sends the message $\{ID_i, X_i, m_i, y_i\}$ to the verifier apparatus 800.

(3-D) Process of the Verifier Apparatus 800 for Signature Verification

Figure 13:
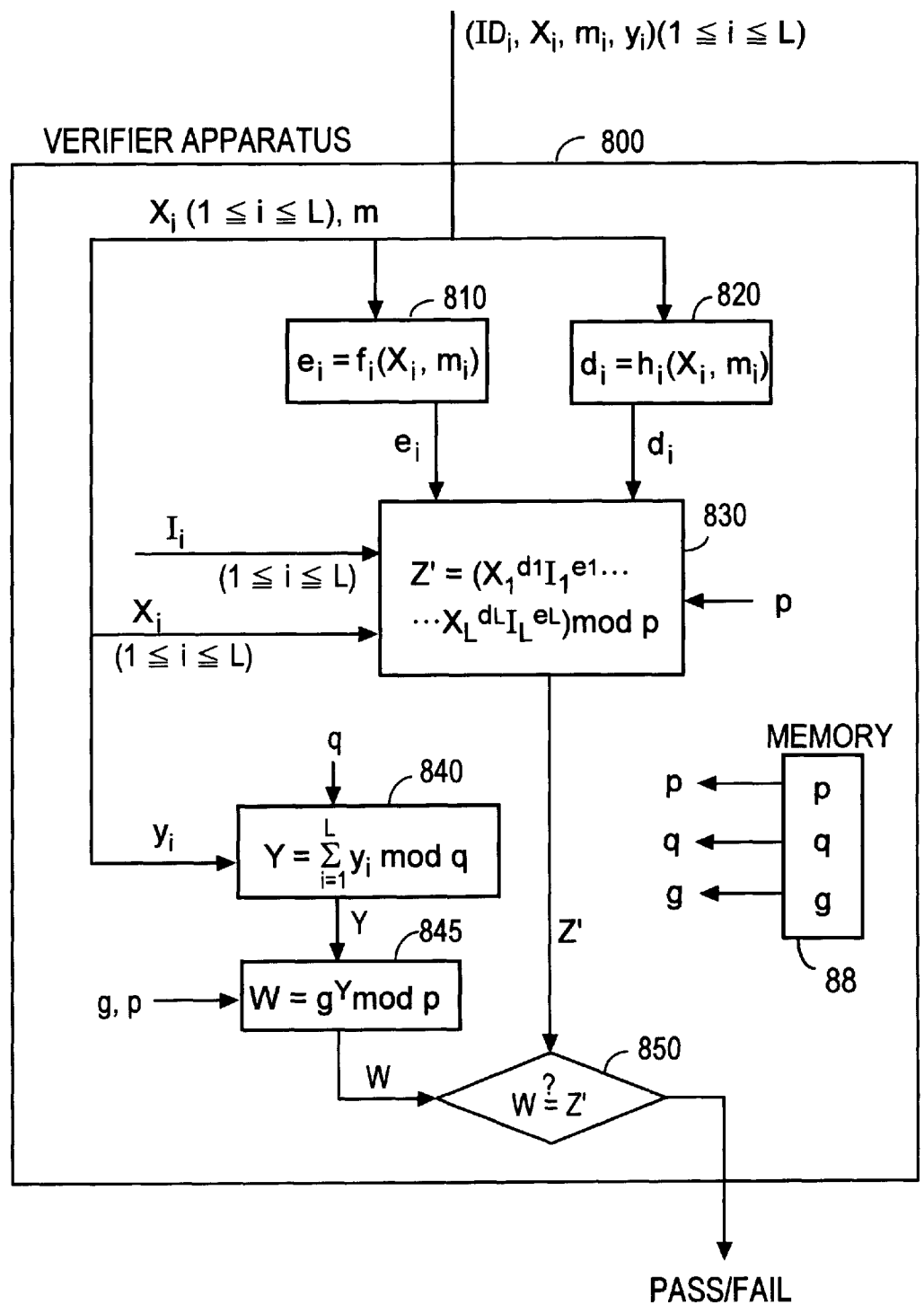
FIG. 13 is a block diagram depicting that functional configuration of the verifier apparatus 800 in FIG. 1B which is associated with processing for signature verification.

FIG. 13 depicts the functional configuration of the verifier apparatus 800. In the memory 88 is stored the public information {p, q, g} received from the center. When receiving the L messages {$ID_i$, $X_i$, $m_i$, $y_i$} from the L signer apparatuses, the verifier apparatus 800 caries out the following processing to verify the respective signature en bloc.

Step S10: The verifier apparatus 800 inputs the information $X_i$ and the document $m_i$ into the function $f_i$ calculator 810 and the function $h_i$ calculator 820, wherein the components $e_i$ and $d_i$ (where $1 \leq I \leq L$) are respectively calculated by $e_i = f_i(X_i, m_i)$ $d_i = h_i(X_i, m_i)$ Step S11: The verifier apparatus 800 receives from the center 100 the public information $I_i$ corresponding to the identification information $ID_i$, and inputs the public information $I_i$, together with the components ei and di generated as described above and the public information p, the multi-component modular exponentiator 830, together with the components $e_i$ and $d_i$ and the public information p, wherein Z' is calculated by $$Z' = V(X_i * d_i), (I_i * e_i)|i=1, \ldots, L) = (X_1^{d_1} I_1^{e_1} \ldots X_L^{d_L} I_L^{e_L}) \bmod p \quad (46)$$

Step S12: The verifier apparatus 800 inputs L pieces of information $y_i$ and the public information q into the modular adder 840 to calculate an accumulated value Y by $$Y = \sum_{i=1}^{L} y_i \bmod q \quad (47)$$

Then, the verifier apparatus 800 inputs Y and the public information {p, q} into the modular exponentiator 845 which calculates the function $\Gamma(Y*g)$; to obtain W by $$W = \Gamma(Y*g) = g^Y \bmod p \quad (48)$$

Step S13: Z' and W are input into a comparator 850, wherein they are compared to make a check to see if

W=Z'

If they match each other, it is considered that the respective documents $m_i$ have been duly signed by the L authorized signer i apparatuses.

One method of the square-and-multiply algorithms for calculating $x^a y^b \bmod N$ in the multi-component modular exponentiator 830 is the same as described previously.

Taking into account the way of generating the accumulated value Y, $$g^Y \equiv g^{y_{L-1}} (g^{r_L})^{d_L} (g^{s_L})^{e_L} = \quad (49)$$

$$g^{y_{L-1}} X_L^{d_L} I_L^{e_L} \equiv \cdots \equiv X_1^{d_1} \cdots X_L^{d_L} I_1^{e_1} \cdots I_L^{e_L} \pmod{p}$$

Hence, when the documents $m_i$ pass the abovesaid test by the comparator 860, the verifier apparatus 800 accepts the documents as having been duly signed by the L authorized or valid signers.

Now, a description will be given of processing in the case where W=Z' does not hold in step S13. For example, when L=100, the messages {$ID_i$, $X_i$, $m_i$, $y_i$} are divided into two groups (L/2=50), and the processing of steps S9 through S13 are carried out for the messages of one of the two groups to make a check to see if a mismatch is found among them. If a mismatch is found, the messages of that group are subdivided into two; and if no mismatch is found, the messages of the other group are subdivided into two. Then the messages of one of the two subdivided groups are subjected to the processing of steps S9 to S13. By repeating this processing, the verifier apparatus is capable of locating which signer apparatus failed to duly sign the document concerned.

As referred to previously, the present invention is applicable not only to the Schnorr schemes but also to the Fiat-Shamir schemes and digital signature schemes utilizing the interactive proofs including the Fiat-Shamir schemes. Accordingly, the method of the present invention may be summarized in general as follows:

That is, the system parameters that are published are p for specifying the number of elements of the group, an element g of the group with which a group calculation starts, and a positive integer q such that when the element g is calculated q times, the calculation returns to the element g.

The signer i apparatus:

generates the random number $s_i$ by the random generator at the time of its subscription to the system, and inputs the random number $s_i$ and the pieces of public information g and p into a group calculator, wherein the element g is calculated $s_i$ times to compute the public information $I_i$; and publishes the public information $I_i$, the function $f_i$ and $h_i$ together with the identification information $ID_i$ but holds the random number $s_i$ as secret information.

In the signature generation processing, the signer i apparatus:

generates the random number $r_i$ using the random generator, then inputs it into the group calculator together with the pieces of public information p and g to calculate the element g $r_i$ times to obtain the information $X_i$;

calculates the components $e_i$ and $d_i$ by $e_i = f_i(X_i, m_i)$ $d_i = h_i(X_i, m_i)$ through the use of the function $f_i$ calculator and the function $h_i$ calculator; and inputs the pieces of information $e_i$, $d_i$ and $r_i$, together with the public information q and the secret information $s_i$, into an exponential component multiplier and an exponential component adder to calculate $y_i$ by $y_i = (d_i r_i + e_i s_i) \bmod q$ and thus obtains and sends the messages {$ID_i$, $X_i$, $m_i$, $y_i$} to the verifier apparatus.

When receiving the messages {$ID_i$, $X_i$, $m_i$, $y_i$} (where $1 \leq I \leq L$) from the L signer i apparatuses, the verifier apparatus inputs the information $X_i$ and the message $m_i$ into the function $f_i$ calculator and the function $h_i$ calculator, respectively, wherein $e_i = f_i(X_i, m_i)$ $d_i = h_i(X_i, m_i)$ are calculated to obtain the components $e_i$ and $d_i$ for each i (where $1 \leq i \leq L$), then derives the public information $I_i$ from the identification application $ID_i$, and inputs these pieces of information $I_i$ and $X_i$ and the above-mentioned components $e_i$ and $d_i$ and the public information p into the multi-component group calculator, wherein Z' is obtained by sequentially calculating $X_i$ $d_i$ times and $T_i$ $e_i$ times for i's from 1 to L;

inputs L pieces of information $y_i$ and the public information p into the exponential component adder to calculate Y by $$Y = \sum_{i=1}^{L} y_i \bmod q$$

then input Y and the pieces of public information p and g into a group calculator, wherein g is calculated Y times to obtain W; and inputs Z' and W into the comparator to make a check to see if

W≡Z' and if they match each other, recognizes that the L documents $m_i$ have been duly signed by L authorized signer i apparatuses.

The signer apparatus and the verifier apparatus each usually perform processing by a computer.

While Embodiments 1 through 3 have been described to use Zq as a commutative group of the finite field that is defined by the parameter q, an elliptic curve can be used as the commutative group—this solves the problem of increased amount of calculation to be processed by the signer for signature generation. The RSA cryptosystem bases its security on the difficulty of a factoring problem, whereas the elliptic curve cryptosystem bases its security on a discrete logarithm problem on an elliptic curve which is considered harder to solve than the factoring problem.

The following is the definition of the elliptic curve on the finite field GF(q) which is given using parameters a, b∈GF(q)($4a^3 + 27b^2 \neq 0$).

$$E_{a,b}(GF(q)) = \{(x, y) \in GF(q)^2 | y^2 = x^3 + ax + b\} 520 \{0\} \quad (50)$$

where GF(q) is called a definition field of the elliptic curve $E_{a,b}(GF(q))$ and 0 indicates an infinite point.

The addition on the elliptic curve in this instance is as follows:

When setting $$P_i = (x_i, y_i) \in E_{a,b}(GF(q))$$

(where i=1, 2),
$(x_3, y_3) = P_1 + P_2$ can be written as follows:

(a): when $P_1 \neq P_2$, setting $\lambda = (y_2 - y_1)/(x_2 - x_1)$, $$x_3 = \lambda^2 - (x_1 + x_2),$$

$$y_3 = -y_1 + \lambda(x_1 - x_3) \quad (51)$$

(b): when $P_1 = P_2$, that is, when $(x_3, y_3) = 2P_1$, setting $\lambda = (3x_1^2 + a)/(2y_1)$, $$x_3 = \lambda^2 - 2x_1,$$

$$y_3 = -y_1 + \lambda(x_1 - x_3) \quad (52)$$

The group computation on the elliptic curve is described, for example, in D. R. Stinson, "CRYPTOGRAPHY Theory and Practice," CRC Press, pp. 187–190, 1995. In the following description, the addition of $P_1$ and $P_2$ on the elliptic curve $E_{a,b}(GF(q))$ will be represented by $(P_1+P_2)$ over $E_{a,b}(GF(q))$.

Since the presently known solution to the discrete logarithm problem on the elliptic curve is less efficient or more difficult than the solution to the factoring problem, it is possible to make the parameter q of the definition field of the elliptic curve small accordingly, thereby reducing the computational complexity involved. In concrete terms, it is said that the same security as in the case of |N|=1024 could be guaranteed by |q|=160, where |p| represents the number of bits of the prime p (see, for example, Bruce Schneicer, "APPLIED CRYPTOGRAPHY (Second Edition)," John Wiley & Sons, Inc., pp. 480–481, 1996).

The usual discrete logarithm problem is one that, when an integer $g \in (Z/pZ)^* = \{1, 2, \ldots, p-1\}$, where p is large prime and g has an order q, is provided as public information, a calculation is made of $y \in Z/qZ$ that satisfies $g^y \equiv x \pmod{p}$ with respect to an integer $x \in (Z/pZ)^*$.

On the other hand, the discrete logarithm problem on the elliptic curve is a problem that, when the definition field GF(q), the parameters a and b of the elliptic curve and a point $P \in E_{a,b}(GF(q))$ of an order k on the elliptic curve are provided as public information, a calculation is made of $y \in Z/kZ$ which satisfies yP≡X over $E_{a,b}(GF(q))$ with respect to a point $X \in E_{a,b}(GF(q))$ on the elliptic curve. The point P is called a base point. yP≡X over $E_{a,b}(GF(q))$ indicates that the base point P, when added y times on the elliptic curve, will coincide with the point $X \in E_{a,b}(GF(q))$. The y-times addition of the base point P on the elliptic curve $E_{a,b}(GF(q))$, in particular, is represented by yP over $E_{a,b}(GF(q))$, which is used to define a group calculation on the elliptic curve.

With the use of the above-defined group calculation on the elliptic curve, a Diffie-Heilman key-sharing scheme, an ElGamal cryptosystem and an EGamal signature scheme, which utilize the difficulty of the usual discrete logarithm problem, could all be modified into schemes that utilize the difficulty of the discrete logarithm on the elliptic curve.

The Schnorr and the Fiat-Shamir schemes, which utilize the interactive proofs, could also be modified into schemes utilizing the difficulty of the discrete logarithm on the elliptic curve. A description will be given, for example, of a digital signature by the Schnorr scheme employing the elliptic curve.

A trusted center publishes the parameter q of the definition field GF(q), the parameter a,b,GF(q) of the elliptic curve, and the base point $P \in E_{a,b}(GF)q))$ of an order k on the elliptic curve.

Step 1: A signer A generates a random number $s \in (Z/kZ)$ and calculates public information I by $$I = sP \text{ over } E_{a,b}(GF(q)) \quad (53)$$

and publishes a pair of identification information (ID) and information I.

The signer A goes through the following procedure to prove to a verifier B that a document m is genuine.

Step 2: The signer A generates a random number $r \in (Z/kZ)$ and calculates $$X = rP \text{ over } E_{a,b}(GF(q)) \quad (54)$$

Step 3: The signer A calculates an integer $e \in (Z/kZ)$ using a one-way function f by $$e = f(X, m) \quad (55)$$

Step 4: The signer A generates a signature y by $$y = (r + es) \bmod k \quad (56)$$

and sends {ID, m, X, y} as a signed message to the verifier B.

Step 5: The verifier B calculates the integer $e \in (Z/kZ)$ using the one-way function f by e=f(X, m)

Step 6: The verifier B makes a check to see if $$yP \equiv (X + eI) \text{ over } E_{a,b}(GF(q)) \quad (57)$$

where I is public information corresponding to the identification information ID.

Taking into account the way of generating y, $$yP=(r+esP=rP+e(sP)=(X+eI) \text{ over } E_{a,b}(GF(q))\quad(58)$$

Hence, when Eq. (57) is satisfied, the verifier B recognizes that the document m has been duly sent from the signer A.

In the above, the signature of the signer A could be forged if {ID, X, m, y} were sent as a signed message when the integer $e \in (Z/kZ)$, with which $e=f(X, m)$ would hold, could be found by calculating $X \in E_{a,b}(GF(q))$, which would satisfy the verification equation, after suitably choosing the integers $e \in (Z/kZ)$ and $y \in (Z/kZ)$. Since the probability that the verification equation $e=f(X, m)$ holds is $1/k$, the computational complexity involved in the forgery of signature depends on the value k.

The elliptic Schnorr scheme involves the computation of Eqs. (51) and (52) for an n-fold point calculation (including modular q calculations) on the elliptic curve on an average of $3|q|/2$ times, a single multiplication (including modular k calculations) of $|k|$-bit integers and a single addition (including modular k calculations) of the $|k|$-bit integers.

The above elliptic curve method will be described below as being applied to the first through third embodiment described previously.

The result of addition P3 (P1+P2) on the elliptic curve is calculated by Eqs. (51) and (52) using x- and y-coordinates. As is evident from Eq. (59) that defines the elliptic curve, once the x-coordinate is determined, the point on the elliptic curve is uniquely defined depending on whether the value of the y-coordinate is plus or minus. Since the x-coordinate is the value of the definition field GF(q), it must be noted here that the point on the elliptic curve can be represented by $(|q|+1)$ bits.

EMBODIMENT 4

This embodiment corresponds to the first embodiment which performs the superimposed signature and the en-bloc verification thereof. A description will be given below of an embodiment in which the Schnorr scheme is applied to the superimposed signature and the en-bloc verification thereof that utilize the elliptic curve method. The idea of utilizing a second multiple component described below can be widely applied to the ElGamal signature schemes and the digital signature schemes utilizing the interactive proofs including them.

The system configuration to which this embodiment is applied is the same as shown in FIG. 1A; hence, no description will be repeated.

(4-A) Initial Information Setting Processing

A description will be given below, with reference to FIG. 14, of initial information setting processing at the time when the center 100 starts the system. This processing is intended to publish a value {q, a, b, P, k} unique to the system.

Step S1: The center apparatus 100 generates the prime q by the prime generator 110 and a, $b \in GF(q)$ by a parameter generator 120.

Step S2: The center apparatus 100 generates a point $P \in E_{a,b}(GF(q))$ on the elliptic curve by a base point generator 130 and the order k of the base point by an order calculator 140. The elliptic curve $E_{a,b}(GF(q))$ corresponds to a value of the function $G_1(q)$ referred to previously in connection with the principles of the present invention, and the point P corresponds to the aforementioned β.

Step S3: The public information {q, a, b, P, k} is sent to the signers $30_1, \ldots, 30_L$ and the verifier 800 over the secure communication channels 400 and stored in the memories 33 and 88.

The order calculator 140 can easily be implemented using, for example, the Schoof algorithm for calculating the order of the elliptic curve $E_{a,b}(GF(q))$ (the number of points on the curve)(see, for example, R. Schoof, "Elliptic Curves Over Finite Fields and the Computation of Square Roots Mod p," Math. Com., 44, pp.483–494, 1985).

(4-B) Processing by the Signer i for its Subscription to the System

Figure 15:
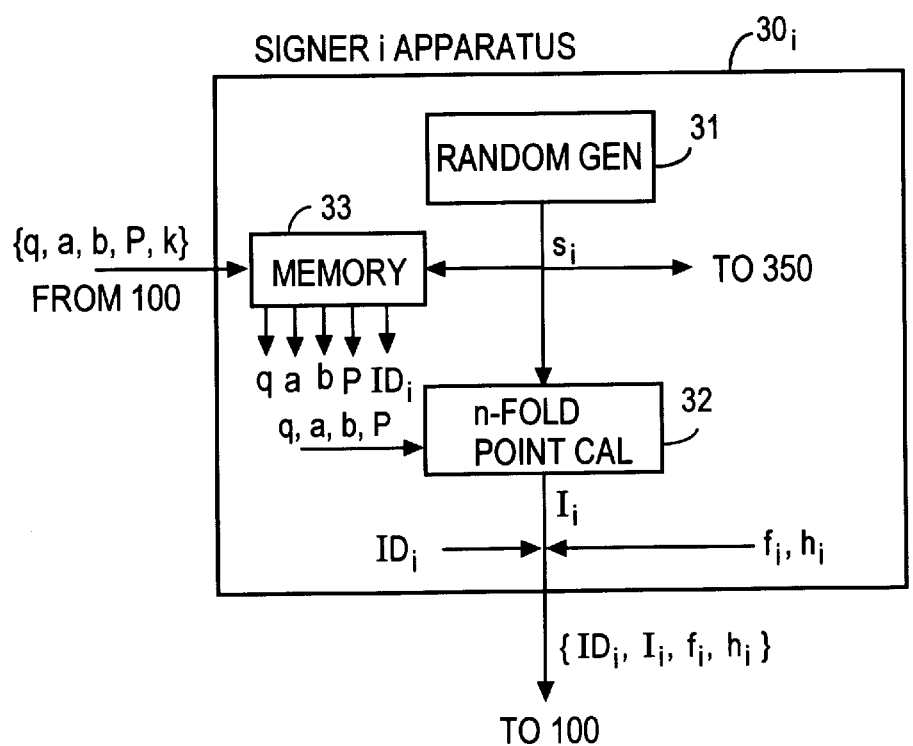
FIG. 15 is a block diagram depicting that functional block of the signer i apparatus $30_i$ in the system of FIG. 1A which is associated with processing for its system subscription employing the elliptic curve cryptosystem.

Next, a description will be given, with reference to FIG. 15, of processing that the signer i performs when it subscribes to the system.

Step S4: The signer i generates the random number $s_i$ by the random generator 31 and inputs it and the public information {q, a, b, P} into an n-fold point calculator 32, wherein the public information $I_i$ is computed with the aforementioned function $G_2$ by $$I_i=G_2(s_i, P)=s_i P \text{ over } E_{a,b}(GF(q))\quad(59)$$

Step S5: The signer i apparatus sends the identification information $ID_i$, the public information $I_i$ and the one-way functions $f_i$ and $h_i$ over the secure channel 400 to the center 100 for registering them as public information {$ID_i$, $I_i$, $f_i$, $h_i$}. The signer i holds the random number $s_i$ as secret information in the memory 33.

Figure 16:
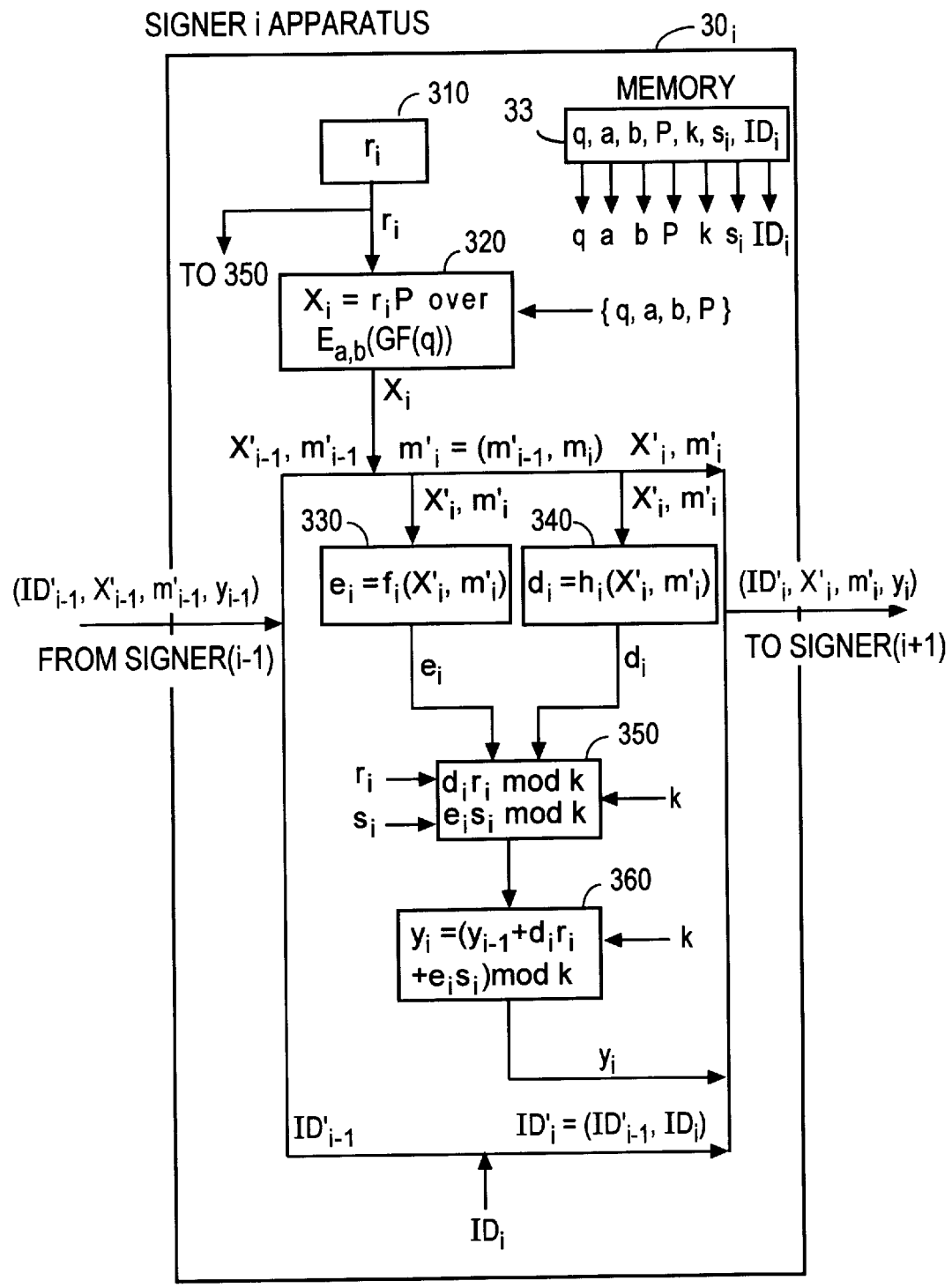
FIG. 16 is a block diagram depicting that functional block of the signer i apparatus $30_i$ in the system of FIG. 1A which is associated with processing for signature generation in the superimposed-signature scheme employing the elliptic curve cryptosystem.

In the following description the signed version of the document $m'_i$, which is provided from the signer i apparatus, will be identified by {$ID'_i$, $X'_i$, $m'_i$, $y_i$} The interaction sequence of the message is the same as in the case of FIG. 4. Upon receiving a message {$ID'_{i-1}$, $X'_{i-1}$, $m'_{i-1}$, $y_{i-1}$} from the signer (i−1), the signer i performs the signature generation processing described below. The configuration of the signer apparatus $30_i$ is depicted in FIG. 16. Now, a description will be given of the case where the signer (i−1) sends the message to be signed and the signer i attaches his signature to the message and sends the signed message to the next signer (i+1). In the case of the superimposed signature by L signers, it is sufficient only to increase i one by one from i to L and repeat the following procedure. In this case, the signer (L+1) is regarded as the verifier; $ID'_0$=empty set, $X'_0$=empty set and $y_0$=0.

(4-C) Processing of the Signer i for Signature Generation

Step S6: The signer i generates the random number $r_i$ by the random generator 310 and inputs it into an n-fold point calculator 320 which calculates the function Φ, together with the public information {q, a, b, P} read out of the memory 33, and wherein $X_i$ is calculated by $$X_i=\Phi(r_i, P)=r_i P \text{ over } E_{a,b}(GF(q))\quad(60)$$

Step S7: The signer i uses the function $f_i$ calculator 330 and the function $h_i$ calculator 340 to calculate $e_i$ and $d_i$ by $$e_i=f_i(X'_i, m'_i)\quad(61)$$

$$d_i=h_i(X'_i, m'_i)\quad(62)$$

where $$X'_i=(X'_{i-1}, X_i)\quad(63)$$

$$m'_i=(m'_{i-1}, m_i)\quad(64)$$

Step S8: The signer i inputs $e_i$, $d_i$ and $r_i$ into the modular multiplier 350 and then into the modular adder 360, together with the public information k and the secret information $s_i$, generating the signature with the signature function $Sg_i$ by $$y_i=Sg_i(e_i, d_i, s_i, r_i, y_{i-1})=(y_{i-1}+d_i r_i+e_i s_i) \bmod k\quad(65)$$

Step S9: The signer i sets $ID'_i=(ID'_{i-1}, ID_i)$, and sends the message {$ID'_i$, $X'_i$, $m'_i$, $y_i$} to the next signer (i+1).

(4-D) Processing of the Verifier 800 for Signature Verification

Figure 17:
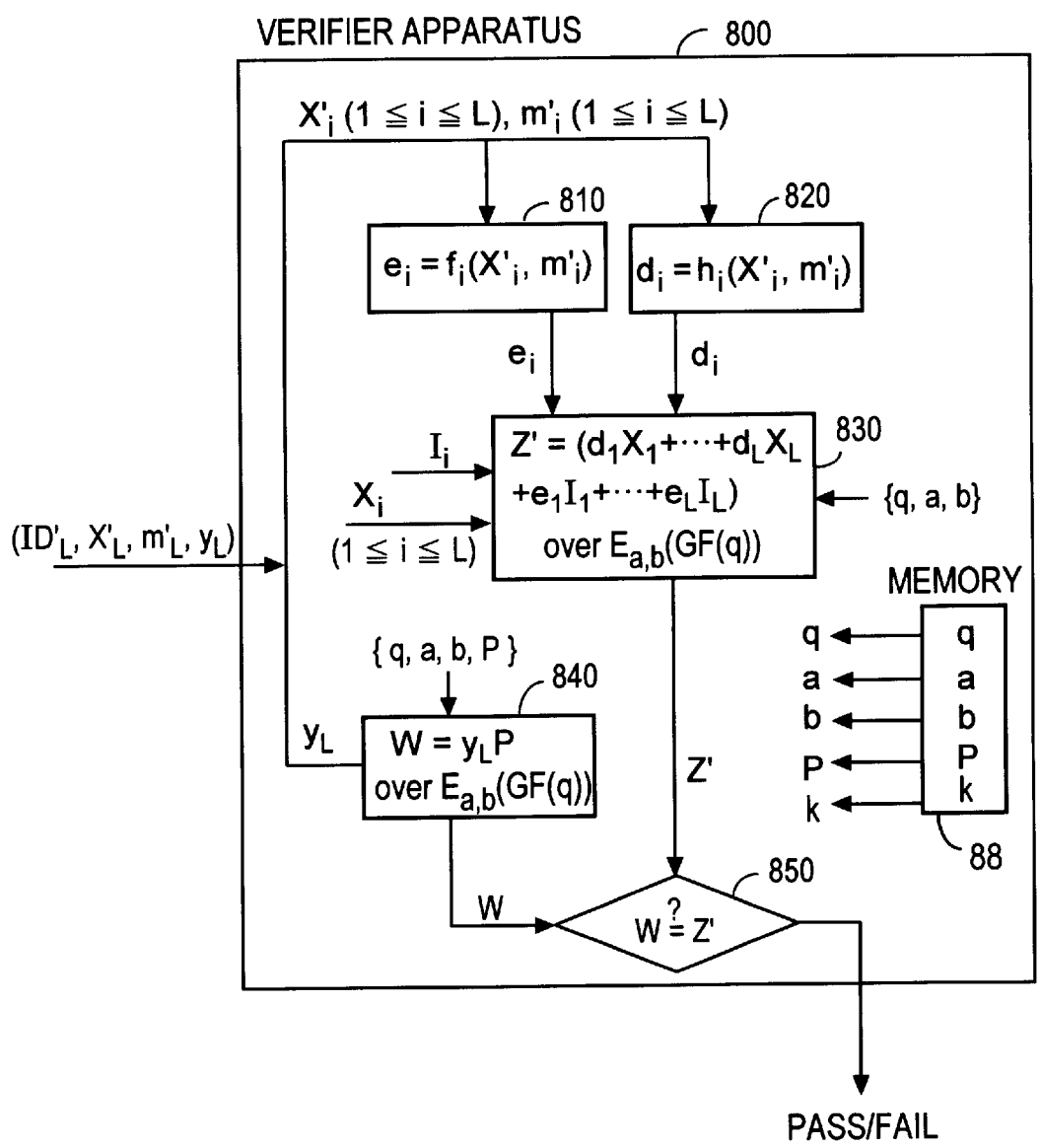
FIG. 17 is a block diagram depicting that functional block of the verifier apparatus 800 in the system of FIG. 1A which is associated with processing for signature verification in the superimposed-signature scheme employing the elliptic curve cryptosystem.

FIG. 17 depicts the functional configuration of the verifier apparatus 800. When receiving the message $\{ID'_L, X'_L, m'_L, y_L\}$ from the signer L, the verifier verifies the validity of each signature by the processing described below.

Step S10: The first i components of the information $X'_L$ are used to form $X'_i$ and the first i components of the information $m'_L$ are used to form $m'_i$. These pieces of information $X'_i$ and $m'_i$ thus obtained are input into the function $f_i$ calculator 810 and the function $h_i$ calculator 820, wherein the components $e_i$ and $d_i$ (where $1 \leq i \leq L$) are calculated by $e_i = f_i(X'_i, m'_i)$ $d_i = h_i(X'_i, m'_i)$ Step S11: The information $I_i$ is derived from the $ID_i$ component in the information $ID'_L$ and the information $X_i$ is also derived from the information $X'_L$. These pieces of information $I_i$ and $X_i$ are input, together with the above-mentioned components $e_i$ and $d_i$ the public information $\{q, a, b, P\}$ read out of the memory 88, into an n-fold calculator 830 which calculates the function V, and wherein E is calculated by $$Z' = V((X_i * d_i), (I_i * e_i) | i = 1, \cdots, L) \quad (66)$$
$$= (d_1 X_1 + \cdots + d_L X_L + e_1 I_1 + \cdots e_L I_L) \text{ over } E_{a,b}(GF(q))$$

where $$e_i = f_i(X_1, \ldots, X_i, \{m_1, \ldots, m_i\}) \quad (67)$$
$$d_i = h_i(X_1, \ldots, X_i, \{m_1, \ldots, m_i\}) \quad (68)$$

$(1 \leq i \leq L)$

Step S12: The information $y_L$ and the public information $\{q, a, b, P\}$ are input into the n-fold point calculator 840 which calculates a function $\Gamma(y_L * P)$, thereby calculating W as follows:

$$W = \Gamma(y_L, P) = y_L P \text{ over } E_{a,b}(GF(q)) \quad (69)$$

Step S13: Z' and W are input into the comparator 850, wherein they are compared to make sure that

W=Z'

If they match each other, it is considered that the documents $(m_i, \ldots, m_L)$ have been duly signed by the L authorized signers i, respectively.

EMBODIMENT 5

This embodiment corresponds to the second embodiment which performs the multi-signature and the en-bloc verification thereof. A description will be given below of an embodiment in which the Schnorr scheme is applied to the multi-signature and the en-bloc verification thereof that utilize the elliptic curve method. In this embodiment, too, the idea of utilizing the second multiple component can be widely applied to the EHGamal signature schemes and the digital signature schemes utilizing the interactive proofs including them.

Figure 14:
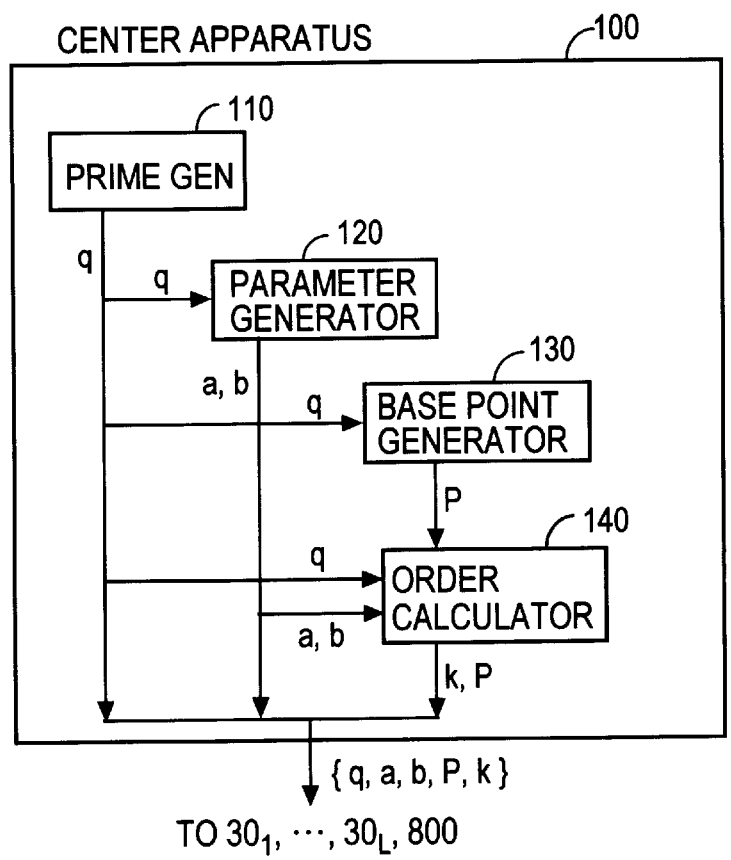
FIG. 14 is a block diagram depicting that functional configuration of the center apparatus 100 in FIG. 1A which is associated with processing for initial information setting in the case of an elliptic curve cryptosystem.

The system configuration to which this embodiment is applied is the same as shown in FIG. 1A, and the configuration of the center apparatus 100 is the same as shown in FIG. 14.

(5-A) Initial Information Setting Processing

A description will be given below, with reference to FIG. 14, of initial information setting processing at the time when the center apparatus 100 starts the system.

Step S1: The center apparatus 100 generates the prime q by the prime generator 110 and a, b, GF(q) by the parameter generator 120.

Step S2: The center apparatus 100 generates the point $P \in _{a,b}(GF(q))$ on the elliptic curve by the base point generator 130 which calculates a function $G_1(q)$ and the order k of the base point P by the order calculator 140. The point P corresponds to the aforementioned parameter $\beta$.

Step S3: The public information $\{q, a, b, P, k\}$ is sent to the signer apparatuses $30_1, \ldots, 30_L$ and the verifier apparatus 800 over the secure communication channels 400 and stored in their memories 33 and 88.

As referred to previously, the order calculator 140 can easily be implemented using the Schoof algorithm which calculates the order of the elliptic curve $E_{a,b}(GF(q))$ (the number of points on the curve).

(5-B) Processing by the Signer i for its Subscription to the System

Figure 18:
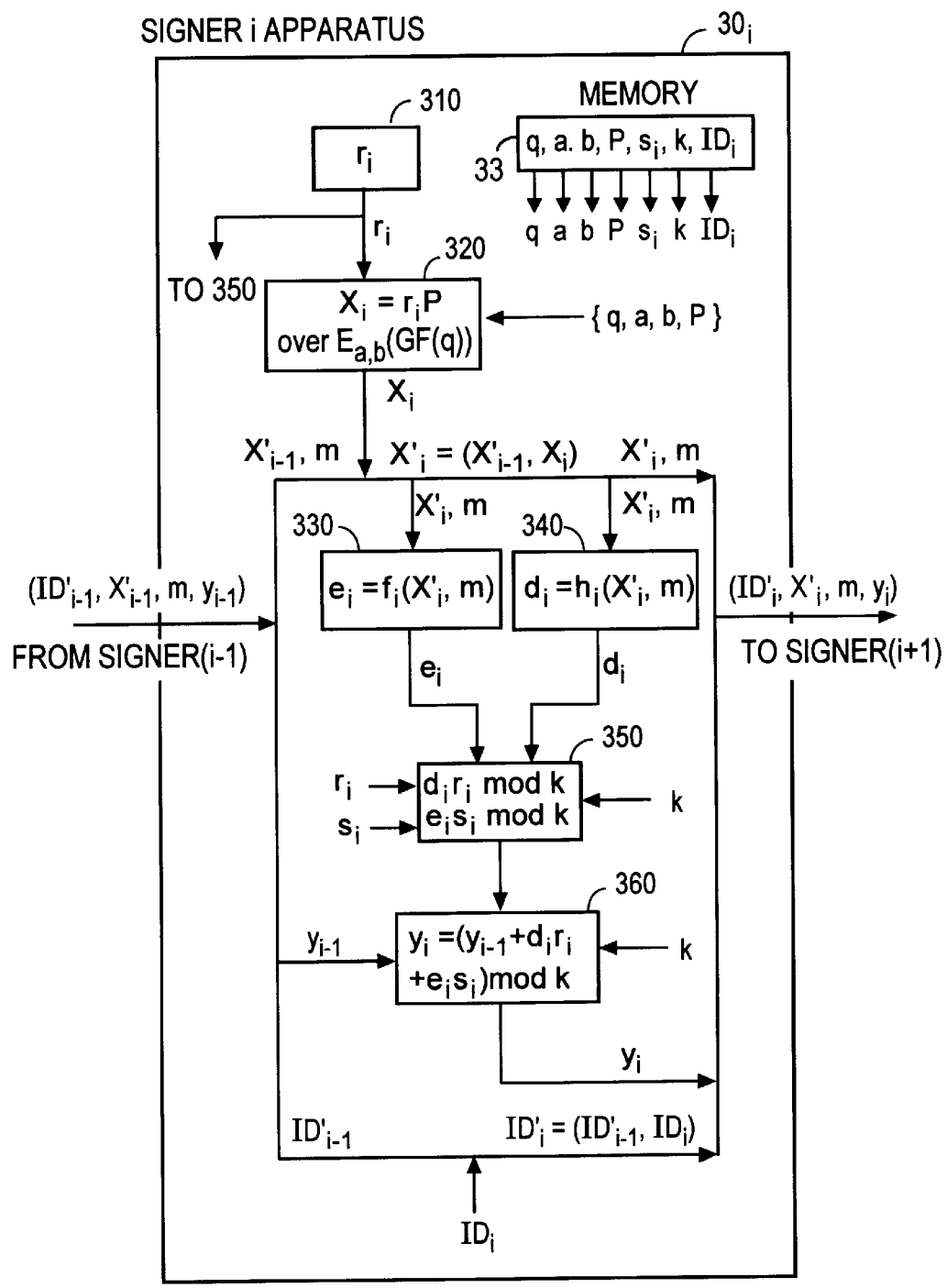
FIG. 18 is a block diagram illustrating the configuration of the signer i apparatus $30_i$ in a system of FIG. 1A for the multi-signature scheme employing an elliptic curve.

Next, a description will be given, with reference to FIG. 18, of processing that the signer i apparatus performs when it subscribes to the system.

Step S4: The signer i apparatus generates the random number $s_i$ by the random generator 310 and inputs it and the public information $\{q, a, b, P\}$ into the n-fold point calculator 320 which calculates a function $G_2(s_i, P)$, and wherein the public information $I_i$ is computed with by $$I_i = G_2(s_i, P) = s_i P \text{ over } E_{a,b}(GF(q)) \quad (70)$$

Step S5: each signer i apparatus sends the identification information $ID_i$, the public information $I_i$ and the one-way functions $f_i$ and $h_i$ over the secure channel 400 to the center apparatus 100 for registering them as public information $\{ID_i, I_i, f_i, h_i\}$. The signer i apparatuses each hold the random number $s_i$ as secret information.

In the following description the signed version of the document $m_i$, which is provided from the signer i apparatus, will be identified by $\{I'_i, X'_i, m_i, y_i\}$. The interaction sequence of the message is the same as in the case of FIG. 7. Upon receiving a message $\{ID'_{i-1}, X'_{i-1}, m, y_{i-1}\}$ from the signer (i−1) apparatus, the signer i apparatus performs the signature generation processing described below. The configuration of the signer apparatus $30_i$ is depicted in FIG. 18. Now, a description will be given of the case where the signer (i−1) apparatus sends the message to be signed and the signer i apparatus attaches its signature to the message and sends the signed message to the next signer (i+1) apparatus. When L signers generate multi-signature, it is sufficient only to increase i one by one from 1 to L and repeat the following procedure. In this case, the signer (L+1) apparatus is regarded as the verifier apparatus; $ID'_0$=empty set, $X'_0$= empty set and $y_0=0$.

(5-C) Processing of the Signer i Apparatus for Signature Generation

Step S6: The signer i apparatus generates the random number $r_i$ by the random generator 310 and inputs it into the n-fold point calculator 320 which calculates the function $\Phi$, together with the public information $\{q, a, b, P\}$ read out of the memory 33, and wherein $X_i$ is calculated by $$X_i = \Phi(r_i, P) = r_i P \text{ over } E_{a,b}(GF(q)) \quad (71)$$

Step S7: The signer i apparatus calculates $e_i$ and $d_i$ using the function $f_i$ calculator 330 and the function $h_i$ calculator 340 by $$e_i = f_i(X'_i, m) \quad (72)$$
$$d_i = h_i(X'_i, m) \quad (73)$$

where $X'_i = (X'_{i-1}, X_i)$.

Step S8: The signer i apparatus inputs $e_i$, $d_i$, $r_i$ and $y_{i-1}$ into the modular multiplier 350 and then into the modular adder 360, together with the public information k and the secret information $s_i$, generating the signature with the signature function $Sg_i$ by $$y_i = Sg_i(e_i, d_i, s_i, r_i, y_{i-1}) = (y_{i-1} + d_i r_i + e_i s_i) \bmod k \tag{74}$$

Step S9: The signer i apparatus sets $ID'_i = (ID'_{i-1}, ID_i)$, and sends the message $\{ID'_i, X'_i, m, y_i\}$ to the next signer (i+1) apparatus.

(5-D) Processing of the Verifier 800 for Signature Verification

Figure 19:
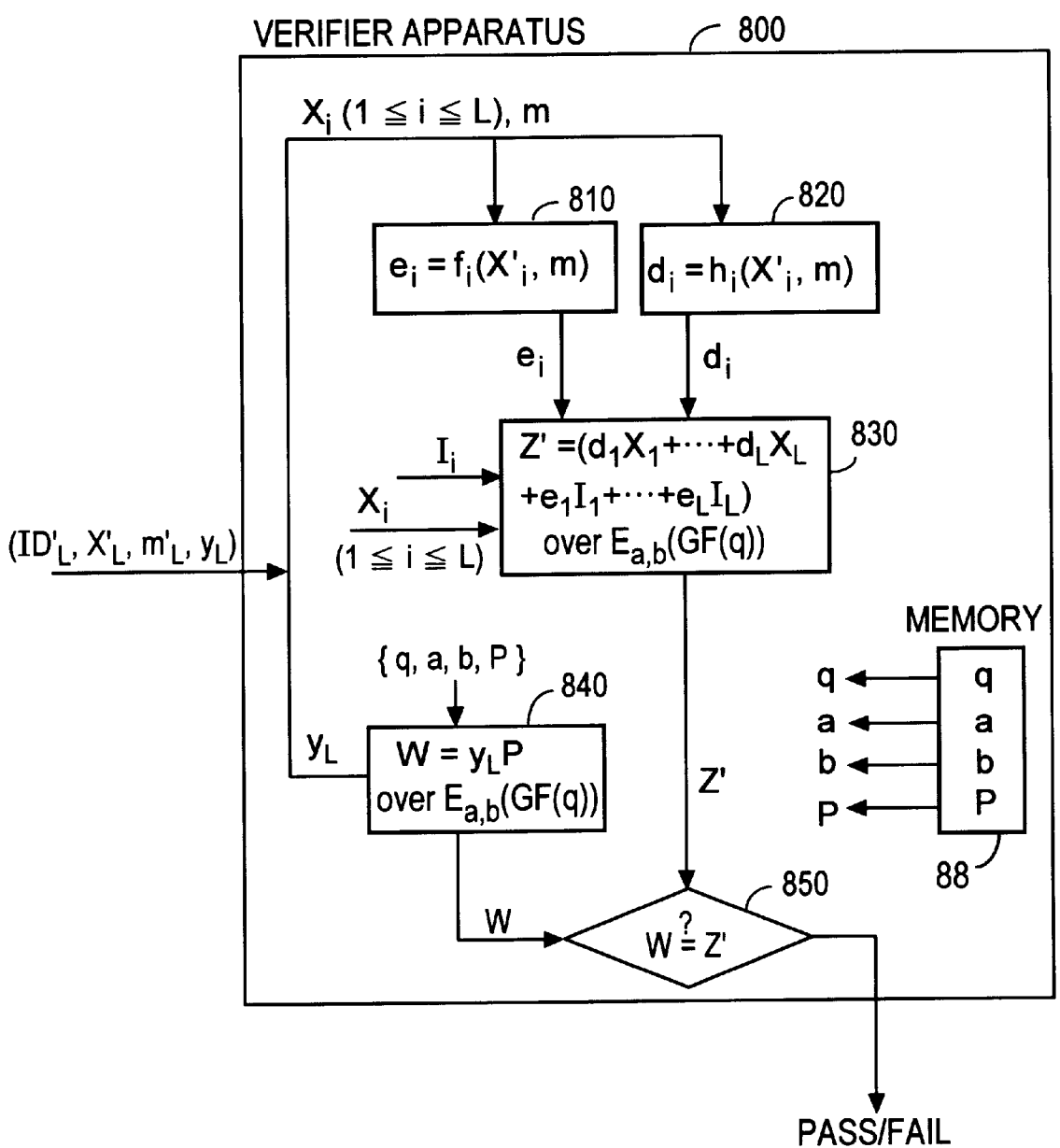
FIG. 19 is a block diagram illustrating the configuration of the verifier apparatus 800 in the system of FIG. 1A for the multi-signature scheme employing the elliptic curve.

FIG. 19 depicts the functional configuration of the verifier apparatus 800. When receiving the message $\{ID'_L, X'_L, m, y_L\}$ from the signer L apparatus, the verifier apparatus 800 verifies the validity of each signature by the processing described below.

Step S10: The first i components of the information $X'_L$ are used to form $X'_i$, which is input, along with the message $m_i$ into the function $f_i$ calculator 810 and the function $h_i$ calculator 820, wherein the components $e_i$ and $d_i$ (where $1 \leq I \leq L$) are calculated by $e_i = f_i(X'_i, m)$ $d_i = h_i(X'_i, m)$ Step S11: The information $I_i$ is derived from the $ID_i$ component in the information $ID'_L$ and the information $X_i$ is also derived from the information $X'_L$. These pieces of information $I_i$ and $X_i$ are input, together with the above-mentioned components $e_i$ and $d_i$ and the public information $\{q, a, b, P, k\}$ read out of the memory 88, into the n-fold calculator 830 which calculates the function V, and wherein Z' is calculated by $$Z' = V((X_i * d_i), (I_i * e_i) | i = 1, \cdots, L) \tag{75}$$
$$= (d_1 X_1 + \cdots + d_L X_L + e_1 L_1 + \cdots e_L I_L) \text{ over } E_{a,b}(GF(q))$$

where $$e_i = f_i(X_1, \ldots, X_i, m) \tag{76}$$

$$d_i = h_i(X_1, \ldots, X_i, m) \tag{77}$$

$(1 \leq I \leq L)$

Step S12: The information $y_L$ and the public information $\{q, a, b, P, k\}$ are input into the n-fold point calculator 840 which calculates the function $\Gamma(y_L * P)$, thereby calculating W as follows:

$$W = \Gamma(y_L, *P) = y_L P \text{ over } E_{a,b}(GF(q)) \tag{78}$$

Step S13: Z' and W are input into the comparator 850, wherein they are compared to make sure that $W = Z'$ If they match each other, it is considered that the document m has been duly signed by the L authorized signers i.

Each apparatus can be adapted to perform its functions by reading, interpreting and executing programs through the use of a computer. In each signer i apparatus $ID'_i = (ID'_{i-1}, ID_i)$ maybe replaced with $ID'_i = (ID'_{i-1}, I_i)$. This requires storing the public information $I_i$ in storage means and hence relieves the verifier apparatus of the burden of locating the information $I_i$ in the identification information $ID_i$.

EMBODIMENT 6

This embodiment corresponds to the third embodiment in which a plurality of signers individually attach their signatures to respective documents and the signatures are verified en bloc. This embodiment will also be described in connection with the case of applying the Schnorr scheme thereof that utilize the elliptic curve method. In this embodiment, too, the idea of utilizing the second multiple component can be widely applied to the ElGamal signature schemes and the digital signature schemes utilizing the interactive proofs including them.

The system configuration to which this embodiment is applied is the same as shown in FIG. 1B, and the configuration of the center apparatus 100 is the same as shown in FIG. 14.

In the following description, the signed message will be represented by $\{ID_i, X_i, m_i, y_i\}$ on the assumption that the signer i signs the document $m_i$.

Figure 20:
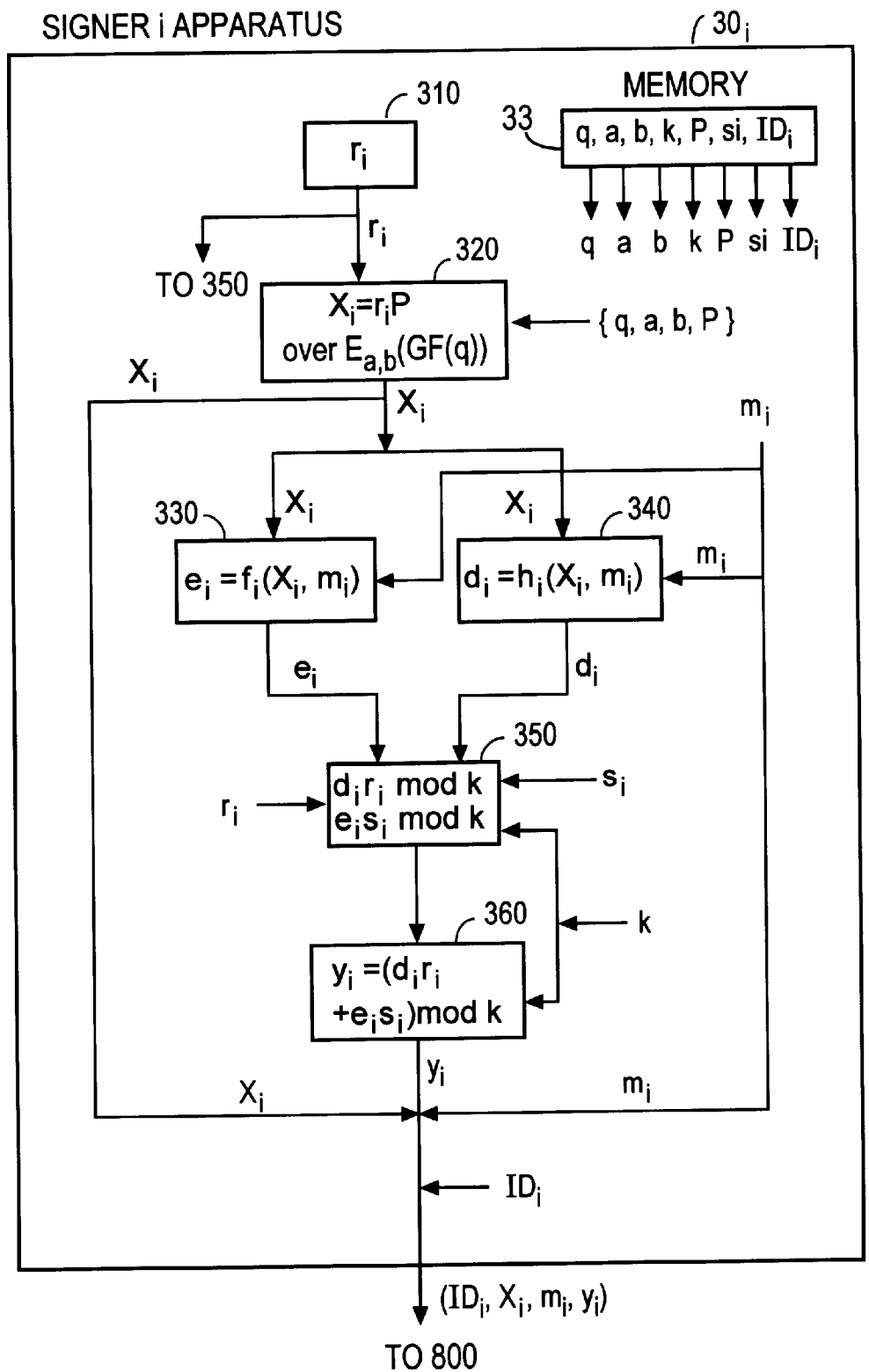
FIG. 20 s a block diagram illustrating the configuration of the signer i apparatus $30_i$ in a system of FIG. 1B for the individual-signature scheme employing the elliptic curve.

The interaction sequence of the message is the same as that depicted in FIG. 11. FIG. 20 illustrates in block form the signer i.

(6-A) Processing of the Signer i for Signature Generation

Step S14: The signer i generates the random number $r_i$ by the random generator 310 and inputs it into the n-fold point calculator 320 which calculates the function $\Phi$, together with the public information $\{q, a, b, P, k\}$ read out of the memory 33, and wherein $X_i$ is calculated by $$X_i = \Phi(r_i, P) = r_i P \text{ over } E_{a,b}(GF(q)) \tag{79}$$

Step S15: The signer i calculates $e_i$ and $d_i$ using the function $f_i$ calculator 330 and the function $h_i$ calculator 340 by $$e_i = f_i(X_i, m) \tag{80}$$

$$d_i = f_i(X_i, m) \tag{81}$$

Step S16: The signer i inputs $e_i$, $d_i$, and $r_i$ into the modular multiplier 350 and then into the modular adder 360, together with the public information k and the secret information $s_i$, generating the signature with the signature function $Sg_i$ by $$y_i = Sg_i(e_i, d_i, s_i, r_i, k) = (d_i r_i + e_i s_i) \bmod k \tag{82}$$

Step S17: The signer i sends the message $\{ID_i, X_i, m, y_i\}$ to the verifier 800.

(6-B) Processing of the Verifier 800 for Signature Verification

Figure 21:
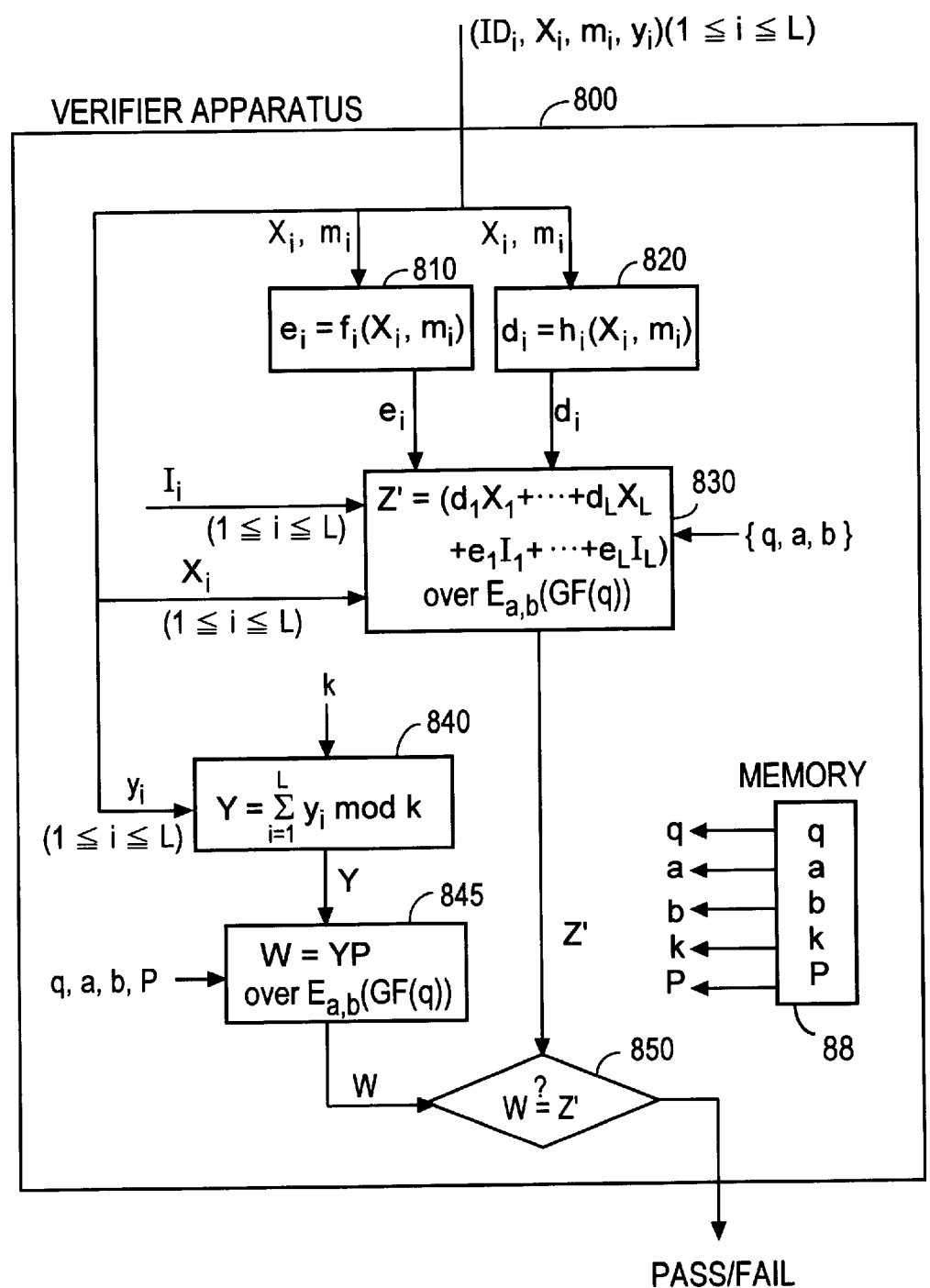
FIG. 21 is a block diagram illustrating the configuration of the verifier apparatus 800 in the system of FIG. 1B for the individual-signature scheme employing the elliptic curve.

FIG. 21 depicts in block form the verifier 800. When receiving L messages $\{I_i, X_i, m_i, y_i\}$ from the L signers, the verifier 800 verifies the validity of each signature by the processing described below.

Step S18: The verifier 800 inputs the information $X_i$ and the message $m_i$ into the function $f_i$ calculator 810 and the function $h_i$ calculator 820, wherein the components $e_i$ and $d_i$ (where $1 \leq I \leq L$) are calculated by $e_i = f_i(X_i, m_i)$ $d_i = f_i(X_i, m_i)$ Step S19: The verifier 800 derives the information $I_i$ from the $ID_i$ component and the information $X_i$ from the information $X'_L$, and inputs them, along with the above-mentioned components $e_i$ and $d_i$ and the public information $\{q, a, b, P, k\}$ read out of the memory 88, into the n-fold calculator 830 which calculates the function V, and wherein Z' is calculated by $$Z' = V(X_i * d_i), (I_i * e_i) | i=1, \ldots, L) = (d_1 + \ldots + d_L X_L + e_1 L_1 + \ldots + e_L I_L) \text{ over } E_{a,b}(GF(q)) \tag{83}$$

where $$e_i = f_i(X_i, \ldots, X_i, \{m_1, \ldots, m_i\}) \quad (84)$$

$$d_i = h_i(X_1, \ldots, X_i, \{m_1, \ldots, m_i\}) \quad (85)$$

$(1 \leq I \leq L)$

Step S20: The verifier 800 inputs the L pieces of information $y_i$ and the public information k into the modular adder 840, wherein an accumulated value Y is calculated by $$Y = \sum_{i=1}^{L} y_i \bmod k \quad (86)$$

and inputs it into the n-fold point calculator 845 which calculates the function $\Gamma(Y*P)$, thereby calculating W as follows:

$$W = \Gamma(Y*P) = YP \text{ over } E_{a,b}(GF(q)) \quad (87)$$

Step S2 1: Z' and W are input into the comparator 850, wherein they are compared to make sure that

W=Z'

If they match each other, it is considered that the L documents $m_i$ have each been duly signed by the L authorized signer i.

Taking into account the way of generating the accumulated value Y, $$YP \equiv (y_{L-1}P) + \{d_L(r_L P)\} + \{e_L(s_L P)\} \equiv y_L P + d_L X_L + e_L I_L \equiv \quad (88)$$
$$\cdots \equiv (d_1 X_1 + \cdots + d_L X_L + e_1 I_1 + \cdots + e_L I_L) \text{ over } E_{a,b}(GF(q))$$

Hence, when the above said comparison test by the comparator 850 passes, the verifier 800 accepts the documents $m_1$ (i 1, . . ., L) as having been duly signed by the L authorized signers, respectively.

EVALUATION OF EMBODIMENTS

Now, an evaluation will be made of the present invention in comparison with the RSA and the Schnorr schemes in terms of the computational complexity of basic operations involved in the signing and verification procedures and the redundancy of messages used and in other terms. The system to be evaluated is one that performs the multi-signature and the verification thereof; accordingly, the evaluation will be made of he second and fifth embodiment of the present invention.

The table of FIG. 22 shows, in comparison, basic calculations for the multi-signature and its verification in the RSA scheme, the Schnorr scheme and the second and fifth embodiments of the invention. The table of FIG. 23 shows the number of calculations involved in the signing and verification procedures in the respective schemes when the equations in FIG. 22 are used. FIG. 23 also shows the redundancy of messages, the number of communications necessary for verifying all signatures and the number of rounds of circulation of each message.

(1) Calculation Amount of Signer Apparatus

In the operations for signing use depicted in the table of FIG. 22, the calculations of the one-way functions f, $f_i$ and $h_i$ are faster than the multiplication and the n-fold point calculation; therefore, the amount of calculation of each signer apparatus will be compared in terms of the number of modular N multiplications (including modular N or p calculations) and the number of calculations conducted for the n-fold point on the elliptic curve.

Usually, |N|=1024 and |q|=160 are recommended. In this case, since the leading terms each correspond to the first calculation, the processing speed in the second and fifth embodiments is more than five times higher than in the case of using the RSA cryptosystem as shown in FIG. 23. It has been reported that the computation of the n-fold point on the elliptic curve as in the fifth embodiment is about 10 times faster than in the signing procedure using the RSA cryptosystem (see, for example, http://WW/certicom.com/html/eccqa.html.)

(2) Calculation Amount of Verifier Apparatus

In the calculations for signature verification shown in FIG. 22, the calculations of the one-way functions f, $f_i$ and $h_i$ are faster than the multiplication and the calculation of the n-fold point on the elliptic curve; therefore, the processing amount of the verifier apparatus will be compared in terms of the number of exponentiations (including modular N or p calculations) and the number of calculations conducted for the n-fold point on the elliptic curve. As depicted in FIG. 23, the computational load for the signature verification by the present invention is the same as in the case of using the RSA cryptosystem but substantially one-half that in the case of using he Scinorr scheme.

(3) Redundancy of Message

In any multi-signature schemes the ID information is added to the message for each signature (the ID'$_L$ components) with a view to making the signer clear. In the following, the redundancy of the message {ID', X, m, y} is evaluated using the number of bits of each of the X and y components. The signature component (y component) utilizing the RSA cryptosystem is represented by $D_L \ldots D_1(f(m))$. The results are shown in FIG. 23.

With the method of the second and fifth embodiment according to the present invention, L×|X|+|y| bits. The application of the fifth embodiment provides |p|=|q|=|e|=160 and |X|=|q|+1; hence, 161L+160 bits. This indicates that when $2 \leq L \leq 6$, the method of the fifth embodiment is advantageous.

(4) Number of Communications and Number of Rounds of Circulation

As referred to previously in connection with the background of the present invention, the multi-signature and verification procedure by the Schnorr scheme involves two rounds of circulation of the message to the signers. On this account, the required number of communications is also about twice larger than the other schemes.

As regards the basis of security of the signature and en-bloc verification schemes according to the present invention, difficulty of the discrete logarithm problem by the modulo p precludes any possibility of success in calculating the secret information $s_i$ from the public information {p, q, g, $I_i$}. That each signer apparatus cannot forge the multiple signature including the signature of any other signer apparatus can be guaranteed by combining the methods of the present invention with the "Exact Security" property under the random oracle model that is the results of the theoretical study on the computational complexity.

As for the "Exact Security" property, see, for example, M. Bellare and P. Rogaway, "Random Oracles are Practical: A Paradigm for Designing Efficient Protocols," Proc. of the First ACM Conference on Computer and Communications Security, pp.62–73, and K. Ohta and T. Okamoto, "The Exact Security of Multi-Signature Schemes," Technical Report of IEICE ISEC97–27.

EFFECT OF THE INVENTION

As described above, according to the present invention, the signature generation processing can be performed more than five times faster than in the case of using the RSA scheme. The signature verification processing is common in speed to the case of using the RSA scheme but can be made twice faster than in the case of repeatedly using the Schnorr scheme. When L is 6 or smaller, the redundancy of the message in the present invention is the same as in the case of repeatedly using the Schnorr scheme, and is more advantageous than in the case of using the RSA scheme.

It will be apparent that many modifications and variations may be effected without departing from the scope of the novel concepts of the present invention.

What is claimed is:

1. A method whereby a verifier verifies en bloc digital signatures attached by a series of signers i=1, 2, . . . , L, said L being an integer equal to or greater than 2, to an electronified document $m'_i$, where information containing a parameter q for each of said signer i to generate a signature function $Sg_i$ and a parameter $\beta=G_1(q)$ obtained with a function $G_1$ by the use of said parameter q being published in advance, said method comprising the steps:

wherein said each signer i:

(a) generates a first random number $s_i$ as secret information, then generates information $I_i=G_2(s_i, \beta)$ with a function $G_2$ through the use of a public parameter $\beta$ and said first random number $s_i$, and publishes said information $I_i$ and two one-way functions $f_i$ and $h_i$ and identification information $ID_i$ used by the signer i as his public information $\{ID_i, I_i, f_i, h_i\}$;

(b) generates a second random number $r_i$, then generates information $X_i=\Phi(r_i, \beta)$ by setting said parameter $\beta$ and said second random number $r_i$ in a function $\Phi$, and sets information containing the information $X_i$ as $X'_i$;

(c) generates $e_i=f_i(X'_i, m'_i)$ $d_i=h_i(X'_i, m'_i)$ with said one-way functions $f_i$ and $h_i$ through the use of document information $m'_i$ containing a document $m_i$ to be signed and said information $X'_i$; and (d) generates, for information containing $e_i$, $d_i$, $s_i$ and $r_i$, a signature $y_i=Sg_i(e_i, d_i, s_i, r_i, y_{i-1})$ with a signature function $Sg_i$ generated using said parameter q and, sending information $\{ID'_i, X'_i, m'_i, y_i\}$, containing said identification information $ID_i$ as identification information $ID'_i$, to the next signer (i+1) in the series of signers i=1 to L, the last signer L sending the information $\{ID'_L, X'_L, m'_L, y_L\}$ to a verifier as a final destination: and wherein said verifier:

(e) computes, from said public information $\{ID_i, I_i, f_i, h_i\}$, information $I_i$ corresponding to said identification $ID_i$ contained in said information $ID'_i$ in the received information $\{ID'_L, X'_L, m'_L, y_L\}$ and said one-way functions $f_i$ and $h_i$, and calculates $e_i$ and $d_i$ using said one-way functions $f_i$ and $h_i$ and $X'_i$ and $m'_i$ in said received pieces of information $X'_L$ and $m'_L$;

(f) calculates said information $X_i$ contained in said information $X'_i$, and computes $Z'=V((X_i*d_i), (I_i*e_i)|i=1, \ldots, L)$ with a function V containing calculations $(X_i*d_i)$ of said $d_i$ and said $X_i$ and $(I_i*e_i)$ of said $e_i$ and said $I_i$ for i=1, . . . , L; and (g) computes $W=\Gamma(y_L*\beta)$ with a function $\Gamma$ containing a calculation $(y_L*\beta)$ of said $y_L$ and said $\beta$, then makes a check to see if W=Z', and if both values match each other, decides that said signatures are all valid.

2. The method of claim 1, wherein:

$X'_i=(X'_{i-1}, X_i)$, $X'_0$=empty set $m'_i=(m'_{i-1}, m_i)$, $m'_0$=empty set $ID'_i=(ID'_{i-1}, ID_i)$, $ID'_0$=empty set $y_0=0$;

said signer i receives $\{ID'_{i-1}, X'_{i-1}, m'_{i-1}, y_{i-1}\}$ from a signer (i−1), and executes said steps (b) through (d), sending information $\{ID'_i, X'_i, m'_i, y_i\}$ to a signer (i+1); and the last signer L executes said steps (b) through (d) on information received from a signer (L−1), generating and sending signature information $\{ID'_L, X'_L, m'_L, y_L\}$ to said verifier.

3. The method of claim 2, wherein: $m'_1=m_1=m$; $m_2=m_3 \ldots =m_L$=empty message; said signer i receives information $\{ID'_{i-1}, X'_{i-1}, m, y_{i-1}\}$ from said signer (i−1), and executes said steps (b) through (d), sending information $\{ID'_i, X'_i, m, y_i\}$ to said signer (i+1); and said last signer L executes said steps (b) through (d) on the information received from said signer (i−1), generating and sending signature information $\{ID'_L, X'_L, m, y_L\}$ to said verifier.

4. The method of claim 2 or 3, wherein said $ID'_i=(ID'_{i-1}, ID_i)$ is replaced with $ID'_i=(ID'_{i-1}, I_i)$.

5. The method of claim 2 or 3, wherein: letting the number of elements of a group be represented by p, letting an element g of said group, at which a group calculation starts, be represented by said parameter $\beta$, and letting an integer, with which when said element g is group-calculated q times, said calculation returns to g, be represented by said parameter q, these parameters $\{p, q, g\}$ are published as system public information;

the calculation of said information $I_i$ using said function $G_2(s_i, g)$ in said step (a) is conducted by $s_i$-times group-calculation of said parameter g using said parameter p;

the calculation of said information $X_i$ using said function $\Phi$ in said step (b) is conducted by $r_i$-times group-calculations of said parameter g using said parameter p;

said step (f) is a step of obtaining Z' by sequentially calculating values $(X_i*d_i)$ obtained by $d_i$-times multi-component group-calculations of $X_i$ and values $(I_i*e_i)$ obtained by $e_i$-times multi-component group-calculations of $I_i$ for every signer i from 1 to L; and said step (g) is a step of calculating W by conducting $y'_L$-times calculations of said parameter g using said received $y_L$ and said pieces of public information p and q.

6. The method of claim 5, which further comprises a step of pregenerating said p and q that are primes bearing the relationship of 1=p mod q, and generating a primitive element $\alpha$ of $(Z/pZ)^*$, and wherein:

said function $G_1$ for calculating said parameter $\beta$=g is given by the following equation:

$g=G_1(q)=\alpha^{(p-1)/q}\bmod p$;

said function $G_2(s_i, g)$ in said step (a) is given by the following equation:

$I_i=G_2(s_i, g)=g^{s_i}\bmod p$ said function $\Phi$ in said step (b) is given by the following equation:

$X_i=\Phi(r_i, g)=g^{r_i}\bmod p$;

said signature function $Sg_i$ in said step (d) is given by the following equation using said $e_i$, $d_i$, $r_i$, $s_i$, q and $y_{i-1}$:

$$y_i = Sg_i(e_i, d_i, s_i, r_i, y_{i-1}) = (y_{i-1} + d_i r_i + e_i s_i) \bmod q;$$

said function V in said step (f) is given by the following equation:

$$Z' = V((X_1 * d_1), (I_i * e_i) | i = 1, \ldots, L)\ X_1^{d_1} I_1^{e_L} \cdots X_L^{d_L} I_L^{e_L} \bmod p;\ \text{and}$$

said function $\Gamma$ in said step (g) is given by the following equation:

$$W = \Gamma(y_L * g) = g^{y_L} \bmod p.$$

7. The method of claim 2 or 3, wherein said parameter q is a parameter of a definition field GF(q) of an elliptic curve $E_{a,b}(GF(q))$, and letting a base point of an order k on said elliptic curve be represented by said parameter $\beta$ and a parameter of said elliptic curve by a, b∈GF(q), these parameters {q, a, b, P,k} are published as system public information; and wherein:

the calculation of said information $I_i$ using said function $G_2(s_i, P)$ in said step (a) is conducted by $s_i$-times group-calculations of said parameter p;

the calculation of said information $X_i$ using said function $\Phi$ in said step (b) is conducted by $r_i$-times group-calculations of said parameter P;

said step (f) is a step of obtaining Z' by sequentially calculating values $(X_i * d_i)$ obtained by $d_i$-times multi-component group-calculations of $X_i$ and values $(I_i * e_i)$ obtained by $e_i$-times multi-component group-calculations of $I_i$ for every signer i from 1 to L; and said step (g) is a step of calculating W by $y_L$-times calculations of said parameter P on said elliptic curve using said received information $y_L$ and said public information p.

8. The method of claim 7, wherein:

said function $G_1$ for calculating said parameter $\beta = P$ is given by the following equation:

$$G_1(q) = P \in E_{a,b}(GF(q));$$

said function $G_2(s_i, P)$ in said step (a) is given by the following equation:

$$I_i = G_2(s_i, P) = s_i P\ \text{over}\ E_{a,b}(GF(q));$$

said function $\Phi$ in said step (b) is given by the following equation:

$$X_i = \Phi(r_i, P) = r_i P\ \text{over}\ E_{a,b}(GF(q));$$

said signature function $Sg_i$ in said step (d) is given by the following equation using said $e_i$, $d_i$, $e_i$, $s_i$ and $y_{i-1}$:

$$y_i = Sg_i(e_i, d_i, s_i, r_i, y_{i-1}) = (y_{i-1} + d_i r_i + e_i s_i) \bmod k;$$

said function V in said step (f) is given by the following equation:

$$Z' = V((X_i * d_i), (I_i * e_i) | i = 1, \cdots, L)$$

$$= (d_1 X_1 + \cdots + d_L X_L + e_1 I_1 + \cdots + e_L I_L)\ \text{over}\ E_{a,b}(GF(q));\ \text{and}$$

said function $\Gamma$ in said step (g) is given by the following equation:

$$W = \Gamma(y_L * P) = y_L P\ \text{over}\ E_{a,b}(GF(q)).$$

9. A method whereby a verifier verifies en bloc digital signatures attached by signers i to an electronified document $m'_i$, where i=1, 2, . . . , L, said L being an integer equal to or greater than 2, information containing a parameter q for each of said signer i to generate a signature function $Sg_i$ and a parameter $\beta = G_1(q)$ obtained with a function $G_1$ by the use of said parameter q being published in advance, said method comprising the steps:

wherein said each signer i:

(a) generates a first random number $s_i$ as secret information, then generates information $I_i = G_2(s_i, \beta)$ with a function $G_2$ through the use of a public parameter $\beta$ and said first random number $s_i$, and publishes said information $I_i$ and two one-way functions $f_i$ and $h_i$ and identification information $ID_i$ used by the signer i as his public information $\{ID_i, I_i, f_i, h_i\}$;

(b) generates a second random number $r_i$, then generates information $X_i = \Phi(r_i, \beta)$ by setting said parameter $\beta$ and said second random number $r_i$ in a function $\Phi$, and sets information containing the information $X_i$ as $X'_i$;

(c) generates $$e_i = f_i(X'_i, m'_i)$$
$$d_i = h_i(X'_i, m'_i)$$

with said one-way functions $f_i$ and $h_i$ through the use of document information $m'_i$ containing a document $m_i$ to be signed and said information $X'_i$; and (d) generates, for information containing $e_i$, $d_i$, $s_i$ and $r_i$, a signature $$y_i = Sg_i(e_i, d_i, s_i, r_i)$$

with a signature function $Sg_i$ generated using said parameter q and, sending out information $\{ID'_i, X'_i, m'_i, y_i\}$, containing said identification information $ID_i$ as identification information $ID'_i$ to a verifier as a final destination: and wherein said verifier:

(e) computes, from said public information $\{ID_i, I_i, f_i, h_i\}$, information $I_i$ corresponding to said identification $ID_i$ contained in said information $ID'_i$ in the received information $\{ID'_i, X'_i, m'_i, y_i\}$ and said one-way functions $f_i$ and $h_i$, and calculates $e_i$ and $d_i$ using said one-way functions $f_i$ and $h_i$ and said received pieces of information $X'_i$ and $m'_i$;

(f) calculates said information $X_i$ contained in said information $X'_i$, and computes $$Z' = V((X_i * d_i), (I_i * e_i) | i=1, \ldots, L)$$

with a function V containing calculations $(X_i * d_i)$ of said $d_i$ and said $X_i$ and $(I_i * e_i)$ of said $e_i$ and said $I_i$ for i=1, . . . , L; and (g) computes $W = \Gamma(Y * \beta)$ with a function $\Gamma$ containing a calculation $(Y * \beta)$ using $\beta$ and an accumulated value Y of $y_1$ to $y_L$, then makes a check to see if W=Z', and if both values match each other, decides that said signatures are all valid.

10. The method of claim 9, wherein: $X'_i = X_i$, $m'_i = m_i$, and $ID'_i = ID_i$; and said each signer executes said steps (b)

through (d), generating and sending information $\{ID_i, X_i, m_i, y_i\}$ individually to said verifier.

11. The method of claim 10, wherein: letting the number of elements of a group be represented by p, letting an element g of said group, at which a group calculation starts, be represented by said parameter β, and letting an integer, with which when said element g is group-calculated q times, said calculation returns to g, be represented by said parameter q, these parameters $\{p, q, g\}$ are published as system public information;

the calculation of said information $I_i$ using said function $G_2(s_i, g)$ in said step (a) is conducted by $s_i$-times group-calculation of said parameter g using said parameter p;

the calculation of said information $X_i$ using said function F in said step (b) is conducted by $r_i$-times group-calculation of said parameter g using said parameter p;

said step (f) is a step of obtaining Z' by sequentially calculating values $(X_i*d_i)$ obtained by $d_i$-times multi-component group-calculations of $X_i$ and values $(I_i*e_i)$ obtained by $e_i$-times multi-component group-calculations of $I_i$ for every signer i from 1 to L; and said step (g) is a step of calculating an accumulated value Y using L received pieces of information $y_i$, and generating, as said W, a value $(g*Y)$ obtained by operating, Y times, said parameter g using said Y and said pieces of public information p and q.

12. The method of claim 11, which further comprises a step of pregenerating said p and q that are primes bearing the relationship of 1=p mod q, and generating a primitive element α of $(Z/pZ)^*$, and wherein:

said function $G_1$ for calculating said parameter β=g is given by the following equation:

$$g = G_1(q) = \alpha^{(p-1)/q} \bmod p;$$

said function $G_2(s_i, g)$ in said step (a) is given by the following equation:

$$I_i = G2(s_i, g) = g^{s_i} \bmod p$$

said function Φ in said step (b) is given by the following equation:

$$X_i = \Phi(r_i, g) = g^{r_i} \bmod p;$$

said signature function $Sg_i$ in said step (d) is given by the following equation using said $e_i$, $d_i$, $r_i$, $s_i$ and q:

$$y_i = Sg_i(e_i, d_i, s_i, r_i) = (d_i r_i + e_i s_i) \bmod q;$$

said function V in said step (f) is given by the following equation:

$$Z' = V((X_i*d_i), (I_i*e_i) \mid i = 1, \ldots, L)$$
$$= X_1^{d_1} I_1^{e_1} \cdots X_L^{d_L} I_L^{e_L} \bmod p; \text{ and}$$

in said step (g), said accumulated value Y is calculated by $$Y = \sum_{i=1}^{L} y_i \bmod q$$

and said function Γ in said step (g) is given by the following equation:

$$W = \Gamma(Y*g) = g^Y \bmod p.$$

13. The method of claim 10, wherein said parameter q is a parameter of a definition field GF(q) of an elliptic curve $E_{a,b}(GF(q))$, and letting a base point of an order k on said elliptic curve be represented by said parameter β, a parameter of said elliptic curve by a, b∈GF(q), these parameters $\{q, a, b, P, k\}$ are published as system public information; and wherein:

the calculation of said information $I_i$ using said function $G_2(s_i, P)$ in said step (a) is conducted by $s_i$-times group-calculations of said parameter p;

the calculation of said information $X_i$ using said function Φ in said step (b) is conducted by $r_i$-times group-calculations of said parameter P;

said step (f) is a step of obtaining Z' by sequentially calculating values $(X_i*d_i)$ obtained by $d_i$-times multi-component group-calculations of $X_i$ and values $(I_i*e_i)$ obtained by $e_i$-times multi-component group-calculations of $I_i$ for every signer i from 1 to L; and said step (g) is a step of calculating W by Y-times calculations of said parameter P on said elliptic curve using said received information $y_L$ and said public information p.

14. The method of claim 13, wherein:

said function $G_1$ for calculating said parameter β=P is given by the following equation:

$$G_1(q) = P \in E_{a,b}(GF(q));$$

said function $G_2(s_i, P)$ in said step (a) is given by the following equation:

$$I_i = G_2(s_i, P) = s_i P \text{ over } E_{a,b}(GF(q));$$

said function Φ in said step (b) is given by the following equation:

$$X_i = \Phi(r_i, P) = r_i P \text{ over } E_{a,b}(GF(q));$$

said signature function $Sg_i$ in said step (d) is given by the following equation using said $e_i$, $d_i$, $r_i$ and $s_i$:

$$y_i = Sg_i(e_i, d_i, s_i, r_i) = (d_i r_i + e_i s_i) \bmod k;$$

said function V in said step (f) is given by the following equation:

$$Z' = V((X_i*d_i), (I_i*e_i) \mid i = 1, \cdots, L)$$
$$= (d_1 X_1 + \cdots + d_L X_L + e_1 I_1 + \cdots + e_L I_L) \text{ over } E_{a,b}(GF(q)); \text{ and}$$

said function Γ in said step (g) is given by the following equation:

$$W = \Gamma(Y*P) = YP \text{ over } E_{a,b}(GF(q))$$

where $$Y = \sum_{i=1}^{L} y_i \bmod k.$$

15. A signer apparatus for a system in which each of a series of signers i=1, ..., L, L being an integer equal to or greater than 2, attaches a digital signature to an electronified document $m'_i$ and a verifier verifies said digital signatures en bloc, wherein said, information containing a parameter q for each of said signers i to generate a signature function $Sg_i$ and a parameter $\beta=G_1(q)$ obtained with a function $G_1$ by the use of said parameter q are published in advance, said signer apparatus comprising:

storage means for storing said public parameters q and $\beta$ of said system, identification information $ID_i$ of said each signer i and a first random number $s_i$ as his secret information;

function $G_2$ means for generating information $I_i=G_2(s_i, \beta)$ with a function $G_2$ through the use of said public parameter $\beta$ and said first random number $s_i$, said information $I_i$ being published as signer public information $\{ID_i, I_i, f_i, h_i\}$ together with a pair of one-way functions $f_i$ and $h_i$ and identification information $ID_i$ that said each signer i uses;

random generator means for generating a second random number $r_i$;

function $\Phi$ means for setting said parameter $\beta$ and said second random number $r_i$ in a function $\Phi$ to generate information $X_i=\Phi(r_i, \beta)$;

a pair of one-way function means for generating
$e_i=f_i(X'_i, m'_i)$
$d_i=hi(X'_i, m'_i)$
with said pair of one-way functions $f_i$ and $h_i$ through the use of document information $m'_i$ containing a document in to be signed and information $X'_i$ containing said information $X_i$;

signature function means for generating, for information containing $e_i$, $d_i$, $s_i$, $r_i$ and $y_{i-1}$, a signature
$y_i=Sg_i(e_i, d_i, s_i, r_i, y_{i-1})$
with a signature function $Sg_i$ generated using said parameter q; and means for sending information $\{ID'_i, X'_i, m'_i, y_i\}$, as information containing said identification information $ID_i$, to the next signer (i+1) in a series of signers 1 to L, the last signer L sending the information $\{ID'_L, X'_L, m'_L, y_L\}$ to a verifier as a final destination.

16. The signer apparatus of claim 15, wherein
$X'_i=(X'_{i-1}, X_i)$, $X'_0$=empty set
$m'_i=(m'_{i-1}, m_i)$, $m'_0$=empty set
$ID'_i=(ID'_{i-1}, ID_i)$, $ID'_0$=empty set
$y_0=0$;
upon receiving $\{ID'_{i-1}, X'_{i-1}, m'_{i-1}, y_{i-1}\}$ from a signer (i−1), said sending means sends out information $\{ID'_i, X'_i, m'_i, y_i\}$ to the next signer (i+1).

17. The signer apparatus of claim 16, wherein: $m'_1=m_1=m$; $m_2=m_3 \ldots =m_L$=empty message; said signer i apparatus receives information $\{ID'_{i-1}, X'_{i-1}, m, y_{i-1}\}$ from said signer (i−1); and said sending means sends out said information $\{ID'_i, X'_i, m, y_i\}$ to the next signer (i+1).

18. The signer apparatus of claim 16 or 17, wherein said $ID'_i=(ID'_{i-1}, ID_i)$ is replaced with $ID'_i=(ID'_{i-1}, I_i)$.

19. The signer apparatus of claim 16 or 17, wherein: letting the number of elements of a group be represented by p, letting an element g of said group, at which a group calculation starts, be represented by said parameter $\beta$, and letting an integer, with which when said element g is group-calculated q times, said calculation returns to g, be represented by said parameter q, these parameters $\{p, q, g\}$ are published as system public information;

said function $G_2$ means is means for calculating said information $I_i$ by conducting $s_i$-times group-calculations of said parameter g using said parameter p; and said function $\Phi$ means is means for calculating said information $X_i$ by conducting $r_i$-times group-calculations of said parameter g using said parameter p.

20. The signer apparatus of claim 19, wherein: said p and q are primes bearing the relationship of 1=p mod q; letting a primitive element of $(Z/pZ)^*$ be represented by $\alpha$, said parameter $\beta$=g is given by the following equation with said function $G_1$:

$$g=G_1(q)=\alpha^{(p-1)/q} \bmod p;$$

said function $G_2$ means is means for calculating said function $G_2(s_i, g)$ by the following equation:

$$I_i=G_2(s_i, g)=g^{s_i} \bmod p$$

said function $\Phi$ means is means for calculating said function $\Phi$ by the following equation:

$$X_i=\Phi(r_i, g)=g^{r_i} \bmod p;$$

and said signature function means is means for calculating said signature function $Sg_i$ by the following equation using said $e_i$, $d_i$, $r_1$, $s_i$, q and $y_{i-1}$:

$$y_i=Sg_i(e_i, d_i, s_i, r_i, y_{i-1})=(y_{i-1}+d_ir_i+e_is_i) \bmod q.$$

21. The signer apparatus of claim 16 or 17, wherein said parameter q is a parameter of a definition field GF(q) of an elliptic curve $E_{a,b}(GF(q))$, and letting a base point of an order k on said elliptic curve be represented by said parameter $\beta$ and a parameter of said elliptic curve by a, b∈GF(q), these parameters $\{q, a, b, P, k\}$ are published as system public information; and wherein:

said function $G_2$ means is means for calculating said information $I_i$, based on said function $G_2(s_i, P)$, by conducting $s_i$-times group-calculations of said parameter p; and said function $\Phi$ means is means for calculating said information $X_i$, based on said function $\Phi$, by conducting $r_i$-times group-calculations of said parameter P.

22. The signer apparatus of claim 21, wherein:

said parameter $\beta$=P is given based on said function $G_1$ by the following equation:

$$G_1(q)=P \in E_{a,b}(GF(q));$$

said function G2 means is means for calculating said function $G_2(s_i, P)$ by the following equation:

$$I_i=G_2(s_i, P)=s_iP \text{ over } E_{a,b}(GF(q));$$

said function $\Phi$ means is means for calculating said function a by the following equation:

$$X_i=\Phi(r_i, P)=r_iP \text{ over } E_{a,b}(GF(q));$$

and said signature function means is means for calculating said signature function $Sg_i$ by the following equation using said $e_i$, $d_i$, $r_i$, $s_i$ and $y_{i-1}$:

$$y_i=Sg_i(e_i, d_i, s_i, r_i, y_{i-1})=(y_{i-1}+d_ir_i+e_is_i) \bmod k.$$

23. A signer apparatus for a system in which each of signers i=1, . . . , L, said L being an integer equal to or greater than 2, attaches a digital signature to an electronified document m'$_i$ and a verifier verifies said digital signatures en bloc, wherein said information containing a parameter q for each of said signers i to generate a signature function Sg$_i$ and a parameter β=G$_1$(q) obtained with a function G$_1$ by the use of said parameter q are published in advance, said signer apparatus comprising:

storage means for storing said public parameters q and β of said system, identification information ID$_i$ of said each signer i and a first random number s$_i$ as his secret information;

function G$_2$ means for generating information I$_i$=G$_2$(s$_i$, β) with a function G$_2$ through the use of said public parameter β and said first random number s$_i$, said information I$_i$ being published as signer public information {ID$_i$, I$_i$, f$_i$, h$_i$} together with a pair of one-way functions f$_i$ and h$_i$ and identification information ID$_i$ that said each signer i uses;

random generator means for generating a second random number r$_i$;

function Φ means for setting said parameter β and said second random number r$_i$ in a function Φ to generate information X$_i$=Φ(r$_i$, β);

a pair of one-way function means for generating
    e$_i$=f$_i$(X'$_i$, m'$_i$)
    d$_i$=hi(X'$_i$, m'$_i$)
    with said pair of one-way functions f$_i$ and h$_i$ through the use of document information m'$_i$ containing a document m$_i$ to be signed and information X'$_i$ containing said information X$_i$, signature function means for generating, for information containing e$_i$, d$_i$, s$_i$ and r$_i$, a signature
    y$_i$=Sg$_i$(e$_i$, d$_i$, s$_i$, r$_i$)
    with a signature function Sg$_i$ generated using said parameter q; and means for sending information {ID'$_i$, X'$_i$, m'$_i$, y$_i$}, as information containing said identification information ID$_i$ to a verifier.

24. The signer apparatus of claim 23, wherein: X'$_i$=X$_i$, m'$_i$=m$_i$, and ID'$_i$=ID$_i$; and said sending means generates and sends information {ID$_i$, X$_i$, m$_i$, y$_i$}, as said information {ID'$_i$, X'$_i$, m'$_i$, y$_i$}, to said verifier.

25. The signer apparatus of claim 24, wherein: letting the number of elements of a group be represented by p, letting an element g of said group, at which a group calculation starts, be represented by said parameter β, and letting an integer, with which when said element g is group-calculated q times, said calculation returns to g, be represented by said parameter q, these parameters {p, q, g} are published as system public information;

said function G$_2$ means is means for calculating said information I$_i$, base on said function G$_2$(s$_i$, g), by conducting s$_i$-times group-calculations of said parameter g using said parameter p; and said function Φ means is means for calculating said information X$_i$, based on said function Φ by conducting r$_i$-times group-calculations of said parameter g using said parameter p.

26. The signer apparatus of claim 25, wherein: said p and q are primes bearing the relationship of 1=p mod q; letting a primitive element of (Z/pZ)* be represented by α, said function G$_1$ means for calculating said parameter β=g is means for calculating $$g=G_1(q)=\alpha^{(p-1)/q} \bmod p;$$

said function G$_2$ means is means for calculating said function G$_2$(s$_i$, g) by the following equation:

$$I_i=G_2(s_i, g)=g^{s_i} \bmod p$$

said function Φ means is means for calculating said function Φ by the following equation:

$$X_i=\Phi(r_i, g)=g^{r_i} \bmod p;$$

and said signature function means is means for calculating said signature function Sg$_i$ by the following equation using said e$_i$, d$_i$, r$_i$, s$_i$, and q:

$$y_i=Sg_i(e_i, d_i, s_i, r_i)=(d_i r_i + e_i s_i) \bmod q.$$

27. The signer apparatus of claim 24, wherein said parameter q is a parameter of a definition field GF(q) of an elliptic curve E$_{a,b}$(GF(q)), and letting a base point of an order k on said elliptic curve be represented by said parameter β and a parameter of said elliptic curve by a, b∈GF(q), these parameters {q, a, b, P,k} are published as system public information; and wherein:

said function G$_2$ means is means for calculating said information I$_i$, based on said function G$_2$(s$_i$, P), by conducting s$_i$-times group-calculations of said parameter p; and said function Φ means is means for calculating said information X$_i$, based on said function Φ, by conducting r$_i$-times group-calculations of said parameter P.

28. The signer apparatus of claim 27, wherein:

said parameter β=P is given based on said function G$_1$ by the following equation:

$$G_1(q)=P \in E_{a,b}(GF(q));$$

said function G2 means is means for calculating said function G$_2$(s$_i$, P) by the following equation:

$$I_i=G_2(s_i, P)=s_i P \text{ over } E_{a,b}(GF(q));$$

said function Φ means is means for calculating said function Φ by the following equation:

$$X_i=\Phi(r_i, P)=r_i P \text{ over } E_{a,b}(GF(q));$$

and said signature function means is means for calculating said signature function Sg$_i$ by the following equation using said e$_i$, d$_i$, r$_i$ and s$_i$:

$$y_i=Sg_i(e_i, d_i, s_i, r_i)=(d_i r_i + e_i s_i) \bmod k.$$

29. A verifier apparatus for a system in which each of a series of signers i=1 to L, L being an integer equal to or greater than 2, attaches a digital signature to an electronified document m'$_i$ and a verifier verifies the digital signatures of the signers en bloc, wherein information containing a parameter q for each of said signers, i, to generate a signature function Sg$_i$ and a parameter β=G$_1$(q) obtained with a function G$_1$ by the use of said parameter q are published in advance, said verifier apparatus comprising:

a pair of one-way function means for obtaining, from public information {ID$_i$, I$_i$, f$_i$, h$_i$}, information I$_i$ corresponding to identification information ID$_i$ contained in ID'$_L$ in information {ID'$_L$, X'$_L$, m'$_L$, y$_L$} received from the last one, L, of the series of signers and one-way functions f$_i$ and h$_i$, and for calculating
    e$_i$=f$_i$(X'$_i$, m'$_i$)
    d$_i$=h$_i$(X'$_i$, m'$_i$)

through the use of said one-way functions $f_i$ and $h_i$ and information $X'_i$ and $m'_i$ contained in said received pieces of information $X'_L$ and $m'_L$;

function V means for obtaining $X_i$ in said information $X'_i$ and for calculating $$Z'=V((X_i*d_i), (I_i*e_i)|i=1,\ldots,L)$$

through the use of a function V containing a calculation $(X_i*d_i)$ of $d_i$ and $X_i$ and a calculation $(I_i*e_i)$ of $e_i$ and $I_i$;

function $\Gamma$ means for obtaining $W=\Gamma(y_i*\beta)$ by a function $\Gamma$ containing a calculation $(y_i*\beta)$ of $y_i$ and $\beta$; and comparison means supplied with said Z' and W, for making a check to see if they match each other, and if they match each other, providing an output indicating that said received document $(m_1, \ldots, m_L)$ have been duly signed by L signer i apparatuses.

30. The verifier apparatus of claim 29, wherein
$X'_i=(X'_{i-1}, X_i)$, $X'_0$=empty set
$m'_i=(m'_{i-1}, m_i)$, $m'_0$=empty set
$ID'_i=(ID'_{i-1}, ID_i)$, $ID'_0$=empty set
$y_0$=empty set.

31. The verifier apparatus of claim 30, wherein: $m'_i=m'_1=m$; $m_2=m_3 \ldots =m_L$=empty sets; said verifier apparatus receives signed information $\{ID_L, X_L, m_L, y_L\}$ directly from said last signer L.

32. The verifier apparatus of claim 30 or 31, wherein said $ID'_i=(ID'_{i-1}, ID_i)$ is replaced with $ID'_i=(ID'_{i-1}, I_i)$.

33. The verifier apparatus of claim 30 or 31, wherein: letting the number of elements of a group be represented by p, letting an element g of said group, at which a group calculation starts, be represented by said parameter $\beta$, and letting an integer, with which when said element g is group-calculated q times, said calculation returns to g, be represented by said parameter q, these parameters $\{p, q, g\}$ are published as system public information;

said function V means is means for obtaining Z' by sequentially calculating values $(X_i*d_i)$ obtained by $d_i$-times multi-component group-calculations of $X_i$ and values $(I_i*e_i)$ obtained by $e_i$-times multi-component group-calculations of $I_i$ for every i from 1 to L; and said function $\Gamma$ means is means for obtaining W by conducting $y_L$-times group-calculations of said parameter g using received $y_L$ and said pieces of public information p and q.

34. The verifier apparatus of claim 33, wherein: said p and q are primes bearing the relationship of $1=p \mod q$; letting a primitive element of $(Z/pZ)^*$ be represented by $\alpha$, said parameter $\beta=g$ is given by the following equation with said function $G_1$:

$$g=G_1(q)=\alpha^{(p-1)/q} \mod p;$$

said function V means is means for calculating said function V by the following equation:

$$Z' = V((X_i*d_i), (I_i*e_i)|i=1,\ldots,L)$$
$$= X_1^{d_1} I_1^{e_1} \cdots X_L^{d_L} I_L^{e_L} \mod p; \text{ and}$$

said function $\Gamma$ means is means for calculating said function $\Gamma$ by the following equation:

$$W=\Gamma(y_i*g)=g^{y_L} \mod p.$$

35. The verifier apparatus of claim 30 or 31, wherein said parameter q is a parameter of a definition field GF(q) of an elliptic curve $E_{a,b}(GF(q))$, and letting a base point of an order k on said elliptic curve be represented by said parameter $\beta$ and a parameter of said elliptic curve by a, b$\in$GF(q), these parameters $\{q, a, b, P, k\}$ are published as system public information; and wherein:

said function V means is means for obtaining Z' by sequentially calculating values $(X_i*d_i)$ obtained by $d_i$-times multi-component group-calculations of $X_i$ and values $(I_i*e_i)$ obtained by $e_i$-times multi-component group-calculations of $I_i$ for every i from 1 to L; and said function $\Gamma$ means is means for calculating W by $y_L$-times calculations of said parameter P on said elliptic curve using said received information $y_L$ and said public information P.

36. The verifier apparatus of claim 35, wherein:
said function $G_1$ for calculating said parameter $\beta=P$ is given by the following equation:

$$G_1(q)=P\in E_{a,b}(GF(q));$$

said function V means is means for calculating said function V by the following equation:

$$Z' = V((X_i*d_i), (I_i*e_i)|i=1,\cdots,L)$$
$$= (d_1X_1+\cdots+d_LX_L+e_1I_1+\cdots+e_LI_L) \text{ over } E_{a,b}(GF(q)); \text{ and}$$

said function $\Gamma$ means is means for calculating said function $\Gamma$ by the following equation:

$$W=\Gamma(y_L*P)=y_LP \text{ over } E_{a,b}(GF(q)).$$

37. A verifier apparatus for a system in which each of signers i=1 to L, L being an integer equal to or greater than 2, attaches a digital signature to an electronified document $m'_i$ and a verifier verifies the digital signatures of the signers en bloc, wherein information containing a parameter q for each of said signers, i, to generate a signature function $Sg_i$ and a parameter $\beta=G_1(q)$ obtained with a function $G_1$ by the use of said parameter q are published in advance, said verifier apparatus comprising:

a pair of one-way function means for obtaining, from public information $\{ID_i, I_i, f_i, h_i\}$ information $I_i$ corresponding to identification information $ID_i$ contained in $ID'_i$ in information $\{ID'_i, X'_i, m'_i, y_i\}$ received from each of said signers, i, and one-way functions $f_i$ and $h_i$, and for calculating $e_i=f_i(X'_i, m'_i)$
$d_i=h_i(X'_i, m'_i)$ through the use of said one-way functions $f_i$ and $h_i$ and said received pieces of information $X'_i$ and $m'_i$;

function V means for obtaing $X_i$ in said information $X'_i$ and for calculating $$Z'=V((X_i*d_i), (I_i*e_i)|i=1,\ldots,L)$$

through the use of a function V containing a calculation $(X_i*d_i)$ of $d_i$ and $X_i$ and a calculation $(I_i*e_i)$ of $e_i$ and $I_i$;

function $\Gamma$ means for obtaining $W=\Gamma(Y*\beta)$ by a function $\Gamma$ containing a calculation $(Y*\beta)$ using $\beta$ and an accumulated value Y of $y_1$ to $y_L$; and comparison means supplied with said Z' and W, for making a check to see if they match each other, and if they match each other, providing an output indicating that said received document $(m_1, \ldots, m_L)$ have been duly signed by L signer i apparatuses.

38. The verifier apparatus of claim 35, wherein: $X'_i=X_i$, $m'_i=m_i$, and $ID'_i=ID_i$.

39. The verifier apparatus of claim 36, wherein: letting the number of elements of a group be represented by p, letting an element g of said group, at which a group calculation starts, be represented by said parameter β, and letting an integer, with which when said element g is group-calculated q times, said calculation returns to g, be represented by said parameter q, these parameters {p, q, g} are published as system public information;

said function V means is means for obtaining Z' by sequentially calculating values $(X_i*d_i)$ obtained by $d_i$-times multi-component group-calculations of $X_i$ and values $(I_i*e_i)$ obtained by $e_i$-times multi-component group-calculations of $I_i$ for every i from 1 to L; and said function Γ means is means for calculating an accumulated value Y using L received pieces of information $y_i$, and generating, as said W, a value (g*Y) obtained by calculating Y times said parameter g using said Y and said pieces of public information p and q.

40. The verifier apparatus of claim 39, wherein: said p and q are primes bearing the relationship of 1=p mod q; letting a primitive element of (Z/pZ)* be represented by α, said parameter β=g is given by the following equation with said function $G_1$:

$$g = G_1(q) = \alpha^{(p-1)/q} \bmod p;$$

said function V means is means for calculating said function V by the following equation:

$$Z' = V((X_i*d_i), (I_i*e_i) | i = 1, \ldots, L)$$
$$= X_1^{d_1} I_1^{e_1} \cdots X_L^{d_L} I_L^{e_L} \bmod p; \text{ and}$$

said function Γ means is means for calculating said accumulated value Y by the following equation:

$$Y = \sum_{i=1}^{L} y_i \bmod q$$

and calculating said function Γ by the following equation:

$$W = \Gamma(Y*g) = g^Y \bmod p.$$

41. The verifier apparatus of claim 40, wherein said parameter q is a parameter of a definition field GF(q) of an elliptic curve $E_{a,b}(GF(q))$, and letting a base point of an order k on said elliptic curve be represented by said parameter β and a parameter of said elliptic curve by a, b∈GF(q), these parameters {q, a, b, P,k} are published as system public information; and wherein:

said function V means is means for obtaining Z' by sequentially calculating values $(X_i*d_i)$ obtained by $d_i$-times multi-component group-calculations of $X_i$ and values $(I_i*e_i)$ obtained by $e_i$-times multi-component group-calculations of $I_i$ for every i from 1 to L; and said function Γ means is means for calculating W by $y_L$-times calculations of said parameter P on said elliptic curve using said received information $y_L$ and said public information P.

42. The verifier apparatus of claim 41, wherein:
said function $G_1$ for calculating said parameter β=P is given by the following equation:

$$G_1(q) = P \in E_{a,b}(GF(q));$$

said function V means is means for calculating said function V by the following equation:

$$Z' = V((X_i*d_i), (I_i*e_i) | i = 1, \ldots, L)$$
$$= (d_1 X_1 + \cdots + d_L X_L + e_1 I_1 + \cdots + e_L I_L) \text{ over } E_{a,b}(GF(q)); \text{ and}$$

said function Γ means is means for calculating said function Γ by the following equation:

$$W = \Gamma(Y*P) = YP \text{ over } E_{a,b}(GF(q))$$

where $$Y = \sum_{i=1}^{L} y_i \bmod k.$$

43. A recording medium for a signer apparatus which has recorded thereon a program which is used in said signer apparatus in a system in which: each of a series of signers, i, attaches a digital signature to an electronified document $m'_i$ and a verifier verifies said digital signatures en bloc; i=1, . . . , L, L being an integer equal to or greater than 2; information containing a parameter q for each signer i to generate a signature function $Sg_i$ and a parameter $β=G_1(q)$ obtained with a function $G_1$ through the use of said parameter q is published in advance; and information $I_i=G_2(s_i, β)$ pregenerated by said each signer i using said public parameter β and a secret random number $s_i$, a pair of one-way functions $f_i$ and $h_i$ for use by said each signer i and identification information $ID_i$ are published as signer public information $\{ID_i, I_i, f_i, h_i\}$ in advance; said program comprising the steps of:

(a) generating a second random number $r_i$;

(b) setting said parameter β and said second random number $r_i$ in a function Φ to generate information $X_i=Φ(r_i, β)$;

(c) generating
$e_i=f_i(X'_i, m'_i)$
$d_i=h_i(X'_i, m'_i)$
with said one-way functions $f_i$ and $h_i$ through the use of document information $m'_i$ containing said document $m_i$ to be signed and said information $X'_i$ containing said information $X_i$;

(d) generating, for information containing $e_i$, $d_i$, $s_i$, $r_i$ and $y_{i-1}$, a signature
$y_i=Sg_i(e_i, d_i, s_i, r_i, y_{i-1})$
with a signature function $Sg_i$ generated using said parameter q; and (e) sending information $\{ID'_i, X'_i, m'_i, y_i\}$, containing said identification information $ID_i$ as identification information $ID'_i$, to the next signer (i+1), the last signer L sending the information $\{ID'_L, X'_L, m'_L, m'_L, y_L\}$ to a verifier as a final destination.

44. The recording medium of claim 43, wherein, in said program;
$X'_i=(X'_{i-1}, X_i)$, $X'_0$=empty set
$m'_i=(m'_{i-1}, m_i)$, $m'_0$=empty set
$ID'_i=(ID'_{i-1}, ID_i)$, $ID'_0$=empty set
$y_0=0$;
said signer i receives signed information $\{ID'_{i-1}, X'_{i-1}, m'_{i-1}, y_{i-1}\}$ from a signer (i−1), then executes said steps (a) through (d) based on said received information.

45. The recording medium of claim 44, wherein, in said program: $m'_1=m_1=m$; $m_2=m_3 \ldots =m_L=$empty message; said signer i receives information $\{ID'_{i-1}, X'_{i-1}, m, y_{i-1}\}$ from said signer (i−1), then executes said steps (a) through (d) based on said received information, and sends out information $\{ID'_i, X'_i, m, y_i\}$ via said signer (i+1) in step (e).

46. The recording medium of claim 44 or 45, wherein said $ID'_i=(ID'_{i-1}, ID_i)$ is replaced with $ID'_i=(ID'_{i-1}, I_i)$ in said program.

47. The recording medium of claim 44 or 45, wherein, in said program: letting the number of elements of a group be represented by p, letting an element g of said group, at which a group calculation starts, be represented by said parameter β, and letting an integer, with which when said element g is group-calculated q times, said calculation returns to g, be represented by said parameter q, these parameters {p, q, g} are published as system public information;

said information $I_i$ is obtained in advance by conducting $s_i$-times group-calculation of said parameter g using said parameter p; and said step (b) is a step of obtaining $X_i$ by conducting $r_i$-times group-calculations of said parameter g using said parameter p.

48. The recording medium of claim 47, wherein, in said program: said p and q are primes bearing the relationship of 1=p mod q; letting a primitive element of (Z/pZ)* be represented by α, said parameter β=g is given in advance with said function $G_1$ by the following equation:

$$g=G_1(q)=\alpha^{(p-1)/q} \bmod p;$$

said information $I_i$ is given in advance with said function $G_2$ by the following equation:

$$I_i=G_2(s_i, g)=g^{s_i} \bmod p;$$

said step (d) is a step of calculating said information $X_i$ with said function Φ by the following equation:

$$X_i=\Phi(r_i, g)=g^{r_i} \bmod p;$$

and said step (d) is a step of calculating said signature function $Sg_i$ by the following equation using said $e_i, d_i, r_i, s_i, q$ and $y_{i-1}$:

$$y_i=Sg_i(e_i, s_i, r_i, y_{i-1})=(y_{i-1}+d_i r_i+e_i s_i) \bmod q.$$

49. The recording medium of claim 44 or 45, wherein, in said program: said parameter q is a parameter of a definition field GF(q) of an elliptic curve $E_{a,b}(GF(q))$, and letting a base point of an order k on said elliptic curve be represented by said parameter β and a parameter of said elliptic curve by a, b∈GF(q), these parameters {q, a, b, P,k} are published as system public information; and wherein:

said information $I_i$ is obtained in advance with said function $G_2(s_i, P)$ by conducting $s_i$-times group-calculations of said parameter P; and said step (b) is a step of obtaining said information $X_i$ with said function Φ by conducting $r_i$-times group-calculations of said parameter P.

50. The recording medium of claim 49, wherein, in said program: said parameter β=P is given based on said function $G_1$ by the following equation:

$$G_1(q)=P \in E_{a,b}(GF(q));$$

said information $I_i$ is calculated with said function $G_2$ by the following equation:

$$I_i=G_2(s_i, P)=s_i P \text{ over } E_{a,b}(GF(q));$$

said step (b) is a step of calculating said information $X_i$ with said function Φ by the following equation:

$$X_i=\Phi(r_i, P)=r_i P \text{ over } E_{a,b}(GF(q));$$

and said step (d) is a step of calculating said signature function $Sg_i$ by the following equation using said $e_i, d_i, r_i, s_i$ and $y_{i-1}$:

$$y_i=Sg_i(e_i, d_i, s_i, r_i, y_{i-1})=(y_{i-1}+d_i r_i+e_i s_i) \bmod k.$$

51. A recording medium for a signer apparatus which has recorded thereon a program which is used in said signer apparatus in a system in which: each of signers, i, attaches a digital signature to an electronified document $m'_i$ and a verifier verifies said digital signatures en bloc; i=1, ..., L, L being an integer equal to or greater than 2; information containing a parameter q for each signer i to generate a signature function $Sg_i$ and a parameter $β=G_1(q)$ obtained with a function $G_1$ through the use of said parameter q is published in advance; and information $I_i=G_2(s_i, β)$ pregenerated by said each signer i using said public parameter β and a secret random number $s_i$, a pair of one-way functions $f_i$ and $h_i$ for use by said each signer i and identification information $ID_i$ are published as signer public information $\{ID_i, I_i, f_i, h_i\}$ in advance; said program comprising the steps of:

(a) generating a second random number $r_i$;

(b) setting said parameter β and said second random number $r_i$ in a function Φ to generate information $X_1=\Phi(r_i, β)$;

(c) generating
$e_i=f_i(X'_i, m'_i)$
$d_i=h_i(X'_i, m'_i)$
with said one-way functions $f_i$ and $h_i$ through the use of document information $m'_i$ containing said document $m_i$ to be signed and said information $X'_i$, containing said information $X_i$;

(d) generating, for information containing $e_i, d_i, s_i$, and $r_i$, a signature
$y_i=Sg_i(e_i, d_i, s_i, r_i)$
with a signature function $Sg_i$ generated using said parameter q; and (e) sending information $\{ID'_i, X'_i, m'_i, y_i\}$, containing said identification information $ID_i$ as identification information $ID'_i$, to a verifier.

52. The recording medium of claim 51, wherein, in said program: $X'_i=X_i$, $m'_i=m_i$, and $ID'_i=ID_i$; and said signer i executes said steps (a) through (e), thereby generating and sending information $\{ID_i, X_i, m_i, y_i\}$, as said information $\{ID'_i, X'_i, m'_i, y_i\}$, individually to said verifier.

53. The recording medium of claim 52, wherein, in said program: letting the number of elements of a group be represented by p, letting an element g of said group, at which a group calculation starts, be represented by said parameter β, and letting an integer, with which when said element g is group-calculated q times, said calculation returns to g, be represented by said parameter q, these parameters {p, q, g} are published as system public information;

said information $I_i$ is obtained in advance with said function $G_2(s_i, g)$ by conducting $s_i$-times group-calculations of said g using said p; and said step (b) is a step of obtaining said information $X_i$ with said function $\Phi(r_i, g)$ by conducting $r_i$-times group-calculations of said g using p.

54. The recording medium of claim 53, wherein, in said program: said p and q are primes bearing the relationship of 1=p mod q; letting a primitive element of $(Z/pZ)^*$ be represented by $\alpha$, said parameter $\beta$=g is given in advance with said function $G_1$ by the following equation:

$$g=G_1(q)=\alpha^{(p-1)/q} \bmod p;$$

said information $I_i$ is given in advance with said function $G_2$ by the following equation:

$$I_i=G_2(s_i, g)=g^{s_i} \bmod p;$$

said step (b) is a step of calculating said information $X_i$ with said function $\Phi$ by the following equation:

$$X_i=\Phi(r_i, g)=g^{r_i} \bmod p;$$

and said step (d) is a step of calculating said signature function $Sg_i$ by the following equation using said $e_i$, $d_i$, $r_i$, $s_i$ and q:

$$y_i=Sg_i(e_i, d_i, s_i, r_i)=(d_i r_i + e_i s_i) \bmod q.$$

55. The recording medium of claim 52, wherein, in said program: said parameter q is a parameter of a definition field GF(q) of an elliptic curve $E_{a,b}(GF(q))$, and letting a base point of an order k on said elliptic curve be represented by said parameter $\beta$ and a parameter of said elliptic curve by a, b$\in$GF(q), these parameters {q, a, b, P,k} are published as system public information; and wherein:

said information $I_i$ is obtained in advance with said function $G_2(s_i, P)$ by conducting $s_i$-times group-calculations of said parameter P; and said step (b) is a step of obtanig said information $X_i$ with said function $\Phi$ by conducting $r_i$-times group-calculations of said parameter P.

56. The recording medium of claim 55, wherein, in said program: said parameter $\beta$=P is given based on said function $G_1$ by the following equation:

$$G_1(q)=P \in E_{a,b}(GF(q));$$

said information $I_i$ is calculated with said function $G_2$ by the following equation:

$$I_i=G_2(s_i, P)=s_i P \text{ over } E_{a,b}(GF(q));$$

said step (b) is a step of calculating said information $X_i$ with said function $\Phi$ by the following equation:

$$X_i=\Phi(r_i, P)=r_i P \text{ over } E_{a,b}(GF(q));$$

and said step (d) is a step of calculating said signature function $Sg_i$ by the following equation using said $e_i$, $d_i$, $r_i$ and $s_i$:

$$y_i=Sg_i(e_i, d_i, s_i, r_i)=(d_i r_i + e_i s_i) \bmod k.$$

57. A recording medium for a verifier apparatus which has recorded thereon a program which is used in said verifier apparatus in a system in which: each of a series of signers, i, attaches a digital signature to an electronified document $m'_i$ and a verifier verifies said digital signatures en bloc; i=1, . . . , L, L being an integer equal to or greater than 2; and information containing a parameter q for each signer i to generate a signature function $Sg_i$ and a parameter $\beta=G_1(q)$ obtained with a function $G_1$ through the use of said parameter q is published in advance; said program comprising the steps of:

(a) obtaining, from public information $\{ID_i, I_i, f_i, h_i\}$, information $I_i$ corresponding to identification information $ID_i$ contained in $ID'_i$ in information $\{ID'_L, X'_L, m'_L, y_L\}$ received from the last signer L of the series of said signers and one-way functions $f_i$ and $h_i$, and calculating $e_i=f_i(X'_i, m'_i)$ $d_i=h_i(X'_i, m'_i)$ through the use of said one-way functions $f_i$ and $h_i$ and information $X'_i$ and $m'_i$ contained in said received pieces of information $X'_L$ and $m'_L$;

(b) obtaining $X_i$ in said information $X'_i$ and calculating $$Z'=V((X_i * d_i), (I_i * e_i)|i=1, \ldots, L)$$

by a function V containing a calculation $(X_i * d_i)$ of $d_i$ and $X_i$ and a calculation $(I_i * e_i)$ of $e_i$ and $I_i$;

(c) obtaining $W=\Gamma(y_1 * \beta)$ by a function $\Gamma$ containing a calculation $(y_i * \beta)$ of $y_i$ and $\beta$; and (d) receiving said values Z' and W, then making a check to see if they match each other, and if they match each other, providing an output indicating that said received documents $(m_1, \ldots, m_L)$ have been duly signed by L signers.

58. The recording medium of claim 57, wherein, in said program;

$X'_i=(X'_{i-1}, X_i)$, $X'_0$=empty set $m'_i=(m'_i, m_i)$, $m'_0$=empty set $ID'_i=(ID'_{i-1}, ID_i)$, $ID'_0$=empty set $y_0=0$;

when receiving signed information $\{ID'_L, X'_L, m'_L, y_L\}$ from the last signer L, said verifier executes said steps (a) through (d) based on said received information.

59. The recording medium of claim 58, wherein, in said program: $m'_1=m_1=m$; $m_2=m_3 \ldots =m_L$=empty message; said verifier receives signed information $\{ID'_L, X'_L, m, y_L\}$ from said signer L, and executes said steps (a) through (d) based on said received information.

60. The recording medium of claim 58 or 59, wherein said $ID'_i=(ID'_{i-1}, ID_i)$ is replaced with $ID'_i=(ID'_{i-1}, I_i)$ in said program.

61. The recording medium of claim 58 or 59, wherein: in said program: letting the number of elements of a group be represented by p, letting an element g of said group, at which a group calculation starts, be represented by said parameter $\beta$, and letting an integer, with which when said element g is group-calculated q times, said calculation returns to g, be represented by said parameter q, these parameters {p, q, g} are published as system public information;

said step (b) is a step of obtaining Z' by sequentially calculating values $(X_i * d_i)$ obtained by $d_i$-times multi-component group-calculations of $X_i$ and values $(I_i * e_i)$ obtained by $e_i$-times multi-component group-calculations of $I_i$ for every i from 1 to L; and said step (c) is a step of obtaining W by conducting $y_L$-times group-calculations of said parameter g using received $y_L$ and said pieces of public information p and q.

62. The recording medium of claim 61, wherein, in said program: said p and q are primes bearing the relationship of 1=p mod q; letting a primitive element of $(Z/pZ)^*$ be represented by $\alpha$, said parameter $\beta=g$ is given in advance by the following equation with said function $G_i$:

$$g = G_1(q) = \alpha^{(p-1)/q} \mod p;$$

said step (b) is a step for calculating said function V by the following equation:

$$Z' = V((X_i * d_i), (I_i * e_i) | i = 1, \ldots, L)$$
$$= X_1^{d_1} I_1^{e_1} \cdots X_L^{d_L} I_L^{e_L} \mod p; \text{ and}$$

said step (c) is a step of calculating said function $\Gamma$ by the following equation:

$$W = \Gamma(y_i * g) = g^{y_L} \mod p.$$

63. The recording medium of claim 58 or 59, wherein, in said program: said parameter q is a parameter of a definition field GF(q) of an elliptic curve $E_{a,b}(GF(q))$, and letting a base point of an order k on said elliptic curve be represented by said parameter $\beta$ and a parameter of said elliptic curve by a, b$\in$GF(q), these parameters {q, a, b, P, k} are published as system public information; and wherein:

said step (b) is a step of obtaining Z' by sequentially calculating values $(X_i * d_i)$ obtained by $d_i$-times multi-component group-calculations of $X_i$ and values $(I_i * e_i)$ obtained by $e_i$-times multi-component group-calculations of $I_i$ for every i from 1 to L; and said step (c) is a step of calculating W by $y_L$-times calculations of said parameter P on said elliptic curve using said received information $y_L$ and said public information P.

64. The recording medium of claim 63, wherein, in said program: said function $G_1$ for calculating said parameter $\beta=P$ is given in advance by the following equation:

$$G_1(q) = P \in E_{a,b}(GF(q));$$

said step (b) is a step of calculating said function V by the following equation:

$$Z' = V((X_i * d_i), (I_i * e_i) | i = 1, \cdots, L)$$
$$= (d_1 X_1 + \cdots + d_L X_L + e_1 I_1 + \cdots + e_L I_L) \text{ over } E_{a,b}(GF(q)); \text{ and}$$

said step (c) is a step of calculating said function $\Gamma$ by the following equation:

$$W = \Gamma(y_L * P) = y_L P \text{ over } E_{a,b}(GF(q)).$$

65. A recording medium for a verifier apparatus which has recorded thereon a program which is used in said verifier apparatus in a system in which: each of signers, i, attaches a digital signatures to an electronified document $m'_i$ and a verifier verifies said digital signatures en bloc; i=1, . . . L, L being an integer equal to or greater than 2; and information containing a parameter q for each signer i to generate a signature function $Sg_i$ and a parameter $\beta = G_1(q)$ obtained with a function $G_1$ through the use of said parameter q is published in advance; said program comprising the steps of:

(a) obtaining, from public information $\{ID_i, I_i, f_i, h_i\}$, information $I_i$ corresponding to identification information $ID_i$ contained in $ID'_i$ in information $\{ID'_i, X'_i, m'_i, y_i\}$ received from each of said signers, i, and one-way functions $f_i$ and $h_i$, and calculating $e_i = f_i(X'_i, m'_i)$
$d_i = h_i(X'_i, m'_i)$ through the use of said one-way functions $f_i$ and $h_i$ and said received pieces of information $X'_i$ and $m'_i$;

(b) obtaining $X_i$ in said information $X'_i$ and calculating $$Z' = V((X_i * d_i), (I_i * e_i) | i = 1, \ldots, L)$$

by a function V containing a calculation $(X_i * d_i)$ of $d_i$ and $X_i$ and a calculation $(I_i * e_i)$ of $e_i$ and $I_i$;

(c) obtaining $W = \Gamma(Y * \beta)$ by a function $\Gamma$ containing a calculation $(Y * \beta)$ using $\beta$ and an accumulated value Y of $y_1$ to $y_L$; and (d) receiving said values Z' and W, then making a check to see if they match each other, and if they match each other, providing an output indicating that said received documents $(m_1, \ldots, m_L)$ have been duly signed by L signer i apparatuses.

66. The recording medium of claim 65, wherein, in said program: $X'_i = X_i$, $m'_i = m_i$, and $ID'i = ID_i$; and said verifier receives signed information $\{ID_i, X_i, m_i, y_i\}$ individually from each signer i, and executes said steps (a) through (d).

67. The recording medium of claim 66, wherein, in said program: letting the number of elements of a group be represented by p, letting an element g of said group, at which a group calculation starts, be represented by said parameter $\beta$, and letting an integer, with which when said element g is group-calculated q times, said calculation returns to g, be represented by said parameter q, these parameters {p, q, g} are published as system public information;

said step (b) is a step of obtaining Z' by sequentially calculating values $(X_i * d_i)$ obtained by $d_i$-times multi-component group-calculations of $X_i$ and values $(I_i * e_i)$ obtained by $e_i$-times multi-component group-calculations of $I_i$ for every i from 1 to L; and said step (c) is a step of calculating an accumulated value Y using L received pieces of information $y_i$ and said public information q and calculating, as said W, a value $(g*Y)$ obtained by operating Y times said parameter g using said pieces of public information p and q.

68. The recording medium of claim 67, wherein, in said program: said p and q are primes bearing the relationship of 1=p mod q; letting a primitive element of $(Z/pZ)^*$ be represented by $\alpha$, said parameter $\beta = g$ is given by the following equation with said function $G_1$:

$$g = G_1(q) = \alpha^{(p-1)/q} \mod p;$$

said step (b) is a step of calculating said function V by the following equation:

$$Z' = V((X_i * d_i), (I_i * e_i) | i = 1, \ldots, L)$$
$$= X_1^{d_1} I_1^{e_1} \cdots X_L^{d_L} I_L^{e_L} \mod p; \text{ and}$$

said step (c) is a step of calculating said accumulated value Y by $$Y = \sum_{i=1}^{L} y_i \bmod q$$

and calculating said function $\Gamma$ by the following equation:

$$W=\Gamma(Y*g)=g^Y \bmod p.$$

69. The recording medium of claim 66, wherein, in said program: said parameter q is a parameter of a definition field GF(q) of an elliptic curve $E_{a,b}(GF(q))$, and letting a base point of an order k on said elliptic curve be represented by said parameter β and a parameter of said elliptic curve by a, b∈GF(q), these parameters {q, a, b, P,k} are published as system public information; and wherein:
- said step (b) is a step of obtaining Z' by sequentially calculating values $(X_i*d_i)$ obtained by $d_i$-times multi-component group-calculations of $X_i$ and values $(I_i*e_i)$ obtained by conducting $e_i$-times multi-component group-calculations of $I_i$ for every i from 1 to L; and
- said step (c) is a step of calculating W by conducting $y_L$-times calculations of said parameter P on said elliptic curve using said received information $y_L$ and said public information P.

70. The recording medium of claim 69, wherein, in said program: said function $G_1$ for calculating said parameter β=P is given in advance by the following equation:

$$G_1(q)=P \in E_{a,b}(GF(q));$$

said step (b) is a step of calculating said function V by the following equation:

$$Z' = V((X_i * d_i), (I_i * e_i) | i = 1, \cdots, L)$$
$$= (d_1 X_1 + \cdots + d_L X_L + e_1 I_1 + \cdots + e_L I_L) \text{ over } E_{a,b}(GF(q)); \text{ and}$$

said step (c) is a step of calculating said function $\Gamma$ by the following equation:

$$W=\Gamma(Y*P)=YP \text{ over } E_{a,b}(GF(q))$$

where $$Y = \sum_{i=1}^{L} y_i \bmod k.$$

* * * * *